US012340631B2

(12) United States Patent
Carrigan et al.

(10) Patent No.: US 12,340,631 B2
(45) Date of Patent: Jun. 24, 2025

(54) PROVIDING PERSONALIZED AUDIO

(71) Applicant: Apple Inc., Cupertino, CA (US)

(72) Inventors: Taylor G. Carrigan, San Francisco, CA (US); Patrick L Coffman, San Francisco, CA (US); Amy E. Dedonato, San Francisco, CA (US); Charles C. Hoyt, Pacifica, CA (US); Christine A. Franco, Menlo Park, CA (US); Mitchell L Lerner, San Francisco, CA (US); Camille Moussette, San Francisco, CA (US); Pavel Pivonka, San Francisco, CA (US); Christopher J. Sanders, San Jose, CA (US); Hugo D. Verweij, Portola Valley, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/205,495

(22) Filed: Jun. 2, 2023

(65) Prior Publication Data

US 2023/0394886 A1 Dec. 7, 2023

Related U.S. Application Data

(60) Provisional application No. 63/349,108, filed on Jun. 5, 2022.

(51) Int. Cl.
*G06V 40/50* (2022.01)
*G06F 3/0482* (2013.01)
(Continued)

(52) U.S. Cl.
CPC ............ *G06V 40/50* (2022.01); *G06F 3/0482* (2013.01); *G06F 3/04847* (2013.01); *G06F 3/165* (2013.01); *G06V 10/993* (2022.01); *G06V 40/166* (2022.01); *G06V 40/67* (2022.01); *H04S 7/303* (2013.01); *H04S 2400/11* (2013.01); *H04S 2420/01* (2013.01)

(58) Field of Classification Search
CPC ...... G06V 40/50; G06V 40/67; G06V 40/166; G06V 10/993; G06F 3/0482; G06F 3/04847; G06F 3/165; H04S 7/303; H04S 2400/11; H04S 2420/01
See application file for complete search history.

(56) References Cited

U.S. PATENT DOCUMENTS

| 5,852,670 A | 12/1998 | Setlak et al. |
| 6,064,429 A | 5/2000 | Belk et al. |

(Continued)

FOREIGN PATENT DOCUMENTS

| CN | 102016877 A | 4/2011 |
| CN | 102640092 A | 8/2012 |

(Continued)

OTHER PUBLICATIONS

Applicant-Initiated Interview Summary received for U.S. Appl. No. 17/409,570, mailed on Dec. 7, 2022, 4 pages.
(Continued)

*Primary Examiner* — Nicholas Augustine
(74) *Attorney, Agent, or Firm* — DLA Piper LLP (US)

(57) ABSTRACT

The present disclosure generally relates to personalized spatial audio profiles and providing personalized spatial audio.

57 Claims, 31 Drawing Sheets

(51) Int. Cl.
  *G06F 3/04847* (2022.01)
  *G06F 3/16* (2006.01)
  *G06V 10/98* (2022.01)
  *G06V 40/16* (2022.01)
  *G06V 40/60* (2022.01)
  *H04S 7/00* (2006.01)

(56) References Cited

U.S. PATENT DOCUMENTS

| | | | |
|---|---|---|---|
| 6,699,127 B1* | 3/2004 | Lobb | A63F 13/45 463/43 |
| 6,921,336 B1* | 7/2005 | Best | A63F 13/843 463/40 |
| 8,170,228 B2* | 5/2012 | Goldstein | A61B 5/121 381/163 |
| 8,248,462 B2* | 8/2012 | Peterka | G02B 27/0093 348/54 |
| 8,632,409 B2* | 1/2014 | Wolfson | A63F 13/335 345/473 |
| 9,928,029 B2 | 3/2018 | Brown et al. | |
| 10,042,038 B1* | 8/2018 | Lord | G10L 25/51 |
| 10,175,848 B2 | 1/2019 | Haapsaari et al. | |
| 10,462,598 B1 | 10/2019 | Villanueva-Barreiro et al. | |
| 10,524,080 B1 | 12/2019 | Johnson et al. | |
| 10,674,308 B2 | 6/2020 | Satongar et al. | |
| 10,798,511 B1 | 10/2020 | Sheaffer et al. | |
| 10,805,758 B2 | 10/2020 | Norris et al. | |
| 10,880,649 B2 | 12/2020 | Johnson et al. | |
| 10,890,968 B2* | 1/2021 | Kurlethimar | G02B 27/0101 |
| 11,036,387 B2 | 6/2021 | Karunamuni et al. | |
| 11,100,349 B2 | 8/2021 | Cohen et al. | |
| 11,115,773 B1* | 9/2021 | Satongar | H04R 5/04 |
| 11,231,770 B2 | 1/2022 | Shipes et al. | |
| 11,315,277 B1 | 4/2022 | Jupin et al. | |
| 11,432,071 B2 | 8/2022 | Peters | |
| 11,496,852 B2 | 11/2022 | Arya et al. | |
| 11,589,183 B2 | 2/2023 | Tu et al. | |
| 11,589,184 B1* | 2/2023 | Mont-Reynaud | H04S 7/304 |
| 11,611,840 B2 | 3/2023 | Li et al. | |
| 11,647,352 B2 | 5/2023 | Tam et al. | |
| 11,675,423 B2 | 6/2023 | Akgul et al. | |
| 11,751,003 B1 | 9/2023 | Brimijoin et al. | |
| 11,828,940 B2* | 11/2023 | Abdollahian | G01S 3/8083 |
| 11,948,475 B2* | 4/2024 | Falash | G09B 9/02 |
| 2002/0175933 A1 | 11/2002 | Ronkainen et al. | |
| 2005/0013442 A1 | 1/2005 | Ohta | |
| 2005/0275914 A1* | 12/2005 | Vesely | H04N 13/395 359/13 |
| 2007/0094585 A1* | 4/2007 | Ando | G11B 27/034 |
| 2007/0136679 A1* | 6/2007 | Yang | H04N 21/4325 348/E5.102 |
| 2007/0200871 A1* | 8/2007 | Lee | G06F 3/04815 345/619 |
| 2007/0201730 A1 | 8/2007 | Masaki et al. | |
| 2008/0024594 A1* | 1/2008 | Ritchey | H04N 23/58 348/E7.001 |
| 2008/0229206 A1 | 9/2008 | Seymour et al. | |
| 2009/0063983 A1* | 3/2009 | Amidon | G06N 3/006 715/733 |
| 2009/0083665 A1* | 3/2009 | Anttila | G06F 3/0482 715/834 |
| 2009/0165000 A1* | 6/2009 | Gyorfi | H04L 12/1822 718/102 |
| 2009/0215533 A1 | 8/2009 | Zalewski et al. | |
| 2009/0262947 A1 | 10/2009 | Karlsson et al. | |
| 2010/0137027 A1 | 6/2010 | Kim | |
| 2010/0251031 A1* | 9/2010 | Nieh | G06F 11/3476 714/45 |
| 2010/0260487 A1* | 10/2010 | Zbeda | A63F 13/497 707/E17.014 |
| 2010/0318204 A1* | 12/2010 | Daisy | G06F 3/0488 345/173 |
| 2011/0050976 A1 | 3/2011 | Kwon | |
| 2011/0052013 A1 | 3/2011 | Sasahara et al. | |
| 2011/0107220 A1* | 5/2011 | Perlman | H04N 21/2381 715/720 |
| 2011/0134034 A1* | 6/2011 | Daniel | A63F 13/218 345/158 |
| 2011/0191674 A1* | 8/2011 | Rawley | G06F 3/016 715/702 |
| 2011/0221692 A1* | 9/2011 | Seydoux | A63H 30/04 345/173 |
| 2011/0268281 A1 | 11/2011 | Florencio et al. | |
| 2012/0140955 A1 | 6/2012 | Yasui | |
| 2012/0235938 A1 | 9/2012 | Laubach | |
| 2013/0021273 A1 | 1/2013 | Lee et al. | |
| 2014/0270374 A1 | 9/2014 | Unzueta | |
| 2014/0304604 A1 | 10/2014 | Miyazawa | |
| 2014/0306406 A1 | 10/2014 | Hibberd | |
| 2015/0010160 A1 | 1/2015 | Udesen | |
| 2015/0169280 A1 | 6/2015 | Suzuki et al. | |
| 2015/0208166 A1 | 7/2015 | Raghuvanshi et al. | |
| 2015/0222977 A1* | 8/2015 | Angel, Jr. | H04R 1/105 381/74 |
| 2015/0234464 A1 | 8/2015 | Yliaho | |
| 2015/0245159 A1 | 8/2015 | Osman | |
| 2015/0264503 A1 | 9/2015 | Hall et al. | |
| 2015/0302625 A1* | 10/2015 | Greco | A63F 13/577 345/633 |
| 2015/0312694 A1 | 10/2015 | Bilinski et al. | |
| 2015/0341717 A1 | 11/2015 | Song et al. | |
| 2016/0125869 A1 | 5/2016 | Kulavik et al. | |
| 2016/0284123 A1 | 9/2016 | Hare et al. | |
| 2016/0294557 A1 | 10/2016 | Baldwin et al. | |
| 2016/0379621 A1* | 12/2016 | Marti | B60Q 9/00 381/71.4 |
| 2017/0046123 A1 | 2/2017 | Song et al. | |
| 2017/0195815 A1 | 7/2017 | Christoph et al. | |
| 2017/0251323 A1 | 8/2017 | Jo et al. | |
| 2017/0295278 A1 | 10/2017 | Lyren et al. | |
| 2017/0358181 A1 | 12/2017 | Moussette et al. | |
| 2018/0032031 A1* | 2/2018 | Du | G06T 19/20 |
| 2018/0060025 A1 | 3/2018 | Hill et al. | |
| 2018/0218727 A1* | 8/2018 | Cutler | H04L 65/752 |
| 2018/0239820 A1 | 8/2018 | Jeong et al. | |
| 2018/0329672 A1 | 11/2018 | Sadak et al. | |
| 2018/0335939 A1 | 11/2018 | Karunamuni et al. | |
| 2019/0028579 A1 | 1/2019 | Cho et al. | |
| 2019/0087049 A1 | 3/2019 | Mani et al. | |
| 2019/0087050 A1 | 3/2019 | Mani | |
| 2019/0087972 A1 | 3/2019 | Huttunen et al. | |
| 2019/0104359 A1 | 4/2019 | Sheaffer et al. | |
| 2019/0104366 A1 | 4/2019 | Johnson et al. | |
| 2019/0304081 A1 | 10/2019 | Vanne et al. | |
| 2019/0378430 A1 | 12/2019 | Kleiman Keinan | |
| 2020/0045491 A1* | 2/2020 | Robinson | H04S 3/008 |
| 2020/0052667 A1 | 2/2020 | Jeon et al. | |
| 2020/0084560 A1 | 3/2020 | Satongar et al. | |
| 2020/0097248 A1 | 3/2020 | Wood et al. | |
| 2020/0104620 A1* | 4/2020 | Cohen | G06V 40/166 |
| 2020/0135163 A1* | 4/2020 | Lovitt | G10K 11/17837 |
| 2020/0188028 A1* | 6/2020 | Feiner | G16H 50/50 |
| 2020/0257548 A1* | 8/2020 | Milne | H04R 5/04 |
| 2020/0329333 A1* | 10/2020 | Norris | H04S 7/304 |
| 2020/0356341 A1 | 11/2020 | Satongar et al. | |
| 2020/0379716 A1 | 12/2020 | Carrigan et al. | |
| 2021/0014612 A1 | 1/2021 | Carrigan | |
| 2021/0014613 A1 | 1/2021 | Carrigan et al. | |
| 2021/0035319 A1* | 2/2021 | Huttunen | G06V 10/7715 |
| 2021/0191612 A1 | 6/2021 | Karunamuni et al. | |
| 2021/0211825 A1 | 7/2021 | Joyner et al. | |
| 2021/0232359 A1 | 7/2021 | Wood et al. | |
| 2021/0258419 A1* | 8/2021 | Lyren | G06F 3/165 |
| 2021/0297806 A1 | 9/2021 | Sunder et al. | |
| 2021/0319403 A1* | 10/2021 | Platt | G06Q 10/10 |
| 2021/0397407 A1* | 12/2021 | Eubank | G06V 40/174 |
| 2022/0078338 A1 | 3/2022 | Tamaki | |
| 2022/0166807 A1* | 5/2022 | Copley | H04L 65/765 |
| 2022/0180667 A1 | 6/2022 | Cohen et al. | |
| 2022/0225050 A1* | 7/2022 | Ninan | G06F 3/011 |
| 2022/0327225 A1* | 10/2022 | Lyren | H04S 1/007 |
| 2022/0345844 A1 | 10/2022 | Baijal et al. | |

(56) References Cited

U.S. PATENT DOCUMENTS

| | | |
|---|---|---|
| 2022/0365740 A1 | 11/2022 | Chang et al. |
| 2022/0374197 A1 | 11/2022 | Carrigan |
| 2022/0391169 A1 | 12/2022 | Wood et al. |
| 2022/0391899 A1* | 12/2022 | Lyren .................. G06Q 20/085 |
| 2023/0094522 A1 | 3/2023 | Stauber et al. |
| 2023/0157757 A1 | 5/2023 | Braido et al. |
| 2023/0157762 A1 | 5/2023 | Braido et al. |
| 2023/0171484 A1* | 6/2023 | Dedonato ............... G06T 19/00 |
| 2023/0206912 A1* | 6/2023 | Piersol .................... G10L 15/22 |
| | | 704/232 |
| 2023/0251817 A1 | 8/2023 | Wood et al. |
| 2023/0254660 A1* | 8/2023 | Ninan ..................... H04S 7/303 |
| | | 381/303 |
| 2023/0276189 A1* | 8/2023 | Elff ........................ H04R 1/406 |
| | | 381/303 |
| 2023/0283976 A1* | 9/2023 | Ninan ..................... H04S 7/304 |
| | | 381/303 |
| 2023/0401032 A1 | 12/2023 | Cohen et al. |
| 2024/0036699 A1 | 2/2024 | Ebbole et al. |
| 2024/0061547 A1 | 2/2024 | Fleizach et al. |
| 2024/0077937 A1 | 3/2024 | Rickwald et al. |
| 2024/0087256 A1 | 3/2024 | Hylak et al. |
| 2024/0094819 A1 | 3/2024 | Nie et al. |
| 2024/0094882 A1 | 3/2024 | Brewer et al. |

FOREIGN PATENT DOCUMENTS

| | | |
|---|---|---|
| CN | 104081335 A | 10/2014 |
| CN | 104583926 A | 4/2015 |
| CN | 105093526 A | 11/2015 |
| CN | 106533918 A | 3/2017 |
| CN | 106708403 A | 5/2017 |
| CN | 106895554 A | 6/2017 |
| EP | 3544321 A1 * | 9/2019 ........... G06T 17/205 |
| EP | 3751869 A1 | 12/2020 |
| JP | 7-220008 A | 8/1995 |
| JP | 10-55260 A | 2/1998 |
| JP | 2005-39311 A | 2/2005 |
| JP | 2010-74258 A | 4/2010 |
| JP | 2013-162284 A | 8/2013 |
| JP | 2015-135611 A | 7/2015 |
| JP | 2017-174435 A | 9/2017 |
| JP | 2018-106731 A | 7/2018 |
| JP | 2018-116636 A | 7/2018 |
| KR | 10-2010-0026479 A | 3/2010 |
| KR | 10-2010-0114247 A | 10/2010 |
| KR | 10-2012-0104248 A | 9/2012 |
| KR | 10-2014-0067887 A | 6/2014 |
| KR | 10-2017-0019649 A | 2/2017 |
| WO | 2009/108645 A1 | 9/2009 |
| WO | 2014/026165 A2 | 2/2014 |
| WO | 2014/051884 A1 | 4/2014 |
| WO | 2016/144975 A2 | 9/2016 |
| WO | 2019/094114 A1 | 5/2019 |

OTHER PUBLICATIONS

Applicant-Initiated Interview Summary received for U.S. Appl. No. 17/409,570, mailed on Dec. 27, 2022, 2 pages.
Applicant-Initiated Interview Summary received for U.S. Appl. No. 17/409,570, mailed on Nov. 3, 2022, 5 pages.
Applicant-Initiated Interview Summary received for U.S. Appl. No. 17/409,570, mailed on Nov. 29, 2022, 4 pages.
Brief Communication Regarding Oral Proceedings received for European Patent Application No. 19766438.6, mailed on Aug. 18, 2022, 1 page.
Corrected Notice of Allowance received for U.S. Appl. No. 16/456,839, mailed on Apr. 29, 2021, 2 pages.
Corrected Notice of Allowance received for U.S. Appl. No. 16/456,839, mailed on Jul. 20, 2021, 3 pages.
Corrected Notice of Allowance received for U.S. Appl. No. 17/227,910, mailed on Aug. 1, 2022, 2 pages.
Corrected Notice of Allowance received for U.S. Appl. No. 17/227,910, mailed on Jul. 7, 2022, 2 pages.
Corrected Notice of Allowance received for U.S. Appl. No. 17/227,910, mailed on May 9, 2022, 2 pages.
Corrected Notice of Allowance received for U.S. Appl. No. 17/227,910, mailed on May 25, 2022, 2 pages.
Corrected Notice of Allowance received for U.S. Appl. No. 17/409,570, mailed on May 10, 2023, 2 pages.
Decision to Grant received for European Patent Application No. 19766438.6, mailed on Feb. 2, 2023, 2 pages.
Extended European Search Report received for European Patent Application No. 22200096.0, mailed on Jan. 26, 2023, 14 pages.
Final Office Action received for U.S. Appl. No. 17/409,570, mailed on Nov. 9, 2022, 37 pages.
Intention to Grant received for European Patent Application No. 19766438.6, mailed on Sep. 15, 2022, 10 pages.
International Preliminary Report on Patentability received for PCT Patent Application No. PCT/US2019/048816, mailed on Apr. 8, 2021, 15 pages.
International Preliminary Report on Patentability received for PCT Patent Application No. PCT/US2019/049227, mailed on Apr. 8, 2021, 11 pages.
International Search Report and Written Opinion received for PCT Patent Application No. PCT/US2019/048816, mailed on Feb. 4, 2020, 22 pages.
International Search Report and Written Opinion received for PCT Patent Application No. PCT/US2019/049227, mailed on Dec. 12, 2019, 14 pages.
Invitation to Pay Additional Fees and Partial International Search Report received for PCT Patent Application No. PCT/US2019/048816, mailed on Dec. 13, 2019, 14 pages.
Invitation to Pay Search Fees received for European Patent Application No. 19766438.6, mailed on Aug. 20, 2021, 3 pages.
Non-Final Office Action received for U.S. Appl. No. 16/553,679, mailed on Jun. 11, 2020, 10 pages.
Non-Final Office Action received for U.S. Appl. No. 17/409,570, mailed on Sep. 21, 2022, 35 pages.
Notice of Acceptance received for Australian Patent Application No. 2019350584, mailed on Mar. 17, 2021, 3 pages.
Notice of Acceptance received for Australian Patent Application No. 2021204526, mailed on Sep. 13, 2022, 3 pages.
Notice of Acceptance received for Australian Patent Application No. 2021204526, mailed on Sep. 20, 2022, 3 pages.
Notice of Acceptance received for Australian Patent Application No. 2022256155, mailed on May 16, 2023, 3 pages.
Notice of Allowance received for Chinese Patent Application No. 202110296926.X, mailed on Mar. 11, 2022, 4 pages (1 page of English Translation and 3 pages of Official Copy).
Notice of Allowance received for Japanese Patent Application No. 2021446333, mailed on Nov. 7, 2022, 4 pages (1 page of English Translation and 3 pages of Official Copy).
Notice of Allowance received for Japanese Patent Application No. 2021-510322, mailed on Aug. 10, 2021, 4 pages (1 page of English Translation and 3 pages of Official Copy).
Notice of Allowance received for Korean Patent Application No. 10-2021-7006125, mailed on Oct. 13, 2021, 3 pages (1 page of English Transiation and 2 pages of Official Copy).
Notice of Allowance received for Korean Patent Application No. 10-2021-7042103, mailed on Mar. 23, 2022, 4 pages (1 page of English Translation and 3 pages of Official Copy).
Notice of Allowance received for Korean Patent Application No. 10-2022-7021764, mailed on Feb. 23, 2023, 7 pages (2 pages of English Translation and 5 pages of Official Copy).
Notice of Allowance received for U.S. Appl. No. 16/456,839, mailed on Apr. 15, 2021, 8 pages.
Notice of Allowance received for U.S. Appl. No. 16/456,839, mailed on Dec. 11, 2020, 10 pages.
Notice of Allowance received for U.S. Appl. No. 16/553,679, mailed on Dec. 9, 2020, 7 pages.
Notice of Allowance received for U.S. Appl. No. 17/227,910, mailed on Apr. 15, 2022, 7 pages.
Notice of Allowance received for U.S. Appl. No. 17/409,570, mailed on Apr. 11, 2023, 7 pages.

(56) References Cited

OTHER PUBLICATIONS

Notice of Allowance received for U.S. Appl. No. 17/409,570, mailed on Jan. 25, 2023, 7 pages.
Notice of Allowance received for U.S. Appl. No. 17/890,979, mailed on Dec. 14, 2022, 6 pages.
Notice of Allowance received for U.S. Appl. No. 17/890,979, mailed on Feb. 16, 2023, 2 pages.
Office Action received for Australian Patent Application No. 2021204526, mailed on Jun. 10, 2022, 3 pages.
Office Action received for Australian Patent Application No. 2022256155, mailed on Apr. 18, 2023, 2 pages.
Office Action received for Chinese Patent Application No. 202110296926.X, mailed on Oct. 13, 2021, 17 pages (10 pages of English Translation and 7 pages of Official Copy).
Office Action received for European Patent Application No. 19766438.6, mailed on Oct. 29, 2021, 18 pages.
Office Action received for European Patent Application No. 19769669.3, mailed on Apr. 18, 2023, 20 pages.
Office Action received for Indian Patent Application No. 202117008281, mailed on Jan. 19, 2023, 6 pages.
Office Action received for Korean Patent Application No. 10-2021-7006125, mailed on Mar. 30, 2021, 9 pages (4 pages of English Translation and 5 pages of Official Copy).
Office Action received for Korean Patent Application No. 10-2021-7042103, mailed on Jan. 10, 2022, 14 pages (7 pages of English Translation and 7 pages of Official Copy).
Office Action received for Korean Patent Application No. 10-2022-7021764, mailed on Jul. 18, 2022, 5 pages (2 pages of English Translation and 3 pages of Official Copy).
Summons to Attend Oral Proceedings received for European Patent Application No. 19766438.6, mailed on May 2, 2022, 16 pages.
Applicant-Initiated Interview Summary received for U.S. Appl. No. 18/237,849, mailed on Jul. 19, 2024, 4 pages.
Applicant-Initiated Interview Summary received for U.S. Appl. No. 18/237,849, mailed on Jul. 30, 2024, 4 pages.
Notice of Allowance received for Japanese Patent Application No. 2022-185685, mailed on Jul. 16, 2024, 4 pages (1 page of English Translation and 3 pages of Official Copy).
Applicant-Initiated Interview Summary received for U.S. Appl. No. 18/134,527, mailed on Mar. 14, 2024, 2 pages.
Applicant-Initiated Interview Summary received for U.S. Appl. No. 18/134,527, mailed on Oct. 26, 2023, 2 pages.
Corrected Notice of Allowance received for U.S. Appl. No. 18/134,527, mailed on Jun. 17, 2024, 2 pages.
Final Office Action received for U.S. Appl. No. 18/134,527, mailed on Feb. 15, 2024, 11 pages.
International Search Report and Written Opinion received for PCT Patent Application No. PCT/US2023/024385, mailed on Nov. 3, 2023, 20 pages.
Invitation to Pay Additional Fees and Partial International Search Report received for PCT Patent Application No. PCT/US2023/024385, mailed on Sep. 11, 2023, 13 pages.
Non-Final Office Action received for U.S. Appl. No. 18/134,527, mailed on Oct. 6, 2023, 9 pages.
Non-Final Office Action received for U.S. Appl. No. 18/237,849, mailed on Mar. 26, 2024, 47 pages.
Notice of Acceptance received for Australian Patent Application No. 2023203125, mailed on Dec. 8, 2023, 3 pages.
Notice of Allowance received for U.S. Appl. No. 17/409,570, mailed on Jul. 20, 2023, 7 pages.
Notice of Allowance received for U.S. Appl. No. 18/134,527, mailed on May 8, 2024, 6 pages.
Office Action received for Australian Patent Application No. 2023203125, mailed on Oct. 10, 2023, 2 pages.
Office Action received for Chinese Patent Application No. 201980064012.1, mailed on Mar. 19, 2024, 18 pages (10 pages of English Translation and 8 pages of Official Copy).
Office Action received for Japanese Patent Application No. 2022-185685, mailed on Apr. 8, 2024, 8 pages (4 pages of English Translation and 4 pages of Official Copy).
Office Action received for Japanese Patent Application No. 2022-185685, mailed on Dec. 25, 2023, 8 pages (4 pages of English Translation and 4 pages of Official Copy).
Office Action received for Korean Patent Application No. 10-2023-7016618, mailed on Jan. 12, 2024, 11 pages (5 pages of English Translation and 6 pages of Official Copy).

* cited by examiner

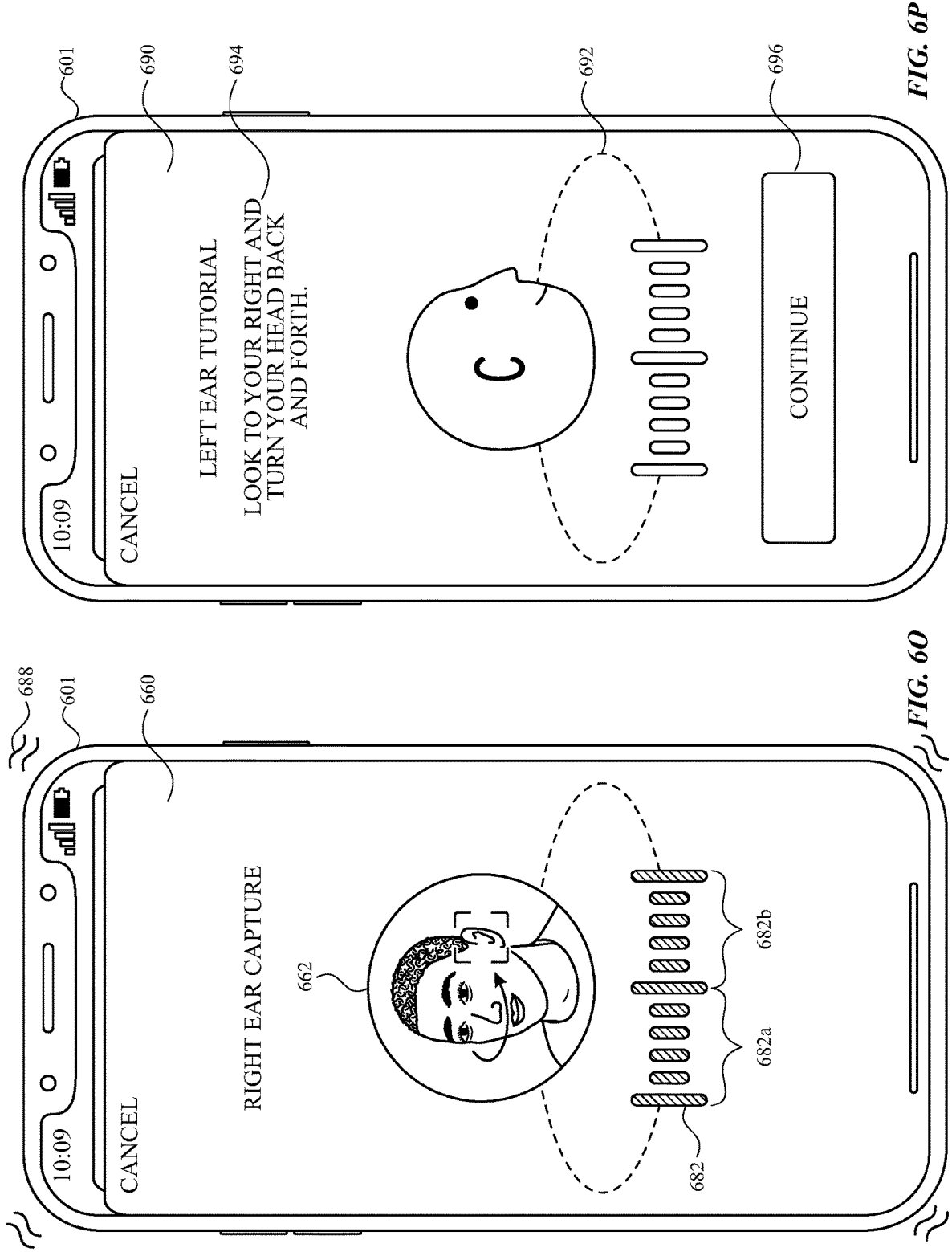

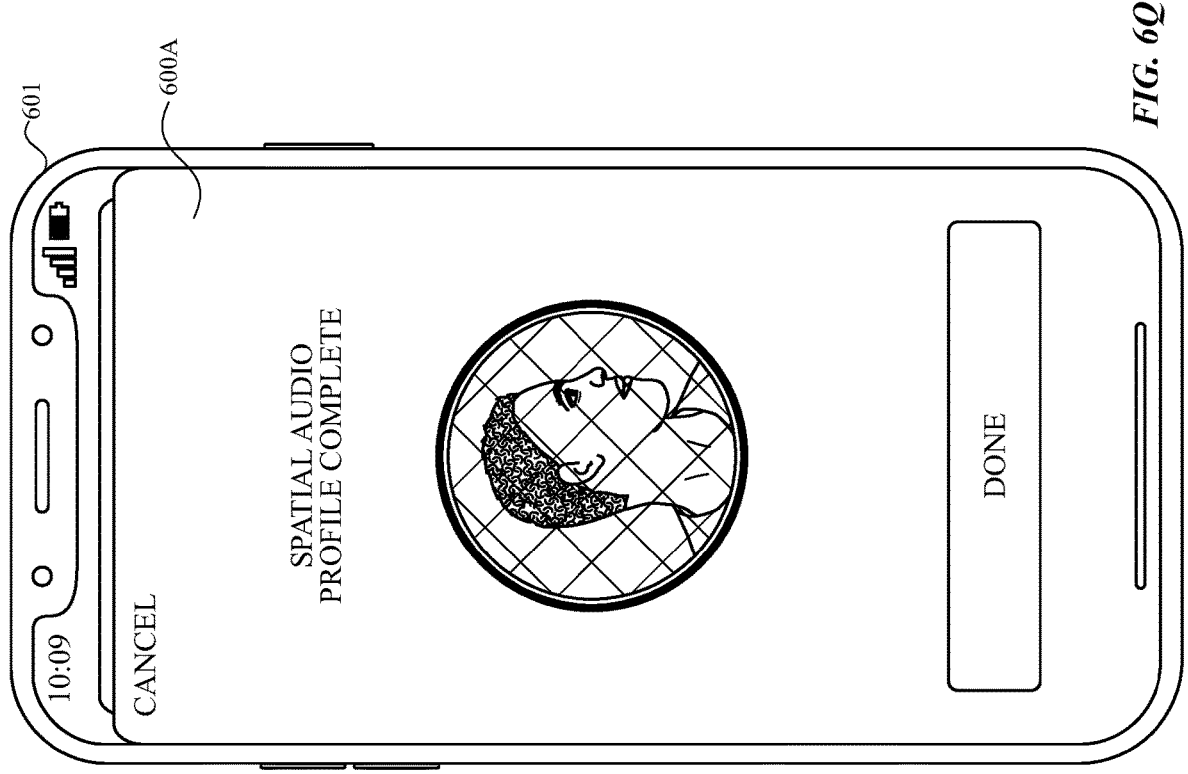

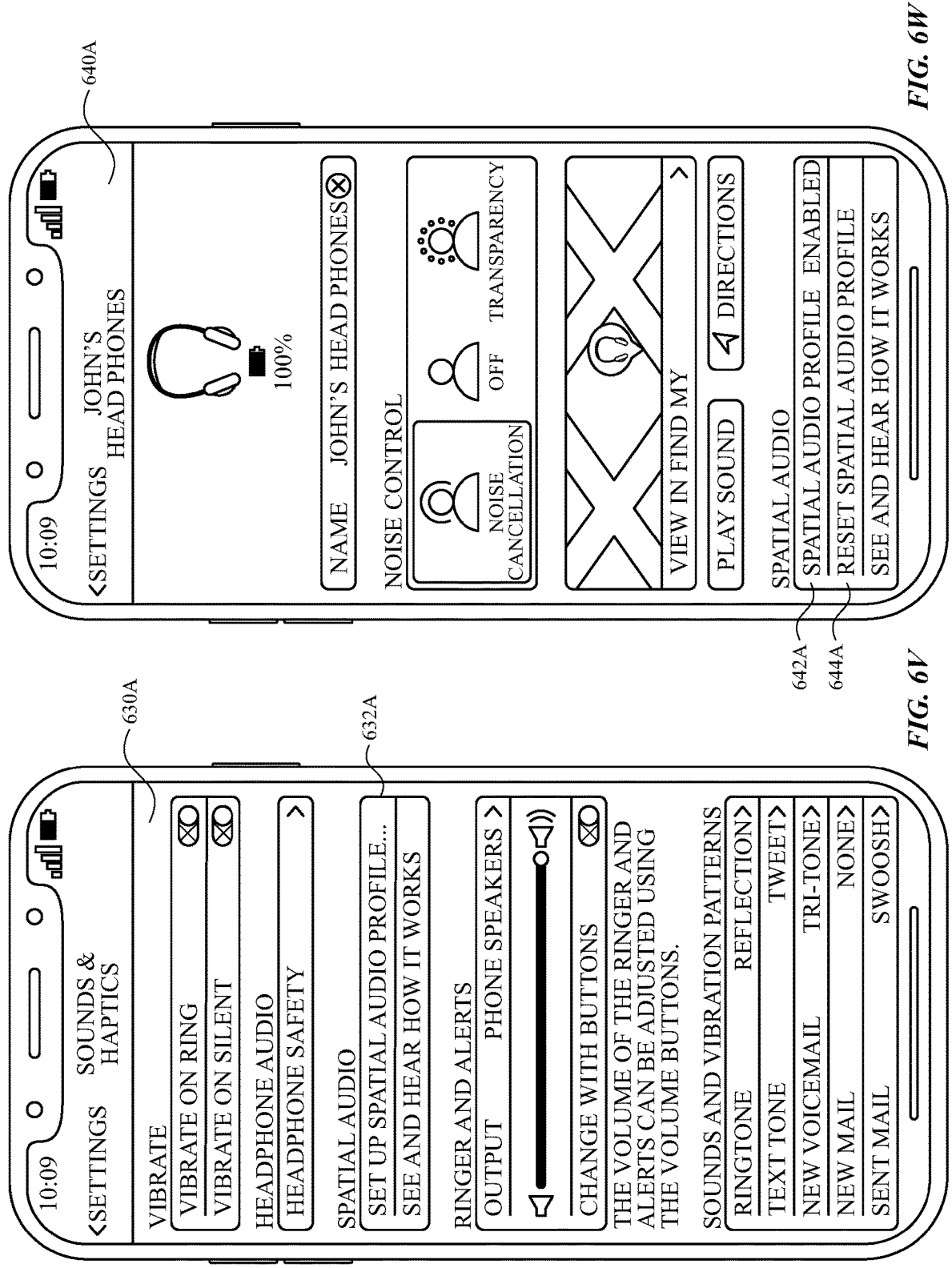

1000 ↘

---

1002
Receive, via the one or more input devices, a request to display system settings of the computer system.

---

1004
In response to receiving the request to display system settings of the computer system, display, via the display generation component, a system settings user interface that includes a plurality of selectable options associated with functions other than wireless accessory management, including:

1006
In accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management.

1008
In accordance with a determination that the wireless accessory does not meet the set of one or more connectivity criteria, displaying, via the display generation component, the system settings user interface without displaying the user interface object associated with settings for the wireless accessory.

*FIG. 10*

PROVIDING PERSONALIZED AUDIO

CROSS-REFERENCE TO RELATED APPLICATIONS

This application claims priority to U.S. Provisional Patent Application No. 63/349,108, entitled "PROVIDING PERSONALIZED AUDIO," filed on Jun. 5, 2022, the contents of which is hereby incorporated by reference in its entirety.

FIELD

The present disclosure relates generally to computer user interfaces, and more specifically to techniques for providing personalized audio.

BACKGROUND

Humans can locate sounds in three dimensions (above and below, front and rear, and side to side). Different techniques can be used to modify audio such that a listener perceives the audio that a device creates as coming from a particular point in space.

BRIEF SUMMARY

Some techniques for providing personalized audio using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for providing personalized audio. Such methods and interfaces optionally complement or replace other methods for providing personalized audio. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at a computer system that is in communication with one or more biometric sensors: initiating a spatial audio enrollment process for enrolling a spatial audio profile of a user of the computer system; during the spatial audio enrollment process for enrolling the spatial audio profile of the user, outputting feedback about positioning a portion of a head of the user in a field of view of the one or more biometric sensors; while the portion of the head of the user is in the field of view of the one or more biometric sensors, capturing, via the one or more biometric sensors, data about the portion of the head of the user; and after capturing the data about the portion of the head of the user, generating, using the data about the portion of the head of the user, a personalized spatial audio profile for the user.

An example method includes, at a computer system that is in communication with one or more audio output devices and one or more input devices: receiving, via the one or more input devices, a request to play audio; and in response to receiving the request to play audio, in accordance with a determination that a set of playback criteria are met, including a first playback criterion that is met when the audio is spatial audio and a second playback criterion that is met when a personalized spatial audio profile is available based on a spatial audio enrollment performed at an external electronic device that is different from the computer system, playing, via the one or more audio output devices, the audio as spatial audio using the personalized spatial audio profile that was enrolled at the external electronic device.

An example method includes, at a computer system that is in communication with a display generation component and one or more input devices: receiving, via the one or more input devices, a request to display system settings of the computer system; and in response to receiving the request to display system settings of the computer system, displaying, via the display generation component, a system settings user interface that includes a plurality of selectable options associated with functions other than wireless accessory management, including: in accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management; and in accordance with a determination that the wireless accessory does not meet the set of one or more connectivity criteria, displaying, via the display generation component, the system settings user interface without displaying the user interface object associated with settings for the wireless accessory.

Example non-transitory computer-readable storage media are described herein. An example non-transitory computer-readable storage medium stores one or more programs configured to be executed by one or more processors of a computer system that is in communication with one or more biometric sensors and includes instructions for: initiating a spatial audio enrollment process for enrolling a spatial audio profile of a user of the computer system; during the spatial audio enrollment process for enrolling the spatial audio profile of the user, outputting feedback about positioning a portion of a head of the user in a field of view of the one or more biometric sensors; while the portion of the head of the user is in the field of view of the one or more biometric sensors, capturing, via the one or more biometric sensors, data about the portion of the head of the user; and after capturing the data about the portion of the head of the user, generating, using the data about the portion of the head of the user, a personalized spatial audio profile for the user.

An example non-transitory computer-readable storage medium stores one or more programs configured to be executed by one or more processors of a computer system that is in communication with one or more audio output devices and one or more input devices and includes instructions for: receiving, via the one or more input devices, a request to play audio; and in response to receiving the request to play audio, in accordance with a determination that a set of playback criteria are met, including a first playback criterion that is met when the audio is spatial audio and a second playback criterion that is met when a personalized spatial audio profile is available based on a spatial audio enrollment performed at an external electronic device that is different from the computer system, playing, via the one or more audio output devices, the audio as spatial audio using the personalized spatial audio profile that was enrolled at the external electronic device.

An example non-transitory computer-readable storage medium stores one or more programs configured to be executed by one or more processors of a computer system that is in communication with a display generation component and one or more input devices and includes instructions for: receiving, via the one or more input devices, a request to display system settings of the computer system; and in response to receiving the request to display system settings of the computer system, displaying, via the display generation component, a system settings user interface that includes a plurality of selectable options associated with functions other than wireless accessory management, including: in accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management; and in accordance with a determination that the wireless accessory does not meet the set of one or more connectivity criteria, displaying, via the display generation component, the system settings user interface without displaying the user interface object associated with settings for the wireless accessory.

Example transitory computer-readable storage media are described herein. An example transitory computer-readable storage medium stores one or more programs configured to be executed by one or more processors of a computer system that is in communication with one or more biometric sensors and includes instructions for: initiating a spatial audio enrollment process for enrolling a spatial audio profile of a user of the computer system; during the spatial audio enrollment process for enrolling the spatial audio profile of the user, outputting feedback about positioning a portion of a head of the user in a field of view of the one or more biometric sensors; while the portion of the head of the user is in the field of view of the one or more biometric sensors, capturing, via the one or more biometric sensors, data about the portion of the head of the user; and after capturing the data about the portion of the head of the user, generating, using the data about the portion of the head of the user, a personalized spatial audio profile for the user.

An example transitory computer-readable storage medium stores one or more programs configured to be executed by one or more processors of a computer system that is in communication with one or more audio output devices and one or more input devices and includes instructions for: receiving, via the one or more input devices, a request to play audio; and in response to receiving the request to play audio, in accordance with a determination that a set of playback criteria are met, including a first playback criterion that is met when the audio is spatial audio and a second playback criterion that is met when a personalized spatial audio profile is available based on a spatial audio enrollment performed at an external electronic device that is different from the computer system, playing, via the one or more audio output devices, the audio as spatial audio using the personalized spatial audio profile that was enrolled at the external electronic device.

An example transitory computer-readable storage medium stores one or more programs configured to be executed by one or more processors of a computer system that is in communication with a display generation component and one or more input devices and includes instructions for: receiving, via the one or more input devices, a request to display system settings of the computer system; and in response to receiving the request to display system settings of the computer system, displaying, via the display generation component, a system settings user interface that includes a plurality of selectable options associated with functions other than wireless accessory management, including: in accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management; and in accordance with a determination that the wireless accessory does not meet the set of one or more connectivity criteria, displaying, via the display generation component, the system settings user interface without displaying the user interface object associated with settings for the wireless accessory.

Example computer systems are described herein. An example computer system is configured to communicate with one or more biometric sensors and includes: one or more processors; and memory storing one or more programs configured to be executed by the one or more processors, the one or more programs including instructions for: initiating a spatial audio enrollment process for enrolling a spatial audio profile of a user of the computer system; during the spatial audio enrollment process for enrolling the spatial audio profile of the user, outputting feedback about positioning a portion of a head of the user in a field of view of the one or more biometric sensors; while the portion of the head of the user is in the field of view of the one or more biometric sensors, capturing, via the one or more biometric sensors, data about the portion of the head of the user; and after capturing the data about the portion of the head of the user, generating, using the data about the portion of the head of the user, a personalized spatial audio profile for the user.

An example computer system is configured to communicate with one or more audio output devices and one or more input devices and includes: one or more processors; and memory storing one or more programs configured to be executed by the one or more processors, the one or more programs including instructions for: receiving, via the one or more input devices, a request to play audio; and in response to receiving the request to play audio, in accordance with a determination that a set of playback criteria are met, including a first playback criterion that is met when the audio is spatial audio and a second playback criterion that is met when a personalized spatial audio profile is available based on a spatial audio enrollment performed at an external electronic device that is different from the computer system, playing, via the one or more audio output devices, the audio as spatial audio using the personalized spatial audio profile that was enrolled at the external electronic device.

An example computer system is configured to communicate with a display generation component and one or more input devices and includes: one or more processors; and memory storing one or more programs configured to be executed by the one or more processors, the one or more programs including instructions for: receiving, via the one or more input devices, a request to display system settings of the computer system; and in response to receiving the request to display system settings of the computer system, displaying, via the display generation component, a system settings user interface that includes a plurality of selectable options associated with functions other than wireless accessory management, including: in accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management; and in accordance with a determination that the wireless accessory does not meet the set of one or more connectivity criteria, displaying, via the display generation component, the system settings user interface without displaying the user interface object associated with settings for the wireless accessory.

An example computer system is configured to communicate with one or more biometric sensors and includes means for initiating a spatial audio enrollment process for enrolling a spatial audio profile of a user of the computer system; means for, during the spatial audio enrollment process for enrolling the spatial audio profile of the user, outputting feedback about positioning a portion of a head of the user in a field of view of the one or more biometric sensors; means for, while the portion of the head of the user is in the field of view of the one or more biometric sensors, capturing, via the one or more biometric sensors, data about the portion of the head of the user; and means for, after capturing the data about the portion of the head of the user, generating, using the data about the portion of the head of the user, a personalized spatial audio profile for the user.

An example computer system is configured to communicate with one or more audio output devices and one or more input devices and includes means for receiving, via the one or more input devices, a request to play audio; and means for, in response to receiving the request to play audio, in accordance with a determination that a set of playback criteria are met, including a first playback criterion that is met when the audio is spatial audio and a second playback criterion that is met when a personalized spatial audio profile is available based on a spatial audio enrollment performed at an external electronic device that is different from the computer system, playing, via the one or more audio output devices, the audio as spatial audio using the personalized spatial audio profile that was enrolled at the external electronic device.

An example computer system is configured to communicate with a display generation component and one or more input devices and includes means for receiving, via the one or more input devices, a request to display system settings of the computer system; and means for, in response to receiving the request to display system settings of the computer system, displaying, via the display generation component, a system settings user interface that includes a plurality of selectable options associated with functions other than wireless accessory management, including: in accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management; and in accordance with a determination that the wireless accessory does not meet the set of one or more connectivity criteria, displaying, via the display generation component, the system settings user interface without displaying the user interface object associated with settings for the wireless accessory.

Example computer program products are described herein. An example computer program product includes one or more programs configured to be executed by one or more processors of a computer system that is in communication with one or more biometric sensors, the one or more programs including instructions for: initiating a spatial audio enrollment process for enrolling a spatial audio profile of a user of the computer system; during the spatial audio enrollment process for enrolling the spatial audio profile of the user, outputting feedback about positioning a portion of a head of the user in a field of view of the one or more biometric sensors; while the portion of the head of the user is in the field of view of the one or more biometric sensors, capturing, via the one or more biometric sensors, data about the portion of the head of the user; and after capturing the data about the portion of the head of the user, generating, using the data about the portion of the head of the user, a personalized spatial audio profile for the user.

An example computer program product includes one or more programs configured to be executed by one or more processors of a computer system that is in communication with one or more audio output devices and one or more input devices, the one or more programs including instructions for: receiving, via the one or more input devices, a request to play audio; and in response to receiving the request to play audio, in accordance with a determination that a set of playback criteria are met, including a first playback criterion that is met when the audio is spatial audio and a second playback criterion that is met when a personalized spatial audio profile is available based on a spatial audio enrollment performed at an external electronic device that is different from the computer system, playing, via the one or more audio output devices, the audio as spatial audio using the personalized spatial audio profile that was enrolled at the external electronic device.

An example computer program product includes one or more programs configured to be executed by one or more processors of a computer system that is in communication with a display generation component and one or more input devices, the one or more programs including instructions for: receiving, via the one or more input devices, a request to display system settings of the computer system; and in response to receiving the request to display system settings of the computer system, displaying, via the display generation component, a system settings user interface that includes a plurality of selectable options associated with functions other than wireless accessory management, including: in accordance with a determination that a wireless accessory meets a set of one or more connectivity criteria, displaying, via the display generation component, the system settings user interface with a user interface object associated with settings for the wireless accessory, wherein the user interface object associated with settings for the wireless accessory is displayed concurrently with the plurality of selectable options associated with functions other than wireless accessory management; and in accordance with a determination that the wireless accessory does not meet the set of one or more connectivity criteria, displaying, via the display generation component, the system settings user interface without displaying the user interface object associated with settings for the wireless accessory.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing personalized audio, thereby increasing the effectiveness, efficiency, and user satisfaction with such devices. Such methods and interfaces may complement or replace other methods for providing personalized audio.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 10 is a flowchart of a process for managing settings in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing personalized audio. Such techniques can reduce the cognitive burden on a user who access audio profiles, thereby enhancing productivity. Further, such techniques can reduce processor and battery power otherwise wasted on redundant user inputs.

Figure 6A:
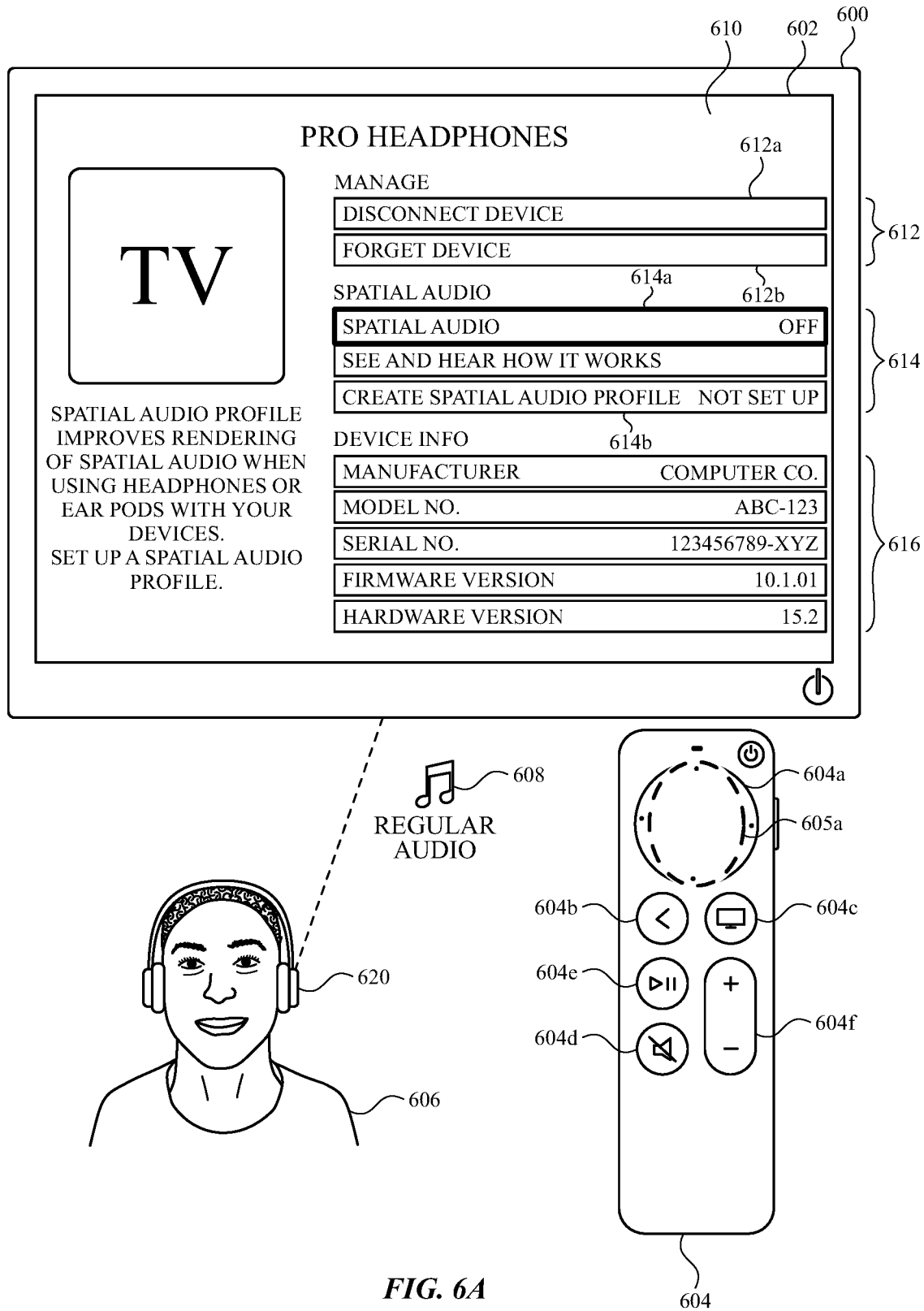
FIGS. 6A-6W illustrate exemplary user interfaces for providing audio in accordance with some embodiments.
Figure 7:
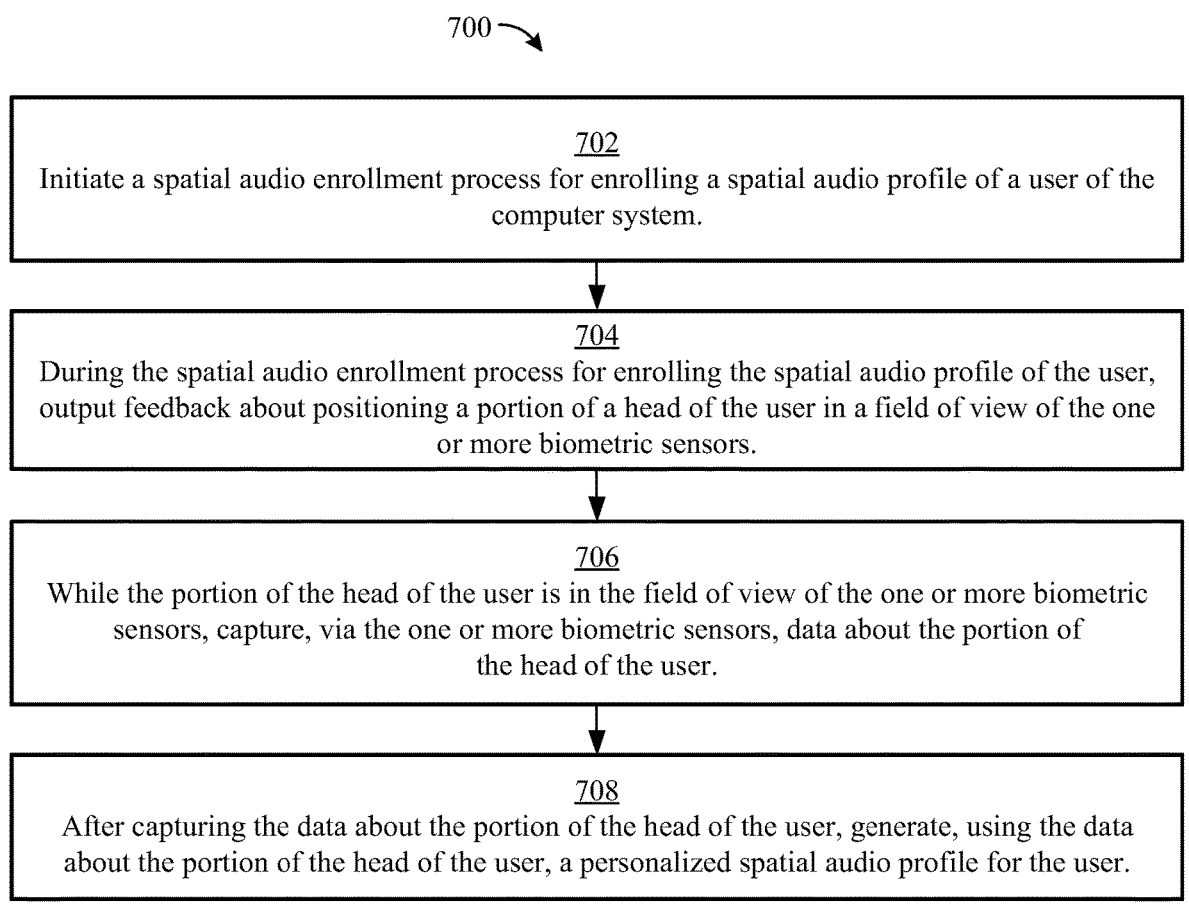
FIG. 7 is a flowchart of a process for enrolling a spatial audio profile in accordance with some embodiments.
Figure 8:
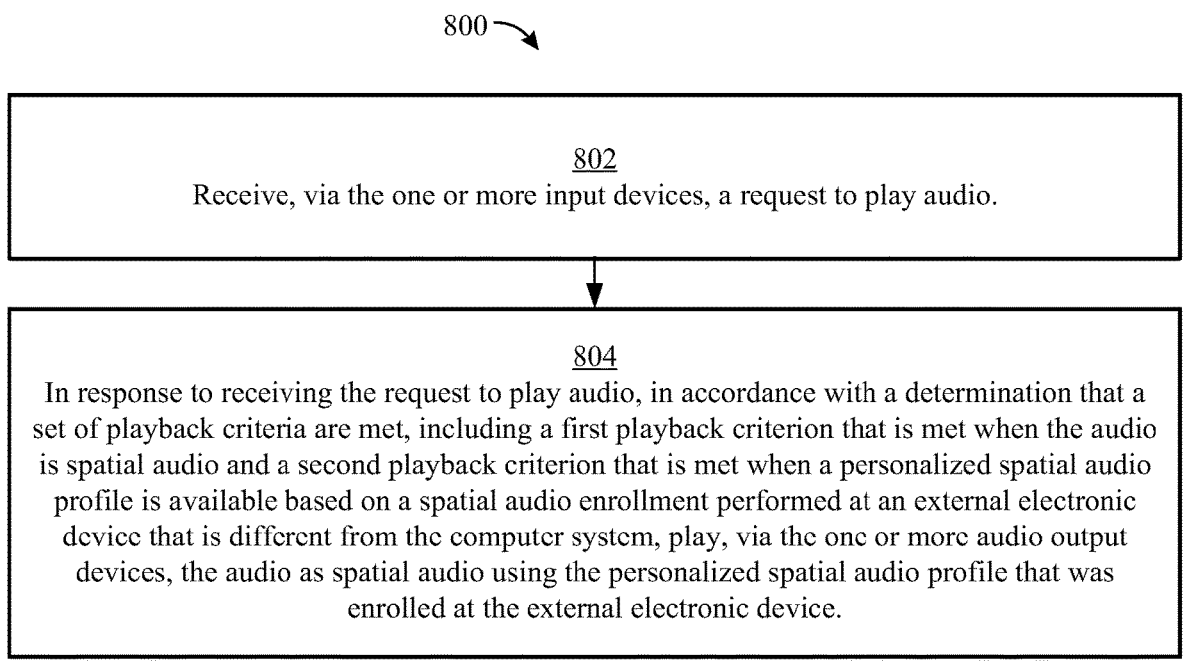
FIG. 8 is a flowchart of a process for synchronizing spatial audio profiles in accordance with some embodiments.

Below, FIGS. 1A-1B, 2, 3, 4A-4B, and 5A-5B provide a description of exemplary devices for performing the techniques for providing personalized audio. FIGS. 6A-6W illustrate exemplary user interfaces for providing audio. FIG. 7 is a flow diagram illustrating methods of enrolling a spatial audio profile in accordance with some embodiments. FIG. 8 is a flow diagram illustrating methods of synchronizing spatial audio profiles in accordance with some embodiments. The user interfaces in FIGS. 6A-6W are used to illustrate the processes described below, including the processes in FIGS. 7 and 8. FIGS. 9A-9F illustrate exemplary user interfaces for managing settings. FIG. 10 is a flow diagram illustrating methods of managing settings in accordance with some embodiments. The user interfaces in FIGS. 9A-9F are used to illustrate the processes described below, including the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
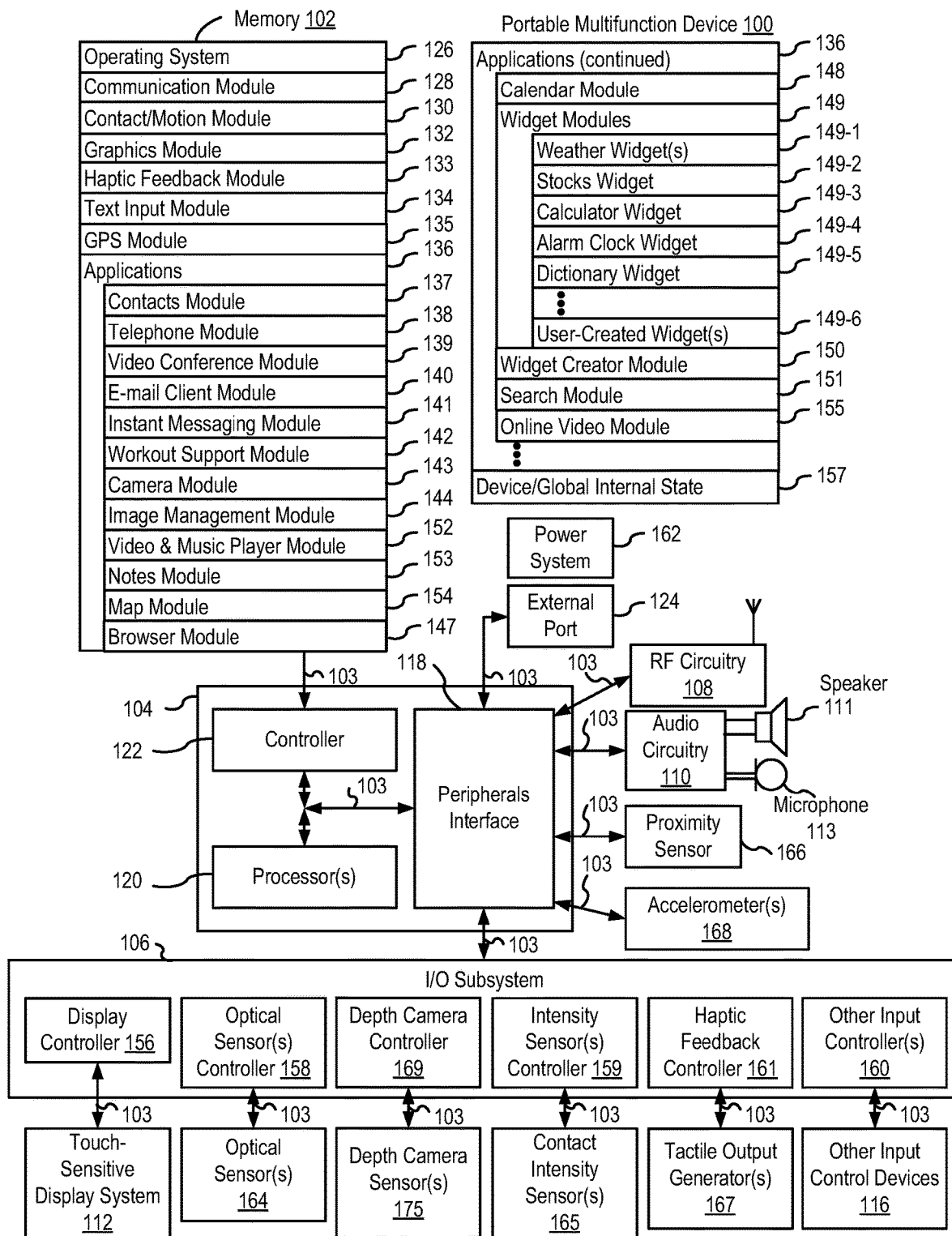
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
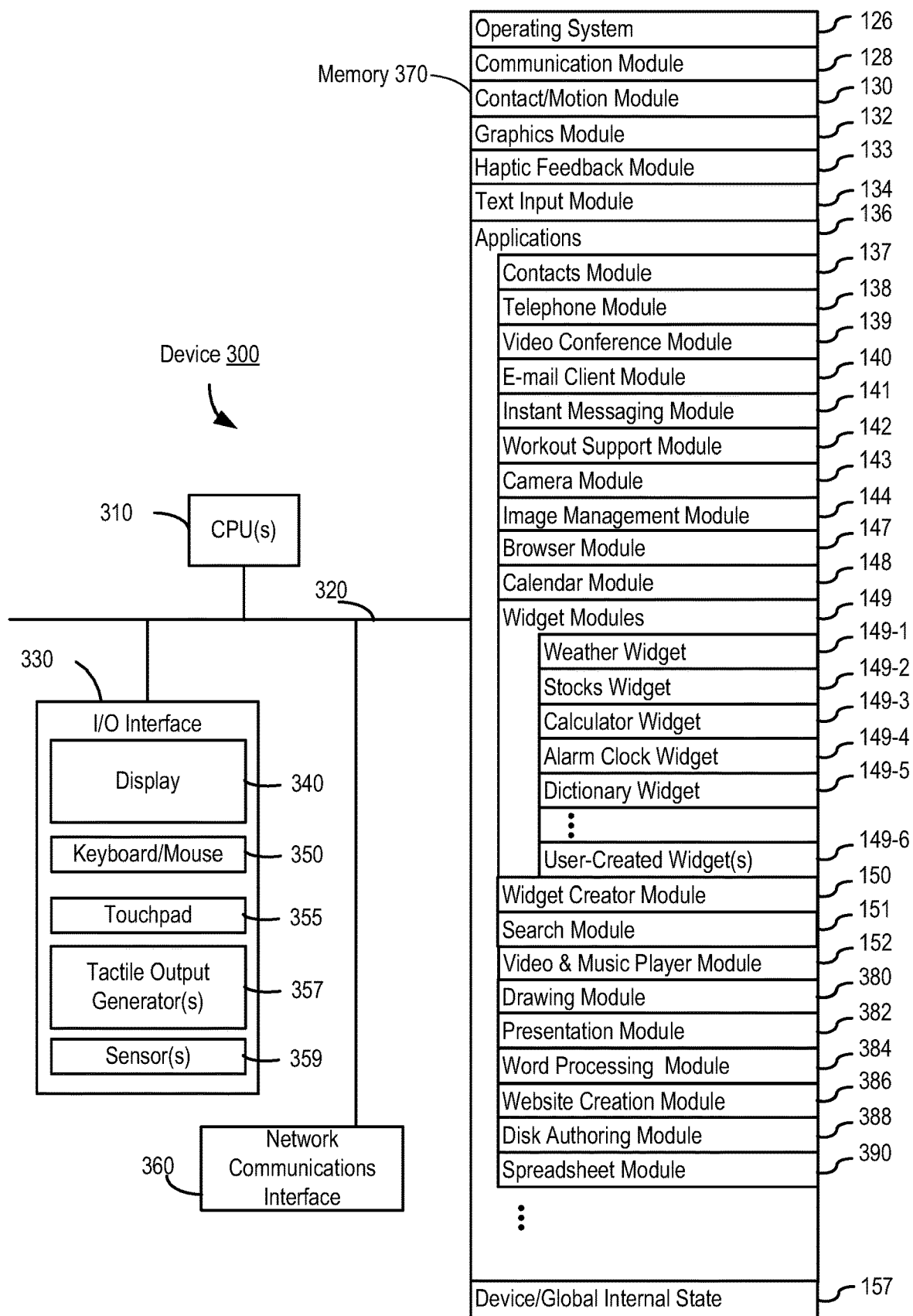
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138 module, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
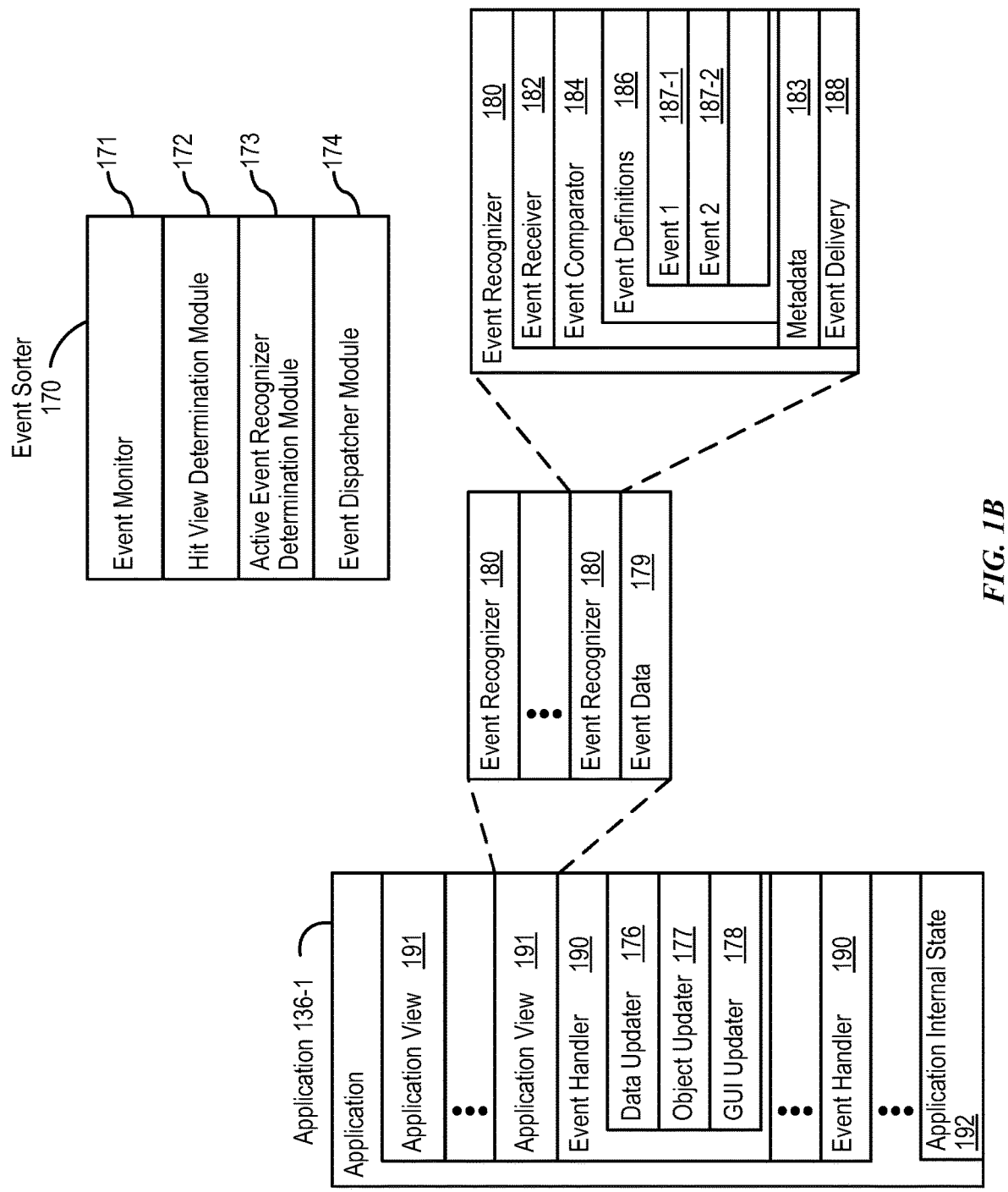
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
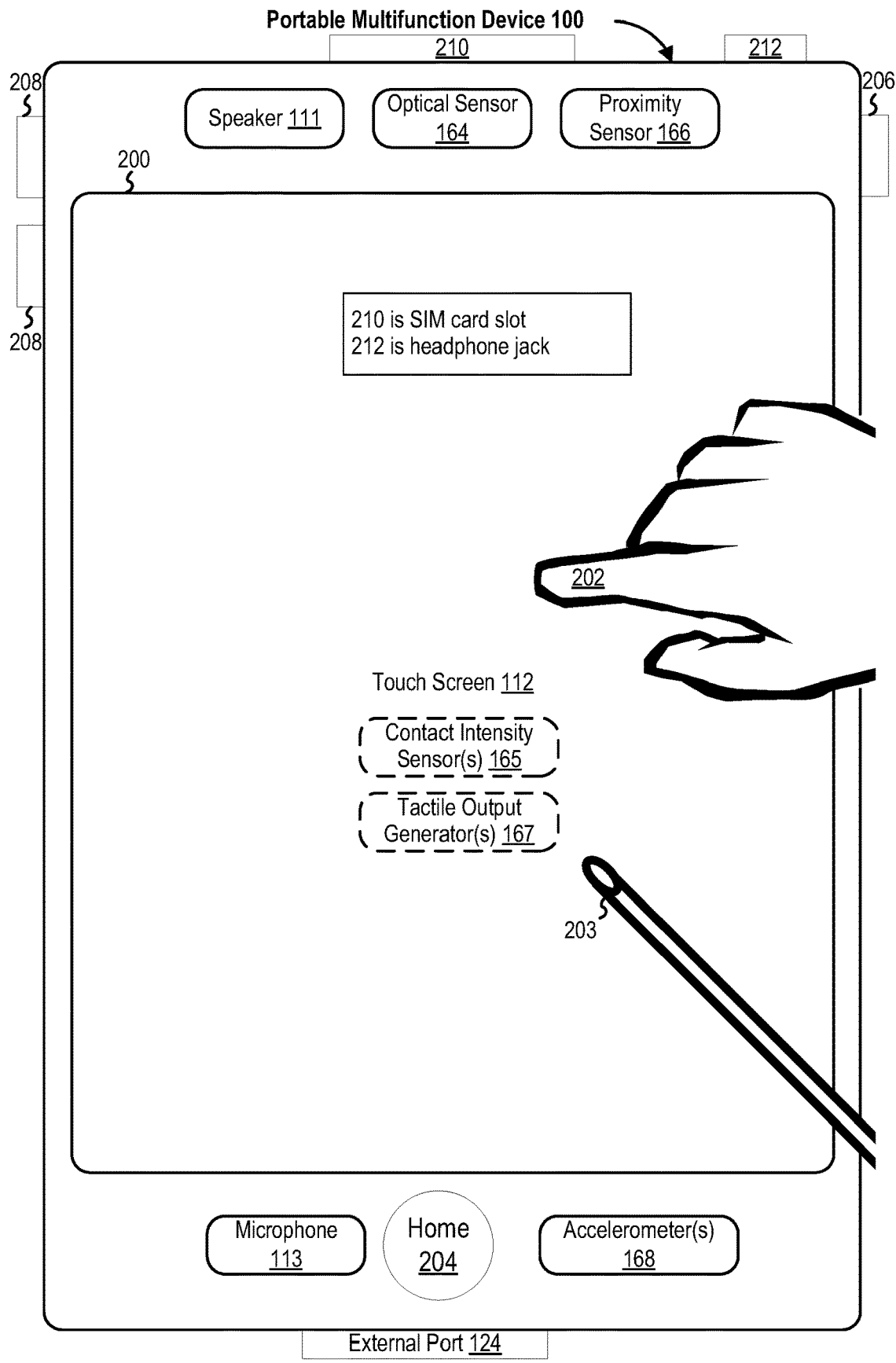
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
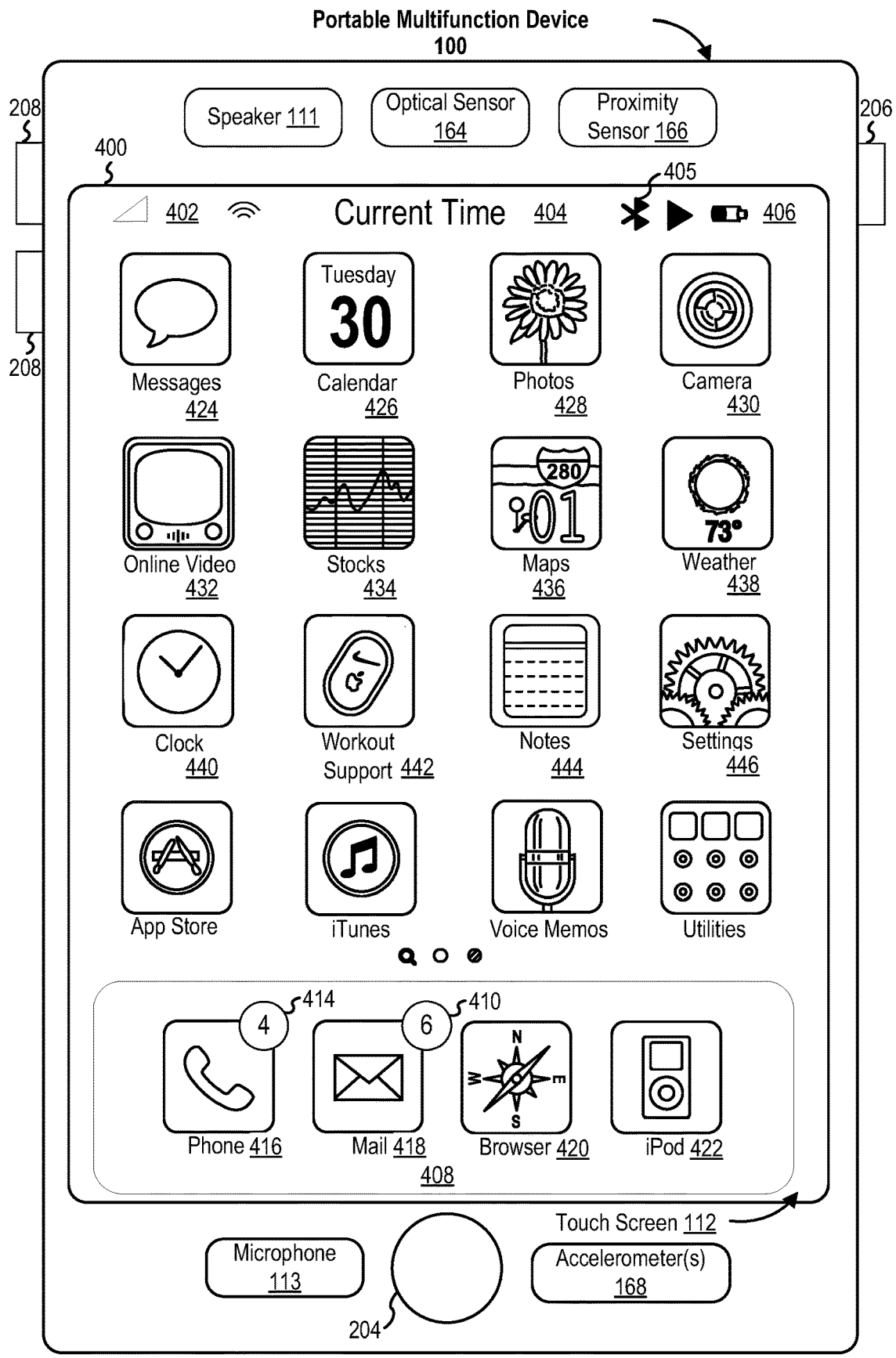
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
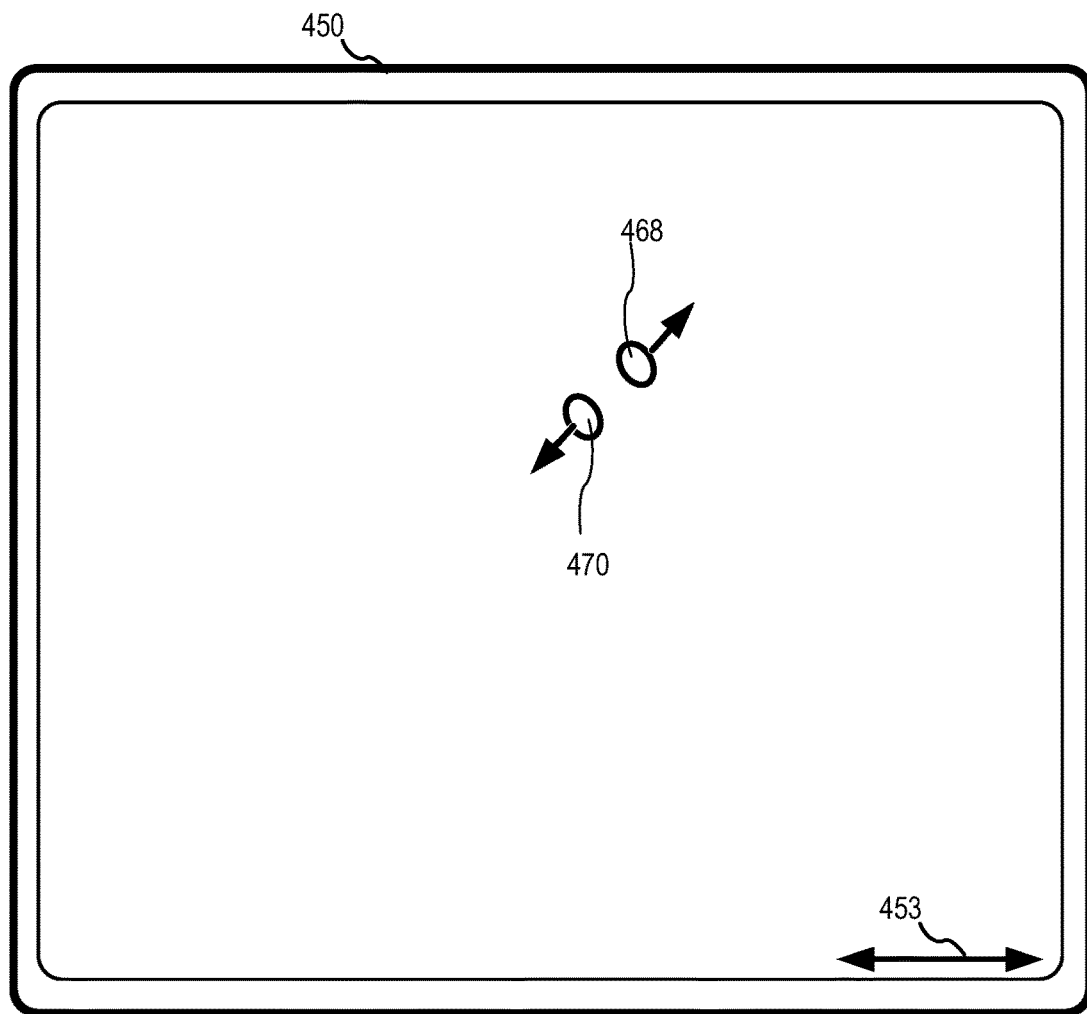
FIG. 4B illustrates an exemplary user interface for a multifunction device with a touch-sensitive surface that is separate from the display in accordance with some embodiments.
Figure 4B:
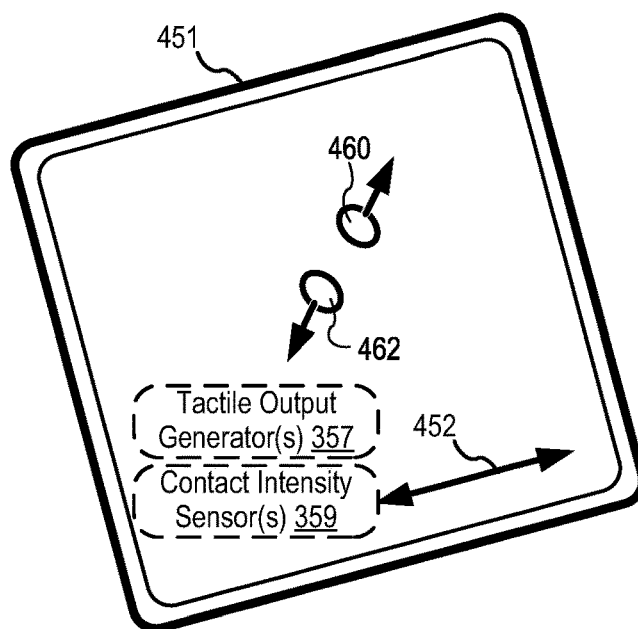

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
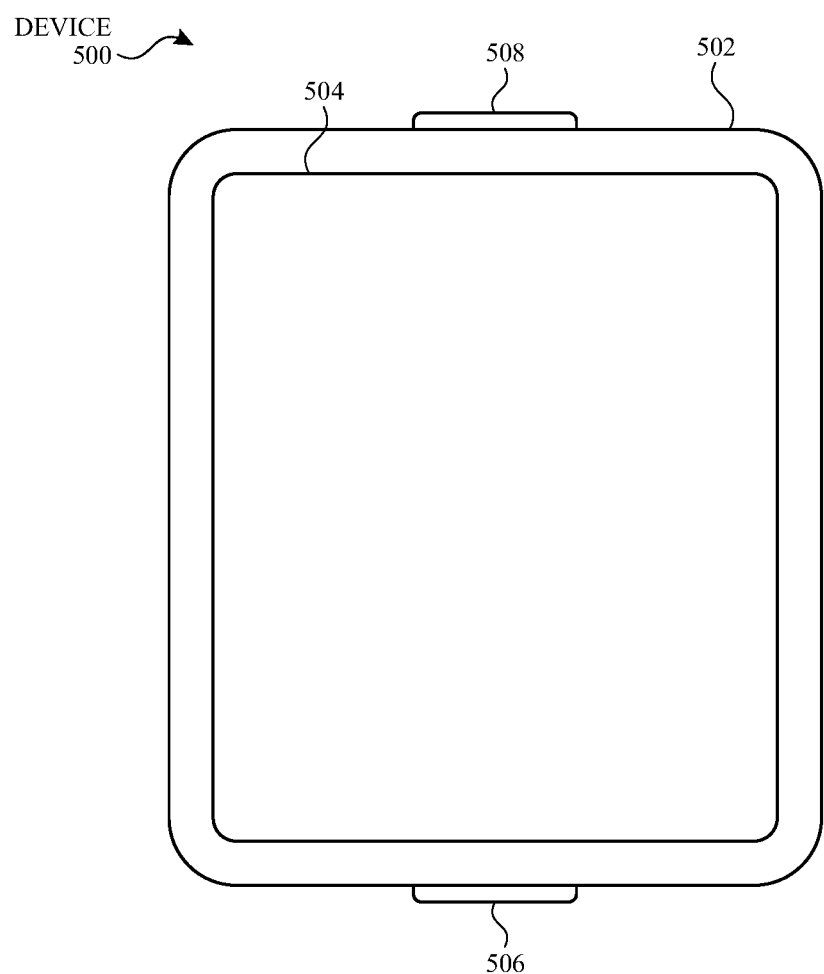
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
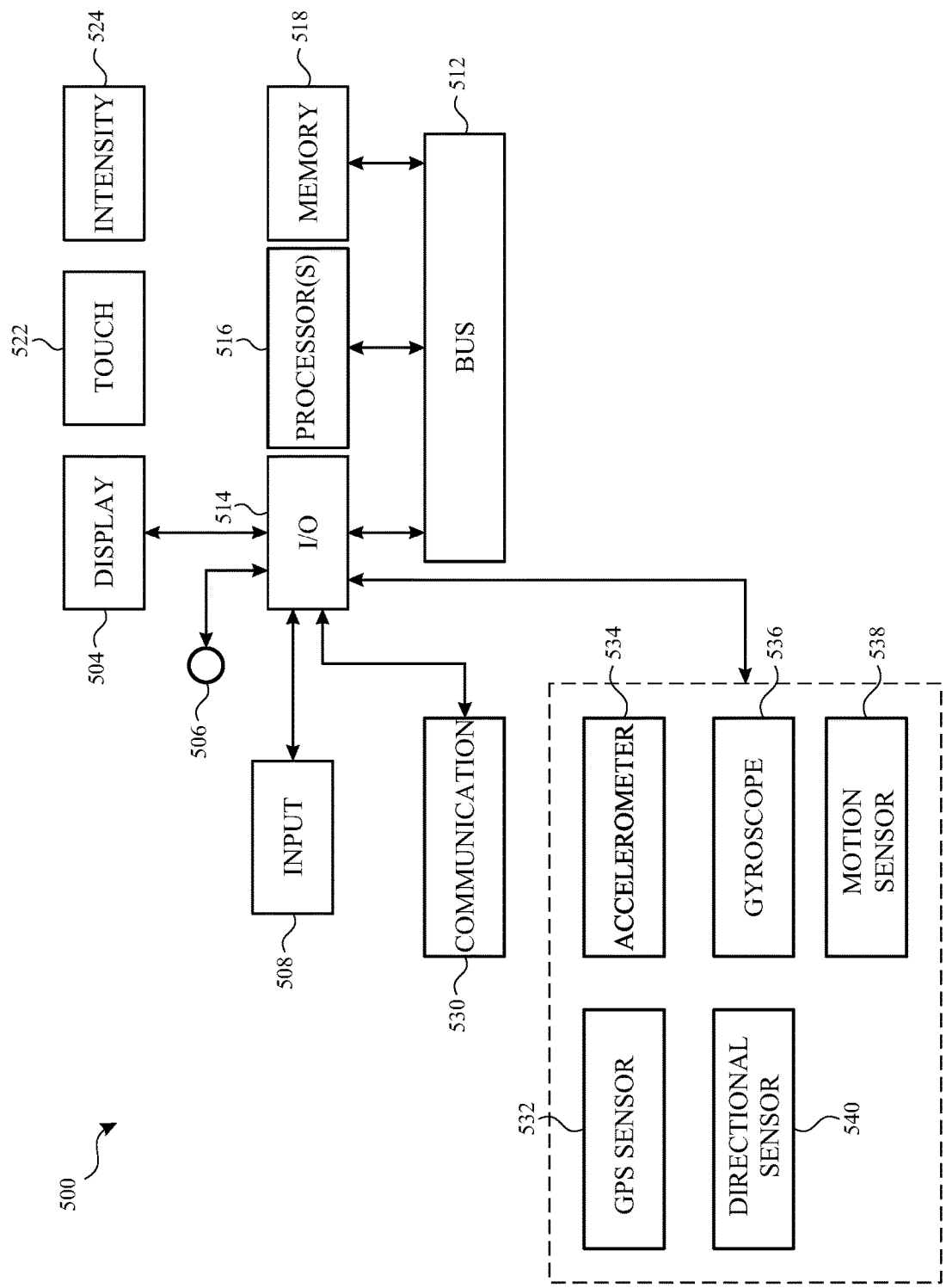
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7), 800 (FIG. 8), and 1000 (FIG. 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6W illustrate exemplary user interfaces for providing audio, in accordance with some embodiments. The user interfaces in these figures are used to illustrate the processes described below, including the processes in FIGS. 7-8.

Generally, implementation of various techniques for providing audio described below relate to spatial audio (e.g., binaural audio), and in particular, to spatial audio profiles. In some embodiments, spatial audio is audio that has been modified using an audio effect (e.g., 3D audio effect) to provide virtual placement of sound in a three-dimensional space such that two audio channels (e.g., of stereo audio) resemble directional and/or spatial sounds arriving in the ear-canal. An effective spatial sound reproduction can render sounds such that the listener perceives the sound as coming from a location within a soundscape external to the listener's head, just as the listener would experience the sound if encountered in the real world.

In some embodiments, spatial audio is applied using one or more head-related transfer functions (HRTF) of a spatial audio profile. In some embodiments, an HRTF is a function dictating the manner in which a sound is received by an ear from a particular point in space. Because geometry of a user's ear (e.g., the ear of a listener), and in particular the outer ear (pinna), impacts how sound arrives from a sound source to the user's eardrum, HRTFs typically account for anatomical geometry.

In some embodiments, a spatial audio profile is used to convert regular audio (e.g., audio that has not been modified using a 3D audio effect) to spatial audio. In some embodiments, a device, such as device 600 (described below) provides spatial audio using a default spatial audio profile. In some embodiments, the default spatial audio profile is a generic spatial audio profile having a set of default settings that, in some instances, are configured to best suit a typical listener, and accordingly, includes one or more HRTFs directed to an anatomically typical ear. In some embodiments, device 600 uses one or more personalized spatial audio profiles. A personalized spatial audio profile is a spatial audio profile that has been customized for a respective user. Accordingly, the personalized spatial audio profile may include one more HRTFs that account for the specific anatomical geometry of the user (e.g., geometry of user's ear).

In the examples described in FIGS. 6A-6W, device 600 (e.g., a device having one or more features of device 100, 300, and/or 500) causes display, on display 602, of the user interfaces described below. In some embodiments, display 602 is an integrated part of device 600. In some embodiments, device 600 is a separate digital media player (e.g., set top box) that is in communication (e.g., wireless or wired) with display 602.

In some embodiments, device 600 is connected to a remote control 604, which is configured to transmit data (e.g., via RF communication, via Bluetooth, and/or via infrared) to device 600 based on user input (e.g., voice input and/or tactile input) detected at remote control 604. Remote control 604 includes a selection region 604a, which includes a touch-sensitive surface for detecting tap, press, and/or swipe gestures, a menu button 604b, a television button 604c, a mute button 604d, a play/pause button 604e, and volume control buttons 604f.

At FIG. 6A, device 600 (e.g., a smart television) is causing display, on display 602 (e.g., the integrated screen of device 600), of settings interface 610. In some embodiments, settings interface 610 corresponds to headphones 620 (e.g., "Pro Headphones") worn by user 606. Accordingly, settings interface 610 may be used to modify one or more settings corresponding to headphones 620.

Settings interface 610 includes manage portion 612, spatial audio portion 614, and device info 616. Manage portion 612 includes various options for managing connectivity of headphones 620. For example, a disconnect affordance 612a may be selected to disconnect headphones 620 from device 600. As another example, remove affordance 612b may be selected to cause device 600 to remove headphones 620 from a list of known devices. Device info 616 includes information describing one or more attributes (e.g., manufacturer and/or model) of headphones 620.

Spatial audio portion 614 includes various options for managing audio (e.g., binaural audio, multi-channel audio, and/or spatial audio) of headphones 620. For example, enable option 614a, when selected, activates (or deactivates) use of spatial audio on headphones 920. As shown in FIG. 6A, enable option 614a is in an "OFF" (e.g., disabled and/or not enabled) state. Accordingly, audio 608 provided from device 600 to headphones 620 is regular audio, or audio that has not been modified using 3D sound effects, such as spatial audio.

Figure 6B:
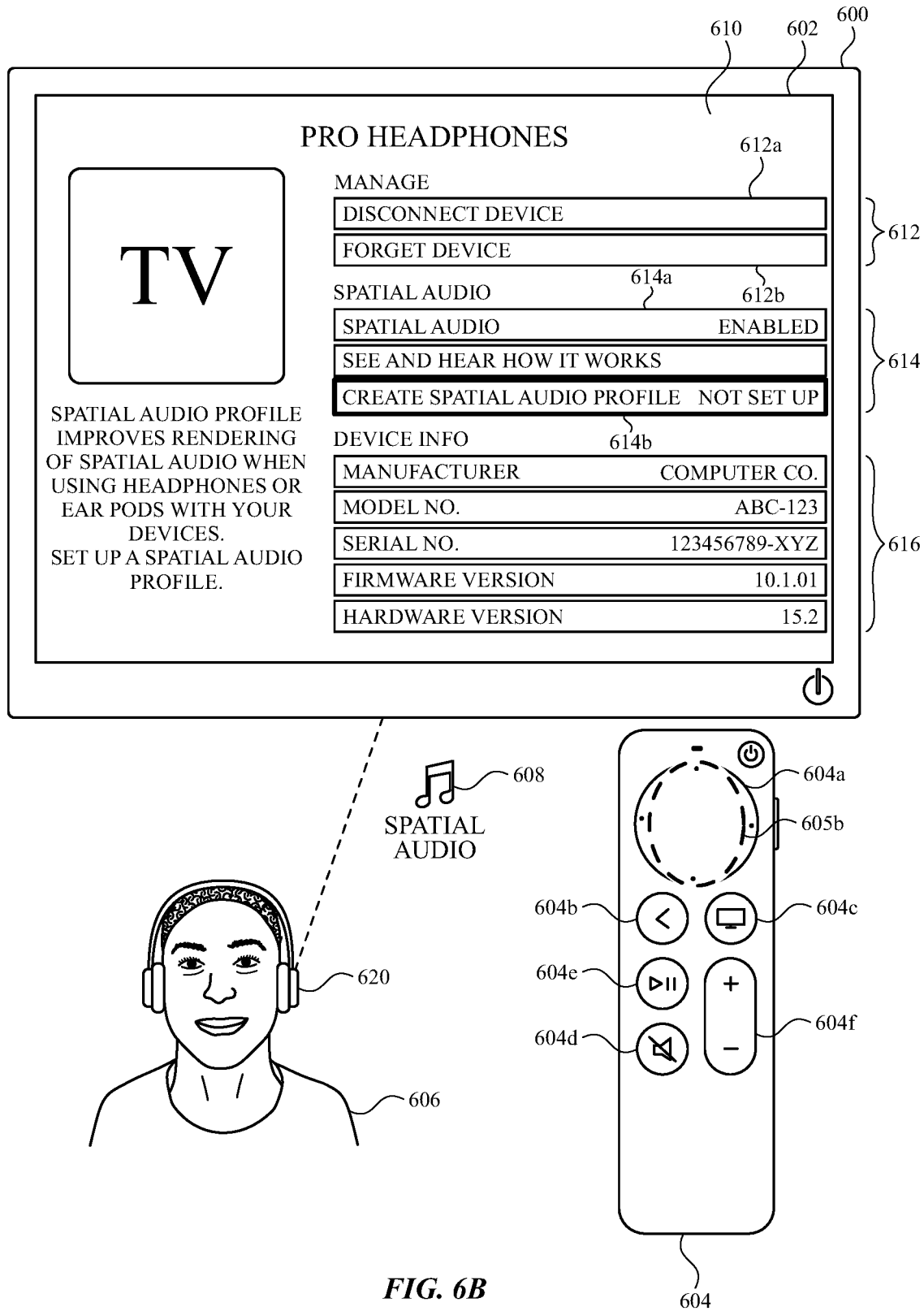

While device 600 causes display of settings interface 610 including a focus on enable option 614a, remote control 604 detects activation of selection region 604a via input 605a corresponding to a selection of enable option 614a (and a request to enable spatial audio for headphones 620). Remote control 604 transmits an indication of input 605a to device 600, and in response to receiving the indication of input 605a, device 600 enables spatial audio for headphones 620. As shown in FIG. 6B, as a result of enabling spatial audio for headphones 620, enable option 614a is in an "ON" (e.g., enabled and/or not disabled) state, and audio 608 provided from device 600 to headphones 620 is spatial audio.

In some embodiments, if use of personalized spatial audio profiles is disabled (or a profile for a particular user is not available), device 600 provides spatial audio according to a default user profile. In the example shown in FIG. 6B, no personalized spatial audio profile is available for user 606. Accordingly, spatial audio is provided using a default spatial audio profile.

In some embodiments, spatial audio portion 614 includes setup affordance 614b which, when selected, initiates a process for providing (e.g., enrolling, retrieving, and/or generating) a personalized spatial audio profile for a user (e.g., user 606). For example, while device 600 causes display of home interface 610 including a focus on setup affordance 614b, remote control 604 detects activation of selection region 604a via input 605b corresponding to a selection of setup affordance 614b (and a request to initiate a process for providing a personalized spatial audio profile). Remote control 604 transmits an indication of input 605b to device 600, and in response to receiving the indication of input 605b, device 600 initiates a process for providing a spatial audio profile.

Figure 6C:
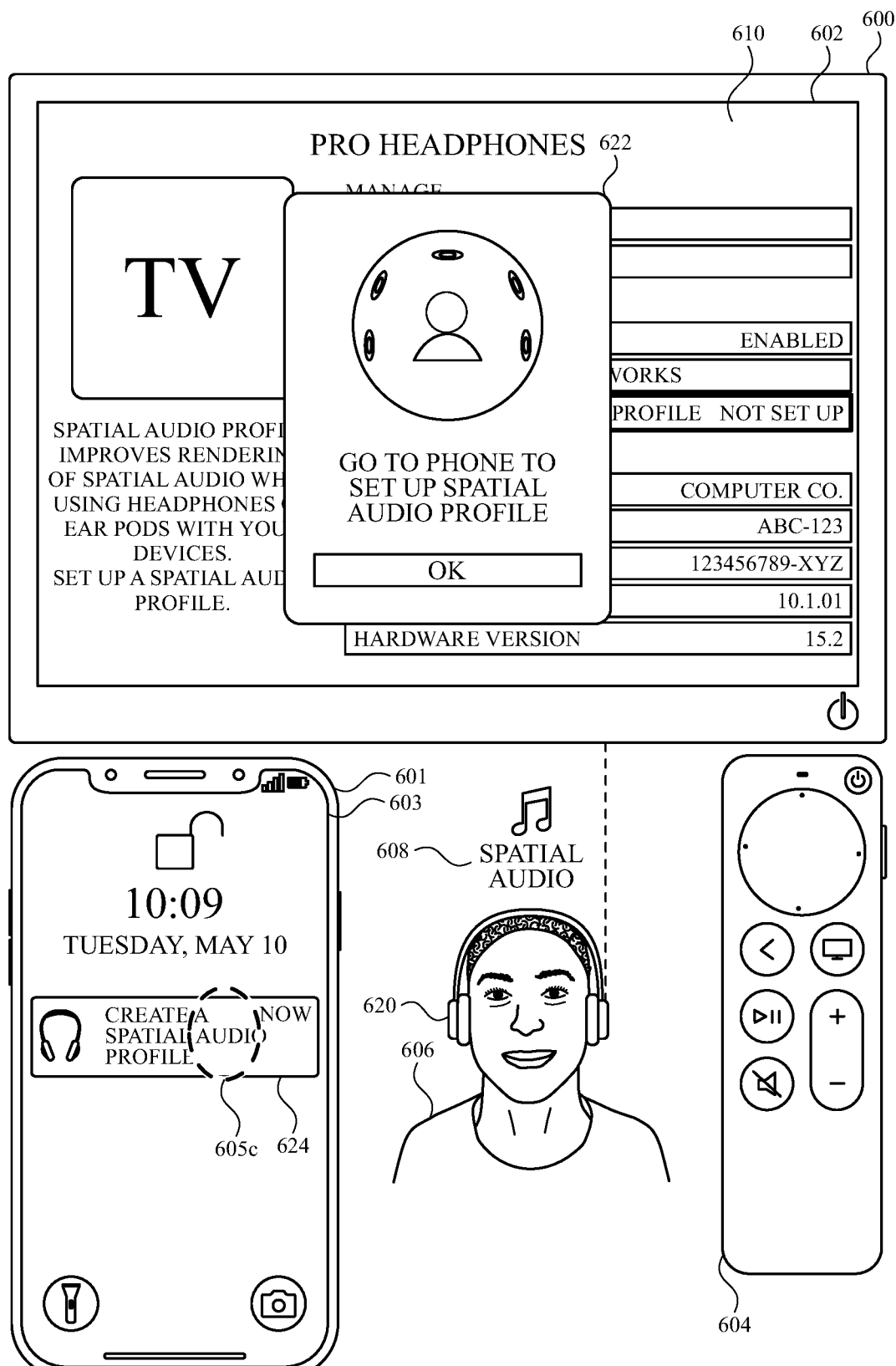

In some embodiments, the process for providing a spatial audio profile is performed on device 600. In some embodiments, the process for providing a spatial audio profile is performed on an external device (e.g., mobile device and/or desktop device) of user 606. For example, with reference to FIG. 6C, in some embodiments, in response to detecting selection of setup affordance 614b, device 600 displays notification 622, notifying a user that the process for providing a spatial audio profile is to be performed on another device. Further in response to detection selection of setup affordance 614 (e.g., via a tap input 605c or other selection input directed to setup affordance 614), device 600 causes device 601 to display, on display 603, notification 624. Notification 624, when selected, initiates a process (e.g., on device 601) for providing a personalized spatial audio profile.

In some embodiments, a process for providing a spatial audio profile is initiated in other manners. By way of example, in FIG. 6D, device 601 detects user 606 putting on headphones 620 when no personalized spatial audio provide has been provided for the user. In response, device 601 displays notification 626 (e.g., overlaid on home interface 618), prompting a user to perform a process to provide a spatial audio profile. Profile affordance 628 of notification 626, when selected (e.g., via tap input 605d or other selection input directed to profile affordance 628), causes device 601 to initiate a process for providing a personalized spatial audio profile.

Figure 6D:
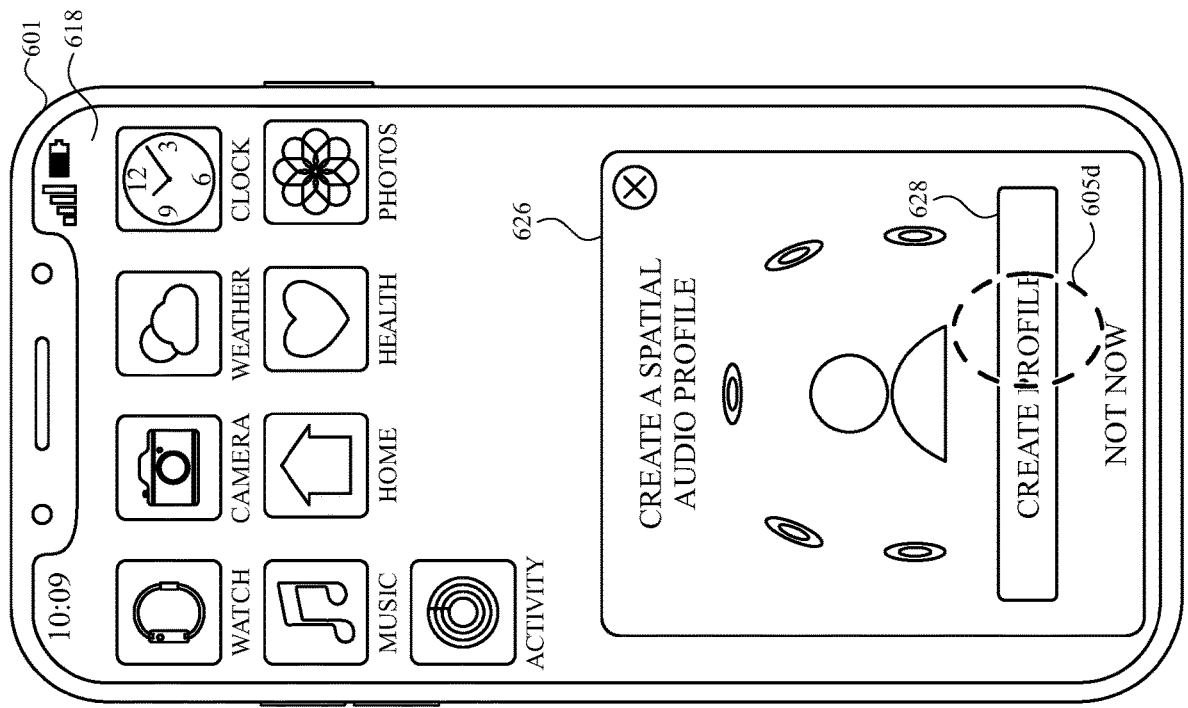
Figure 6D:
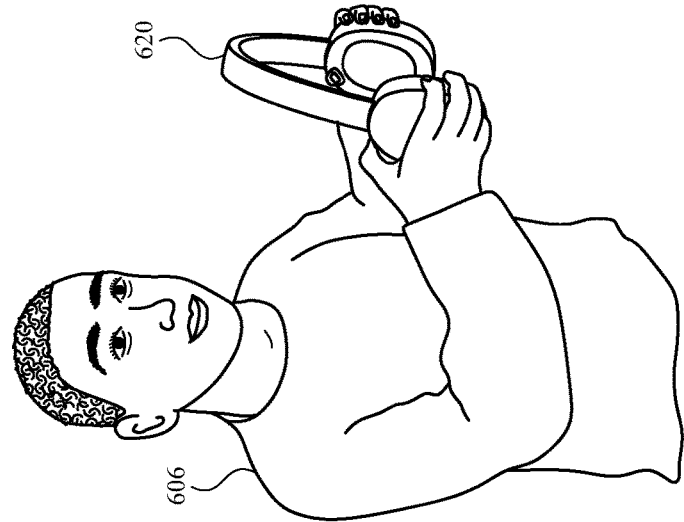

In some embodiments, as illustrated in FIG. 6D, device 601 prompts a user (e.g., using notification 626 and/or one or more other notifications) to perform a process to provide a spatial audio profile in response to other detected conditions. For example, in some embodiments, device 601 prompts a user in response to detecting that a pair of headphones (e.g., headphones 620) is within a communicable range and/or within a threshold distance. As another example, in some embodiments, device 601 prompts a user in response to a case (e.g., storage case and/or charging case) for a pair of headphones having a particular state (e.g., open and/or not fully closed).

Figure 6F:
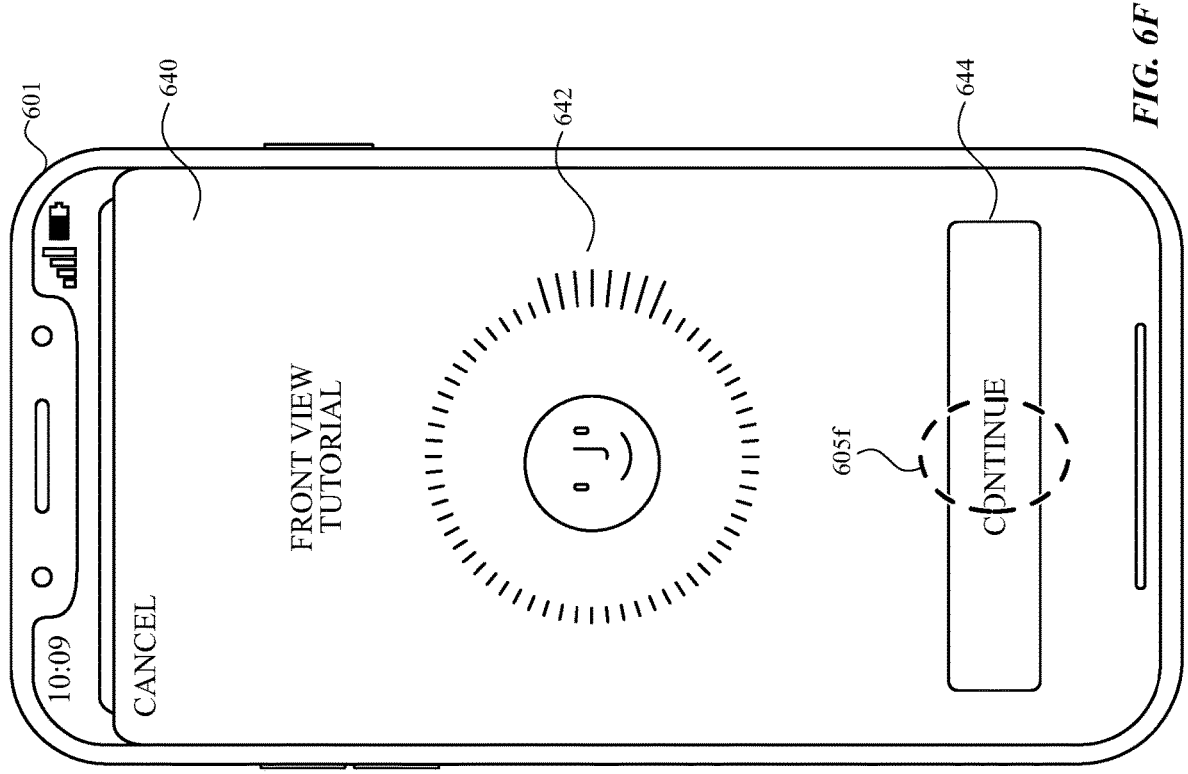
Figure 6E:
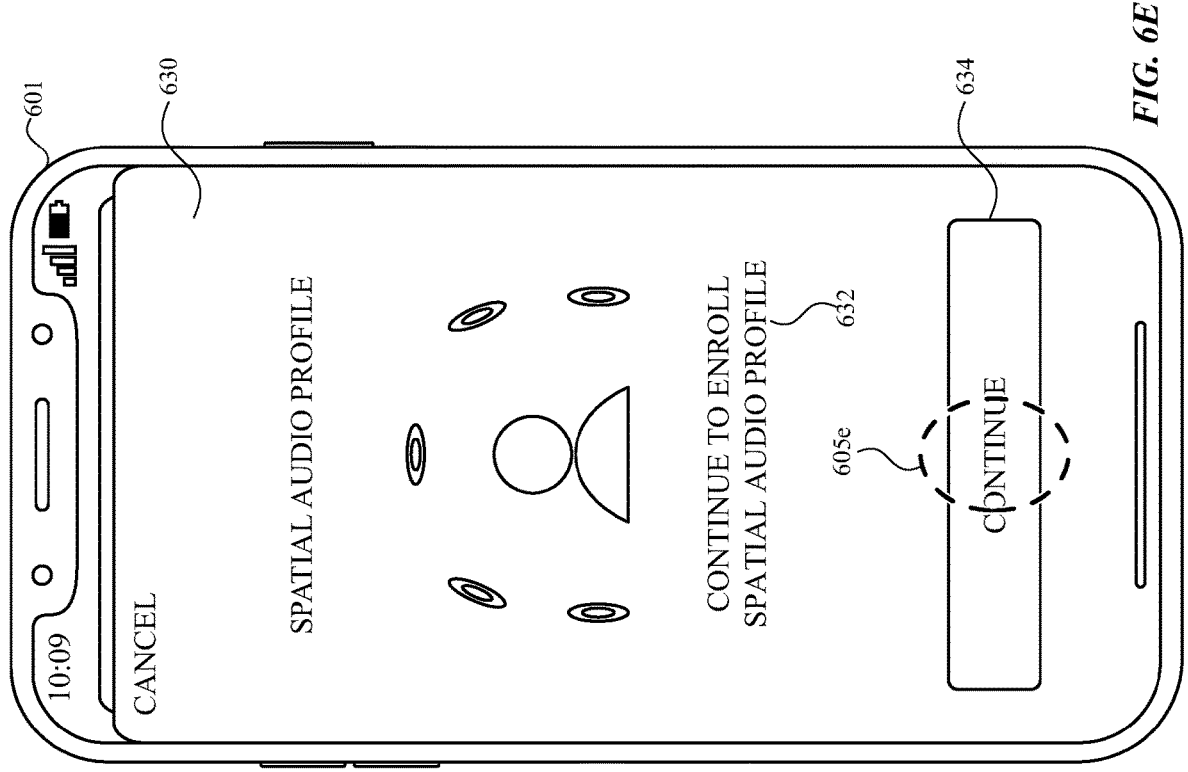

With reference to FIG. 6E, in response to initiating a process to provide a personalized spatial audio profile (e.g., in response to selection of notification 624 (FIG. 6C) or in response to selection of notification 628 (FIG. 6D)), device 601 displays user interface 630. User interface 630 includes information 632, describing one or more aspects of the process for providing a personalized spatial audio profile. As an example, in some embodiments, information 632 describes one or more benefits of spatial audio. As another example, in some embodiments, information 632 describes one or more steps of the process for providing a personalized spatial audio profile. While displaying user interface 630, device 601 detects tap gesture 605e corresponding to a selection of continue affordance 634 or other selection input directed to continue affordance 634. As shown in FIG. 6F, in response to detecting tap gesture 605e (or other selection input directed to continue affordance 634), device 600 displays tutorial interface 640.

As shown in FIG. 6F, tutorial interface 640 includes an instructional animation 642 (e.g., a tutorial and/or example) that indicates to the user how to properly position and/or move their face and/or head relative to a biometric sensor of device 601 such that device 601 can gather biometric data (e.g., data describing anatomical geometry of the user's ears, face, and/or head) for use to provide a personalized spatial audio profile. For example, in some embodiments, instructional animation 642 instructs a user to move their head side-to-side and/or in a circular motion such that device 601 can gather biometric data corresponding to a shape of the user's face, head, and/or ears (e.g., front of ears and/or side of ears). While displaying tutorial interface 640, device 601 detects tap gesture 605f corresponding to a selection of continue affordance 644 (or other selection input directed to continue affordance 644). As shown in FIG. 6G, in response to detecting tap gesture 605f (or other selection input directed to continue affordance 644), device 600 displays front profile enrollment interface 646.

At FIG. 6G, front profile enrollment interface 646 facilitates device 601 capturing biometric data corresponding to various aspects of a user's front profile (e.g., attributes of head, face, and/or ears from a front perspective). Front profile enrollment interface 646 includes enrollment portion 648. Enrollment portion 648 includes progress indicator 648a and user image 648b. Progress indicator 648a indicates the extent to which biometric data of the user has been successfully captured. User image 648b is an image or video of the user captured by one or more cameras of device 601. For example, user image 648b optionally is a live preview of the image data captured by one or more cameras (e.g., a digital viewfinder) that updates continuously as the field of view of the camera and/or the field of view's contents change. As a user (e.g., user 606) positions and/or moves their face in the manner set forth by instructional animation 642, device 601 captures biometric data corresponding to user 606 and, optionally, changes one or more portions of progress indicator 648a, indicating which positions and/or movement of the user's face and/or head have been successfully captured. Once enrollment of the user's head is complete, device 601 displays tutorial interface 650, as shown in FIG. 6H.

Figure 6H:
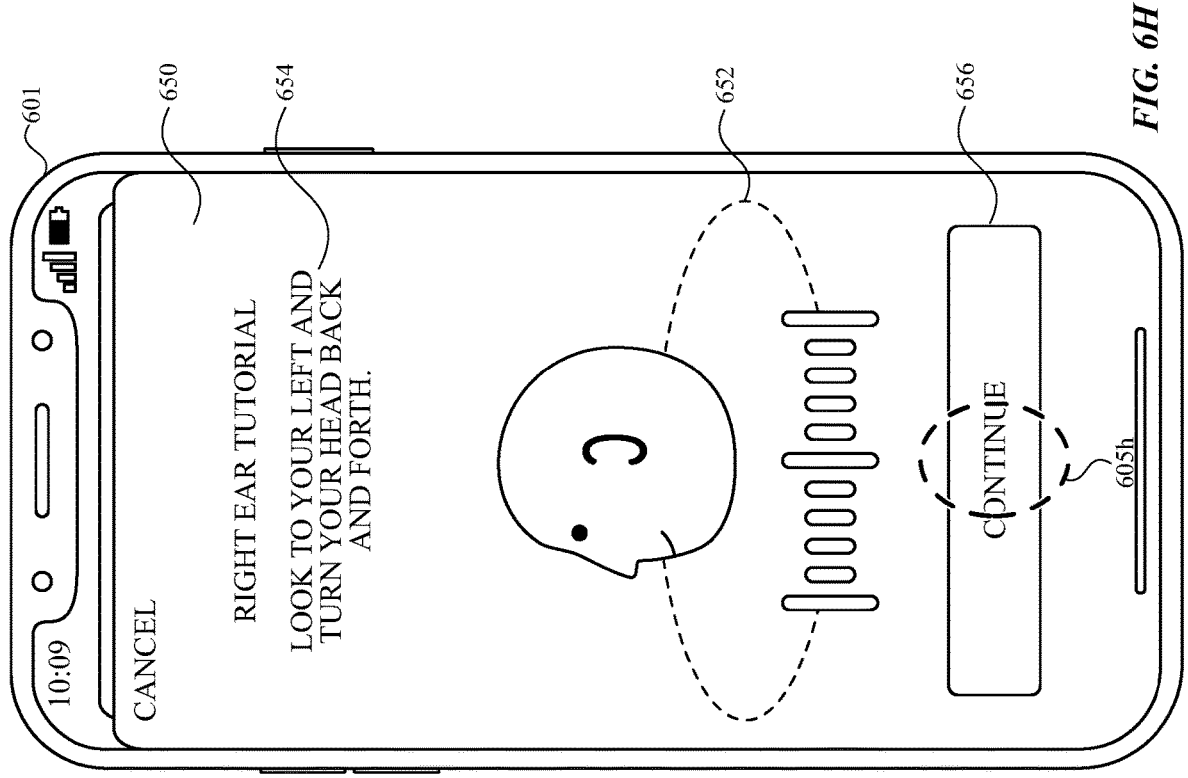
Figure 6G:
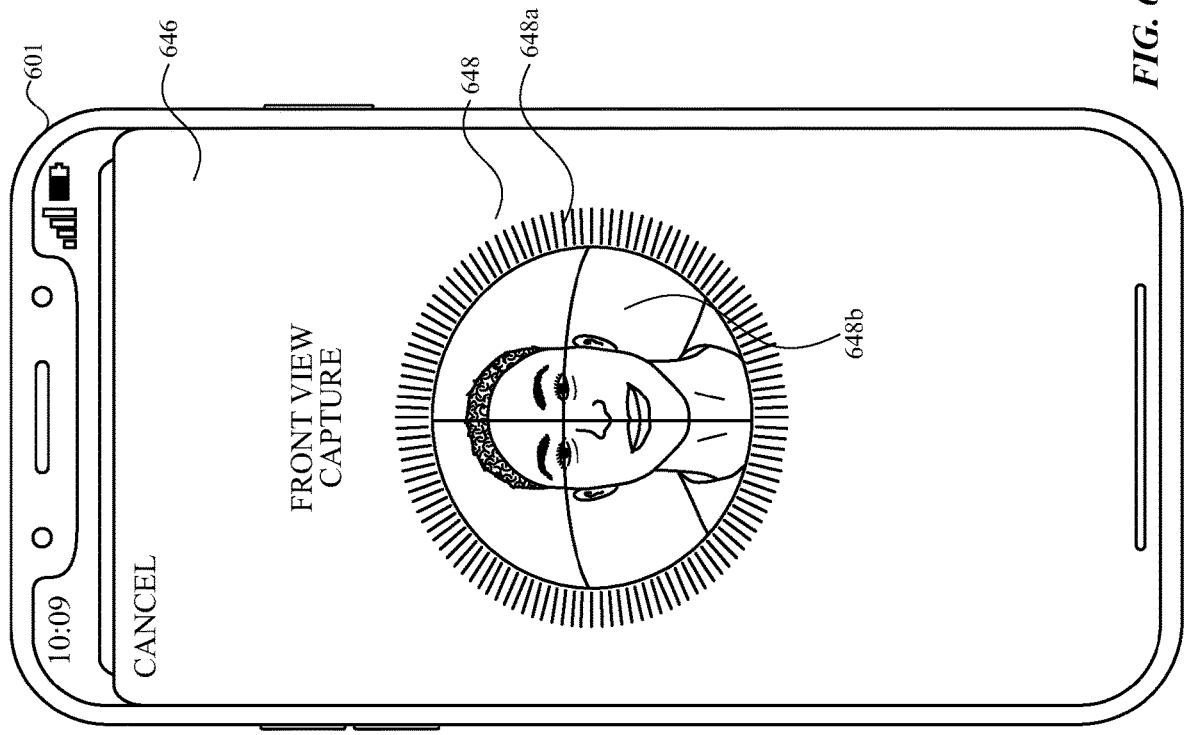

At FIG. 6H, tutorial interface 650 includes an instructional animation 652 (e.g., a tutorial and/or example) that indicates to the user how to properly position and/or move their head relative to a biometric sensor of device 601 such that device 601 can gather biometric data (e.g., data describing anatomical geometry of a user's right ear) for use to provide a personalized spatial audio profile (e.g., to provide a personalized spatial audio that accounts for the geometry of the user's right ear). For example, in some embodiments, instructional animation 652 includes instructions for the user to move (e.g., rotate) their head side-to-side such that device 601 can gather biometric data corresponding to a shape of the user's head, face, and/or right ear. In some embodiments, instruction animation 652 and/or information 654 further instruct a user to position device 601 such that one or more biometric sensors of device 601 can detect the user's head from the side (e.g., to get a direct view of a user's right ear). While displaying tutorial interface 650, device 601 detects tap gesture 605h corresponding to a selection of continue affordance 656 (or other selection input directed to continue affordance 656).

Figure 6J:
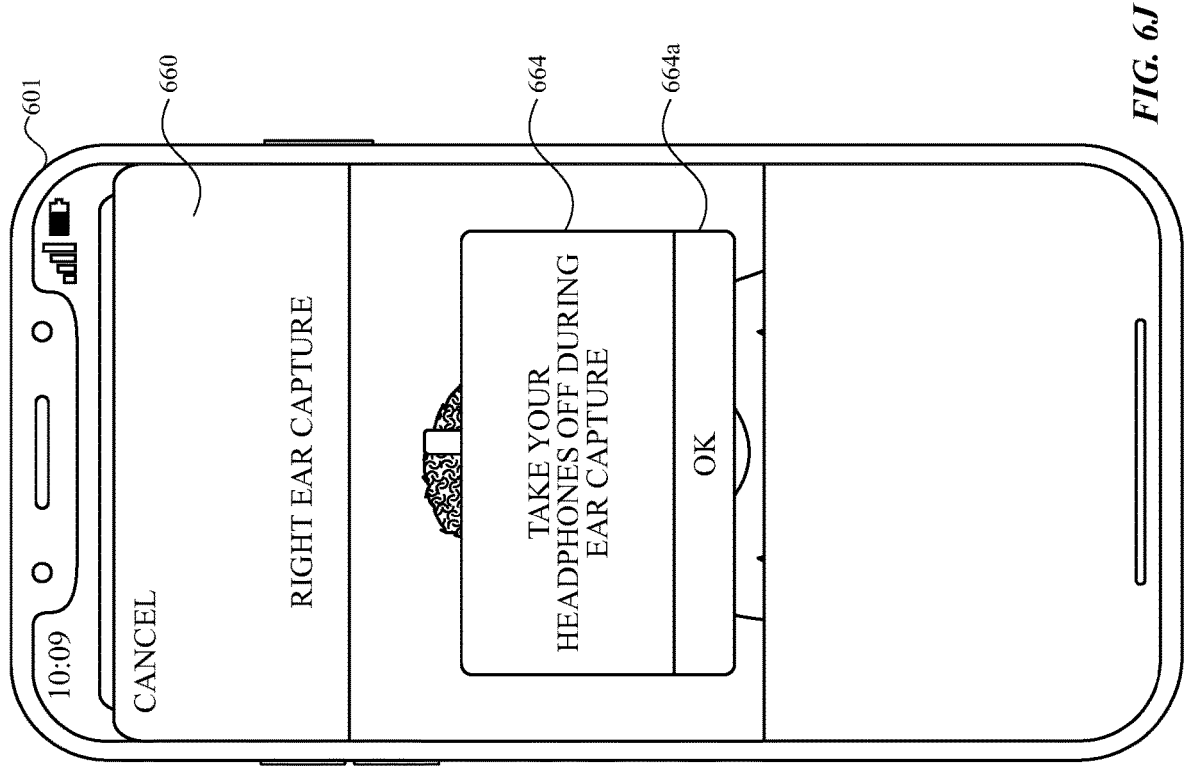
Figure 6I:
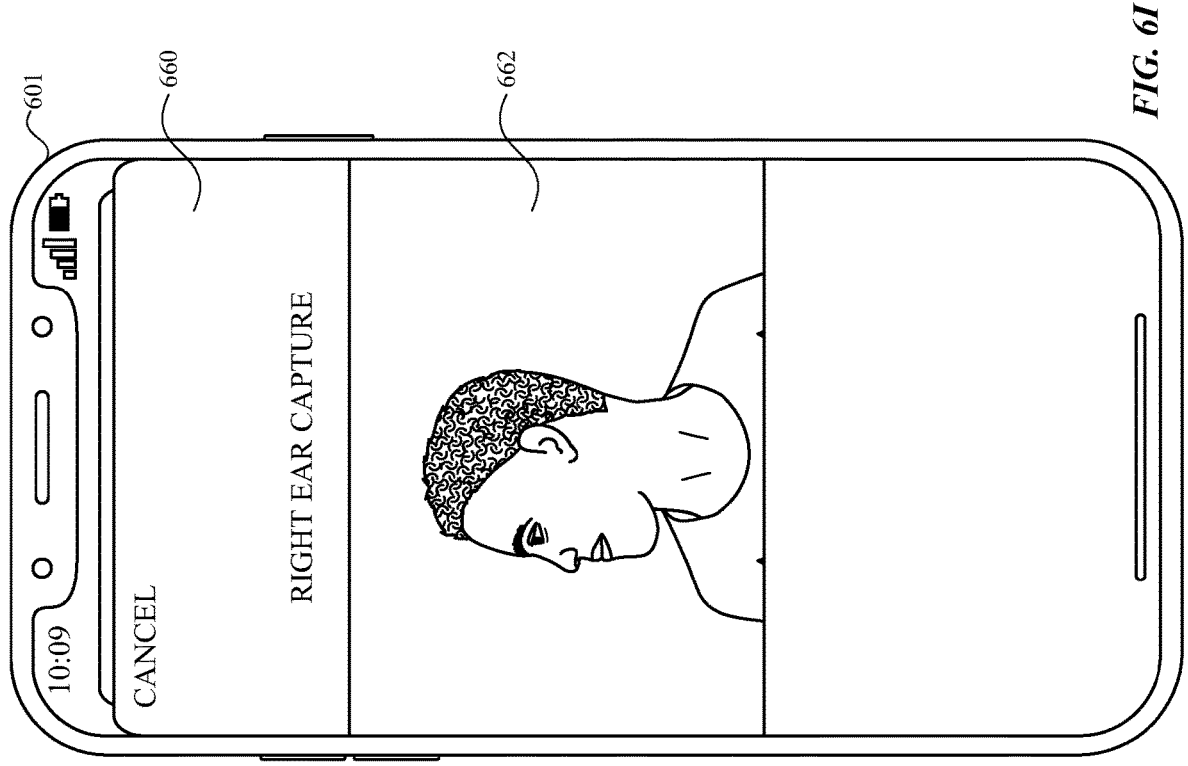

In response to selection of continue affordance 656, device 601 initiates a process for capturing biometric data corresponding to a user's right ear. For example, as shown in FIG. 6I, in response to detecting tap gesture 605h or other selection input directed to continue affordance 656, device 600 displays right ear enrollment interface 660 including user image 662. Generally, right ear enrollment interface 660 allows for device 601 to capture biometric data corresponding to various aspects of a user's right profile (e.g., attributes of head, face, and/or ears from a right-side perspective). User image 662 is an image or video of the user captured by one or more cameras of device 601. In some embodiments, user image 662 is a live preview of the image data captured by the one or more cameras (e.g., a digital viewfinder) that updates continuously as the field of view of the camera and/or the field of view's contents change.

Further in response to selection of continue affordance 656 and/or in response to display of right ear enrollment interface 660, device 601 determines if an error condition exists. In some embodiments, an error condition exists if the user's head and/or right ear are not properly aligned and/or within a field of view of one or more cameras of device 601. In some embodiments, if an error condition exists, device 601 identifies the error and/or instructs the user to correct the error condition. As an example, as shown in FIG. 6J, if device 601 determines that a user is wearing headphones, device 601 displays notification 664 indicating that the user is wearing headphones that should be removed to continue with the process for providing a personalized spatial audio profile. In some embodiments, notification 664 is overlaid on right ear enrollment interface 660, and optionally, may be dismissed in response to selection of affordance 664a.

Figure 6L:
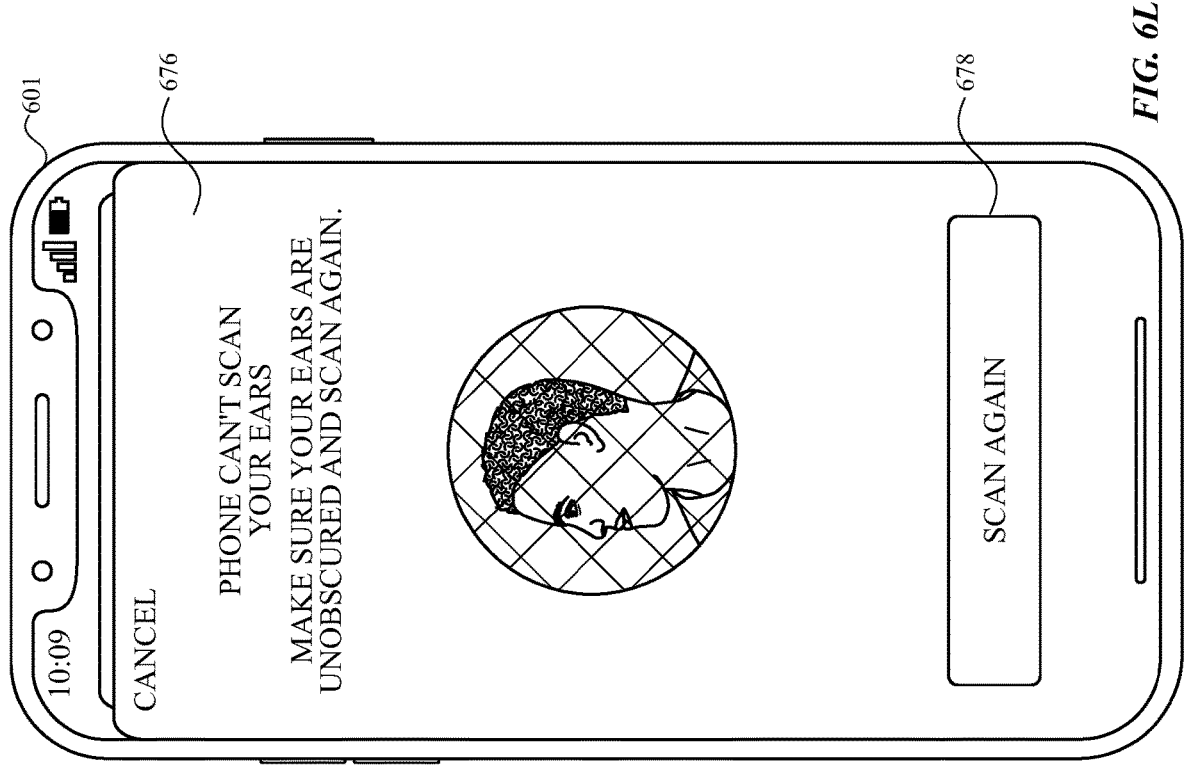
Figure 6K:
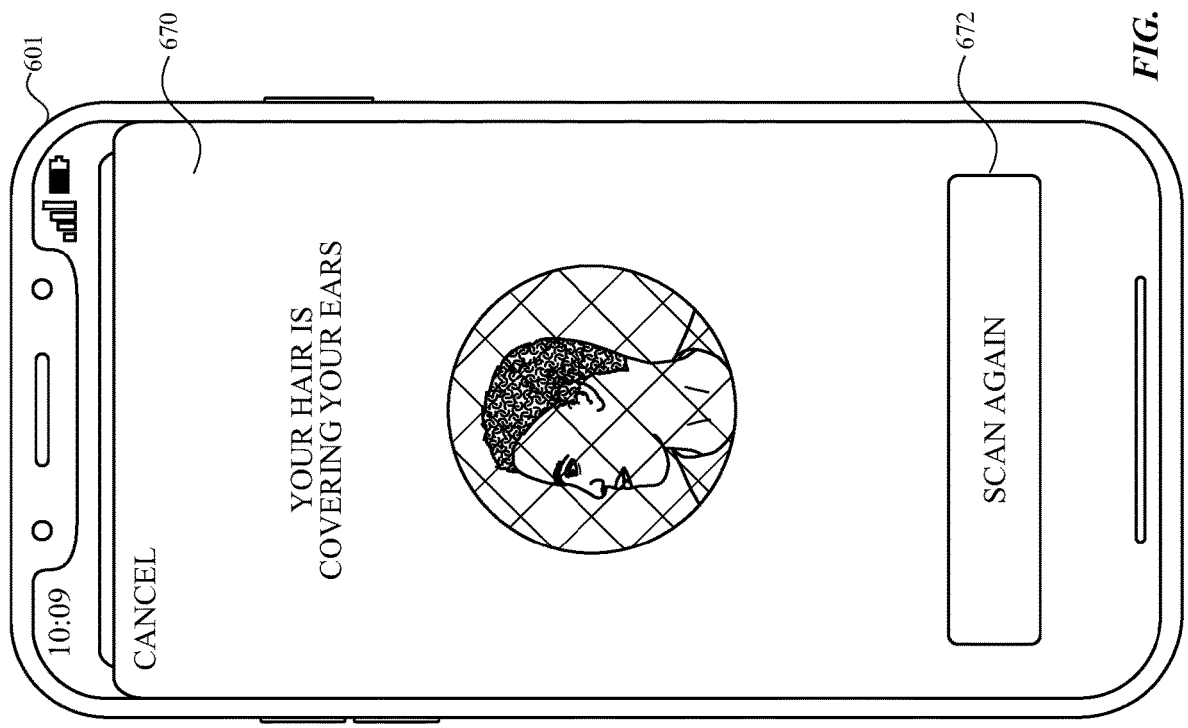

As another example, as shown in FIG. 6K, if device 601 determines that a user's hair is blocking (e.g., obscuring and/or concealing) a view of the user's right ear, device 601 displays (e.g., replaces display of right ear enrollment interface 660 with) error interface 670, indicating the user's hair is blocking a view of the user's right ear. Once the user has moved their hair such that the user's right ear is properly viewable, the process for providing a personalized spatial audio profile may resume. For example, scan affordance 672, when selected (e.g., via a tap input or other selection input directed to scan affordance 672), causes device 601 to resume display of right ear enrollment interface 660.

As yet another example, as shown in FIG. 6L, if device 601 determines that a user's right ear is blocked for an unknown reason, device 601 displays (e.g., replaces display of right ear enrollment interface 660 with) error interface 676, indicating the user's right ear is blocked. Once the user has ensured that the user's right ear is exposed, the process for providing a personalized spatial audio profile may resume. For example, scan affordance 678, when selected (e.g., via a tap input or other selection input directed to scan affordance 678), causes device 601 to resume display of right ear enrollment interface 660.

Figure 6M:
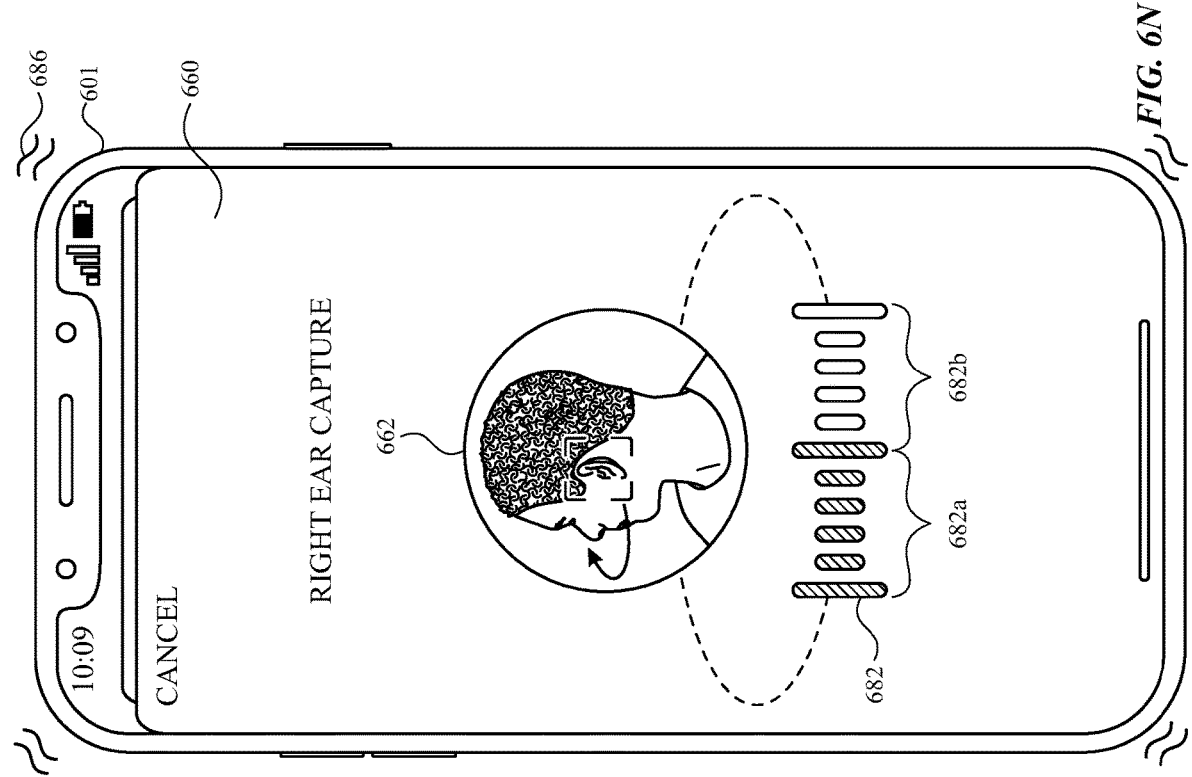

If, while displaying right ear enrollment interface 660, device 601 detects that no error condition exists, device 601 visually modifies user image 662. For example, as shown in FIG. 6M, device 601 crops and/or reduces a size of user image 662 such that user image 662 is more prominently focused on the head of the user. Optionally, device 601 further displays indicator 680 identifying a position of the right ear of the user in user image 662 (e.g., in response to identifying the right ear). In some embodiments, in response to identifying the right ear, device 601 provides output 684 (e.g., auditory and/or tactile output), for instance, indicating to the user that the user's ear is within the field of view of one or more cameras of device 601.

In some embodiments, device 601 further displays progress indicator 682 including a first portion 682a and a second portion 682b. In some embodiments, first portion 682a corresponds to a first direction of rotation of the user's head (e.g., rightward rotation), and second portion 682b corresponds to a second direction of rotation (e.g., leftward rotation) of the user's head.

In some embodiments, while device 601 displays right ear enrollment interface 660, as the user turns their head, device 601 captures biometric data for the user's head and/or right ear, and concurrently, modifies the appearance of a corresponding portion of progress indicator 682. In some embodiments, device 601 changes a color and/or shading of one or more progress elements in the corresponding portion, indicating that biometric data corresponding to the user's head and/or ears has been successfully captured.

Figure 6N:
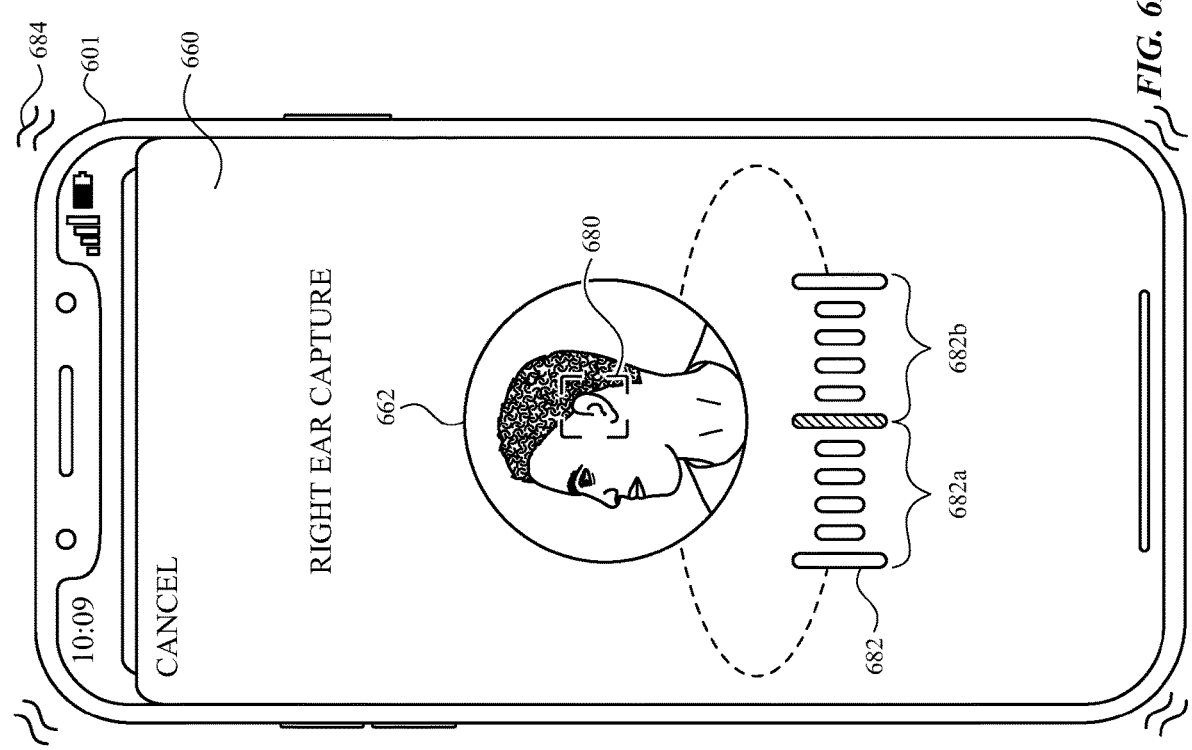

As an example, FIG. 6N illustrates an instance in which the user has rotated at least a threshold amount in a rightward direction. As a result, device 601 modifies display of portion 682a to indicate that biometric data has been successfully captured for rightward rotation of the user's head for the right ear. In some embodiments, device 601 provides non-verbal output 686 (e.g., auditory and/or tactile output), for instance, indicating to the user that biometric data corresponding to rightward rotation of the head has been successfully captured.

As another example, FIG. 6O illustrates an instance in which the user has rotated at least a threshold amount in a leftward direction (e.g., after rotating in the rightward direction). As a result, device 601 modifies display of portion 682b to indicate that biometric data has been successfully captured for leftward rotation of the user's head for the right ear. In some embodiments, device 601 provides non-verbal output 688 (e.g., auditory and/or tactile output), for instance, indicating to the user that biometric data corresponding to leftward rotation of the head has been successfully captured.

Once biometric data has been successfully captured for both rightward and leftward rotation of the user's head (e.g., biometric data has been captured for various front and rear angles of the user's right ear) for the right ear, enrollment of the right ear is complete, and device 601 displays tutorial interface 690, as shown in FIG. 6P.

Tutorial interface 690, includes an instructional animation 692 (e.g., a tutorial and/or preview) that indicates to the user how to properly position and/or move their head relative to a biometric sensor of device 601 such that device 601 can gather biometric data (e.g., data describing anatomical geometry of a user's left ear) needed to provide a personalized spatial audio profile (e.g., to provide a personalized spatial audio that accounts for the user's left ear). For example, in some embodiments, instructional animation 692 includes instructions for the user to move (e.g., rotate) their head side-to-side such that device 601 can gather biometric data corresponding to a shape of the user's head, face, and/or left ear. In some embodiments, instruction animation 692 and/or information 694 further instruct a user to position device 601 such that one or more biometric sensors of device 601 can view the user's head from the side (e.g., to get a direct view of a user's left ear).

Tutorial interface 690 includes continue affordance 696, which when selected (e.g., via a tap input or other selection input directed to continue affordance 696), causes device 601 to initiate a process for capturing biometric data corresponding to a user's left ear. It will be appreciated that one or more aspects of the process for capturing biometric data corresponding to the user's left ear mirrors that of the process for capturing biometric data corresponding to the user's right ear, described above. As an example, in some embodiments, when performing the process for capturing biometric data corresponding to the user's left ear, device 601 displays a left ear enrollment interface. Generally, the left ear enrollment interface allows for device 601 to capture biometric data corresponding to various aspects of a user's left profile (e.g., attributes of head, face, and/or ears from a left-side perspective). In some embodiments, device 601, while displaying the left ear enrollment interface, determines whether the left ear of the user is within a field of view of one or more cameras of device 601, and, optionally, whether, error conditions exist such that the left ear of the user is not within a field of view of one or more cameras of device 601.

As another example, in some embodiments, the process for capturing biometric data corresponding to the user's left ear includes displaying a progress indicator and modifying display of the progress indicator in response to successful capture of biometric data as a user rotates their head in rightward and leftward directions. Non-verbal outputs are, optionally, provided upon detection of the user's left ear in the field of view of cameras of device 601, upon a user rotating their head a threshold amount in a rightward direction, and/or upon a user rotating their head a threshold amount in a leftward direction.

Once biometric data has been successfully captured for the front, right, and left profiles of the user, device 601 provides (e.g., generates) a personalized spatial audio profile based on the captured biometric data. Device 601, optionally, provides the personalized spatial audio profile to any number of devices associated with the user (e.g., device 600 and/or other devices) such that the profile may be used on such devices. Additionally, as shown in FIG. 6Q, device 601 displays completion interface 600A indicating that the process for providing a personalized spatial audio profile is complete.

Figure 6R:
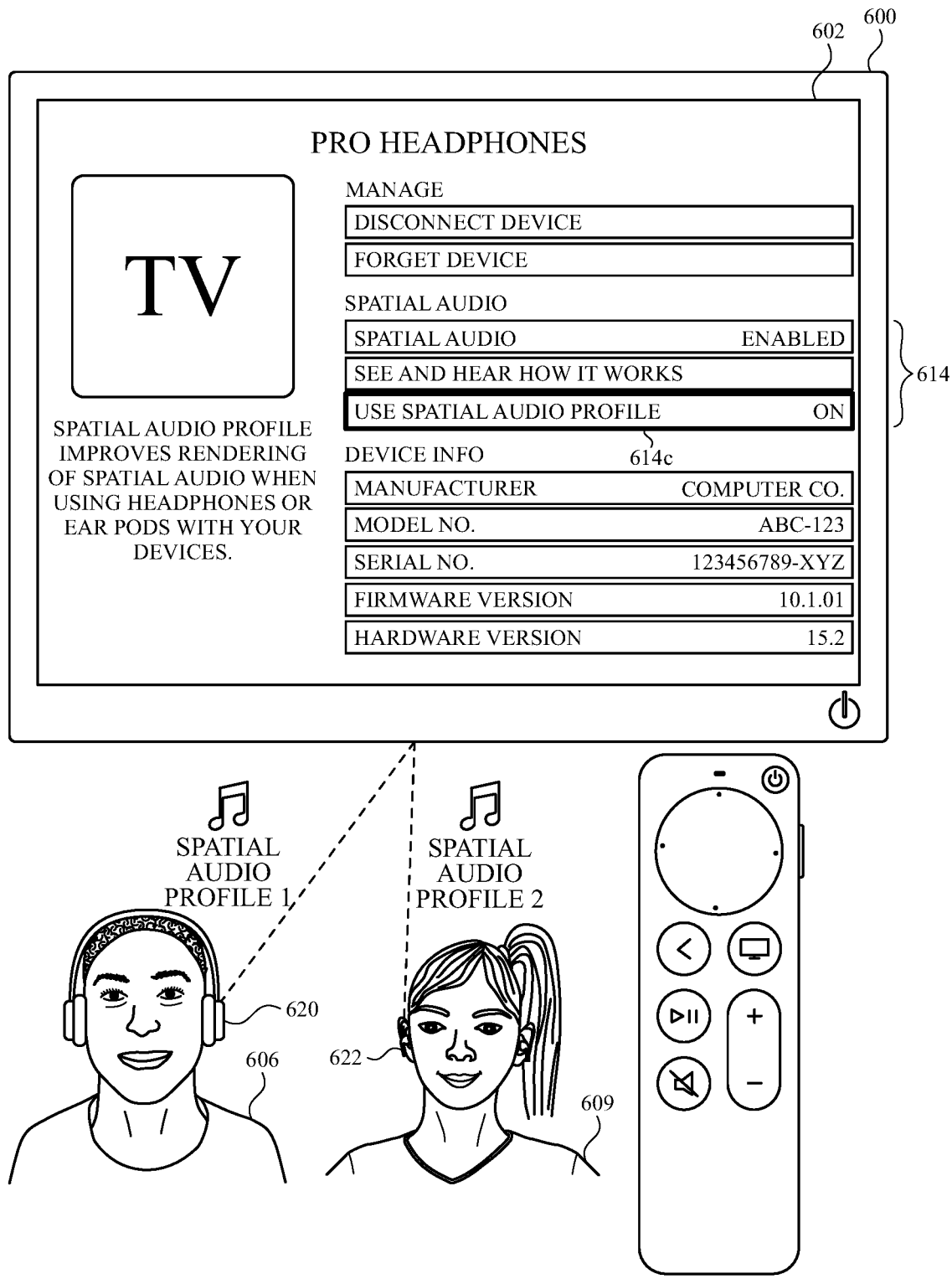

After a personalized spatial audio profile has been created, the user may use the personalized spatial audio profile when listening to audio (e.g., instead of a default personalized spatial audio profile). For example, FIG. 6R illustrates an example in which the user (e.g., user 606) and another user (e.g., user 609) are listening to audio provided by device 600. As shown, spatial audio portion 614 includes personalized profile option 614c in an "ON" (e.g., enabled and/or not disabled) state (e.g., personalized profile option 614 may replace setup affordance 614b following a process to provide a personalized spatial audio profile, in some embodiments). Accordingly, audio provided to headphones 620 of user 606 is provided according to the personalized spatial audio profile for user 606 (e.g., "profile 1").

In some embodiments, device 600 may store personalized spatial audio profiles for multiple users. Accordingly, audio provided to headphones 622 of user 609 is provided according to a personalized spatial audio profile for user 609 (e.g., "profile 2"). In this manner, users 606 and 609 may listen to the same base audio that has been modified for each user according to their respective personalized spatial audio profiles, as shown in FIG. 6R.

Figure 6S:
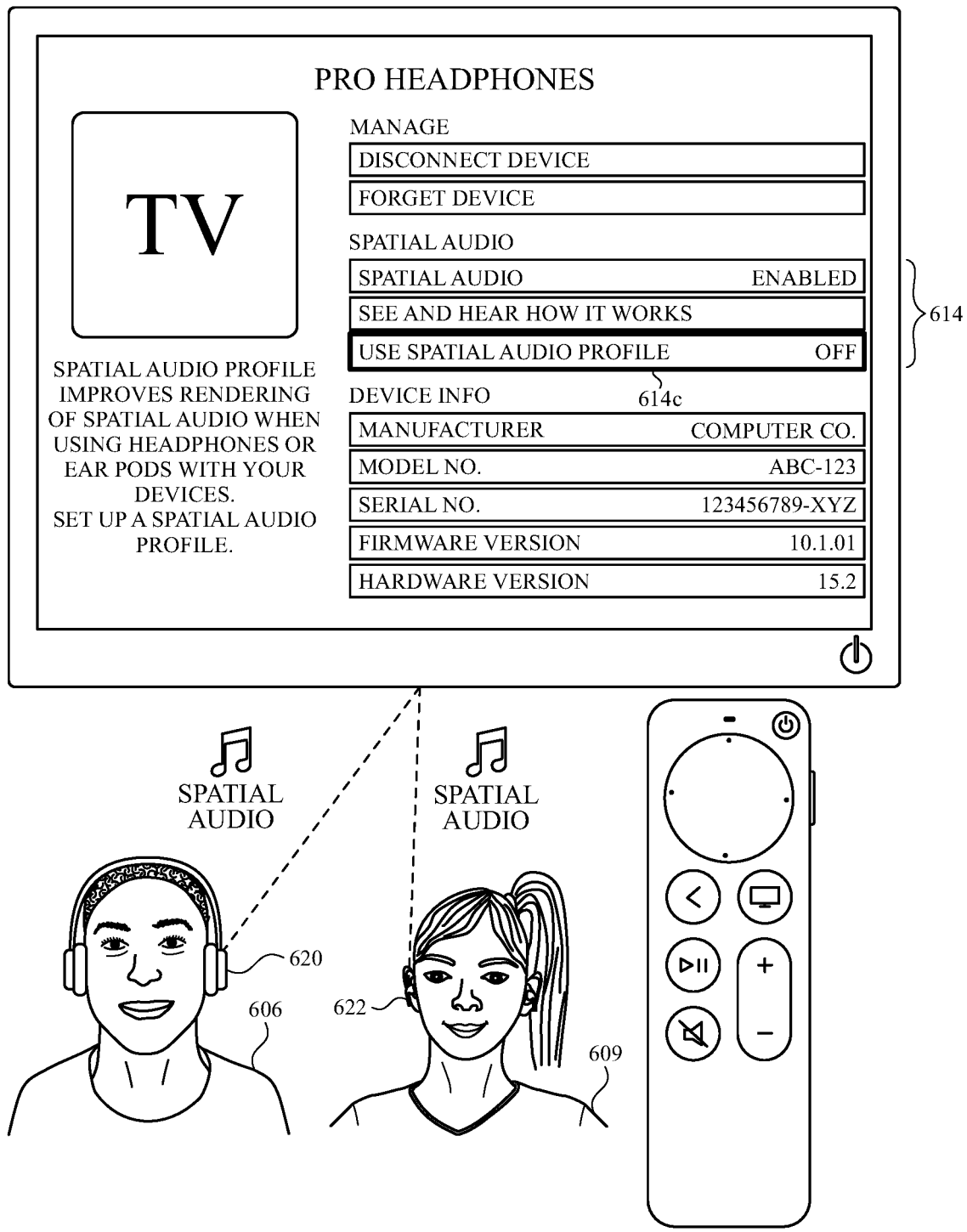

In some embodiments, multiple personalized spatial audio profiles cannot be applied by device 600 simultaneously. Accordingly, in some embodiments, in instances in which multiple users are listening to audio concurrently, device 600 disables use of personalized spatial audio profiles, and spatial audio provided to users is provided according to a default spatial audio profile. As shown in FIG. 6S, for example, while users 606 and 609 are listening to audio provided by device 600, personalized profile option 614c is in an "OFF" (e.g., disabled and/or not enabled) state.

Figure 6U:
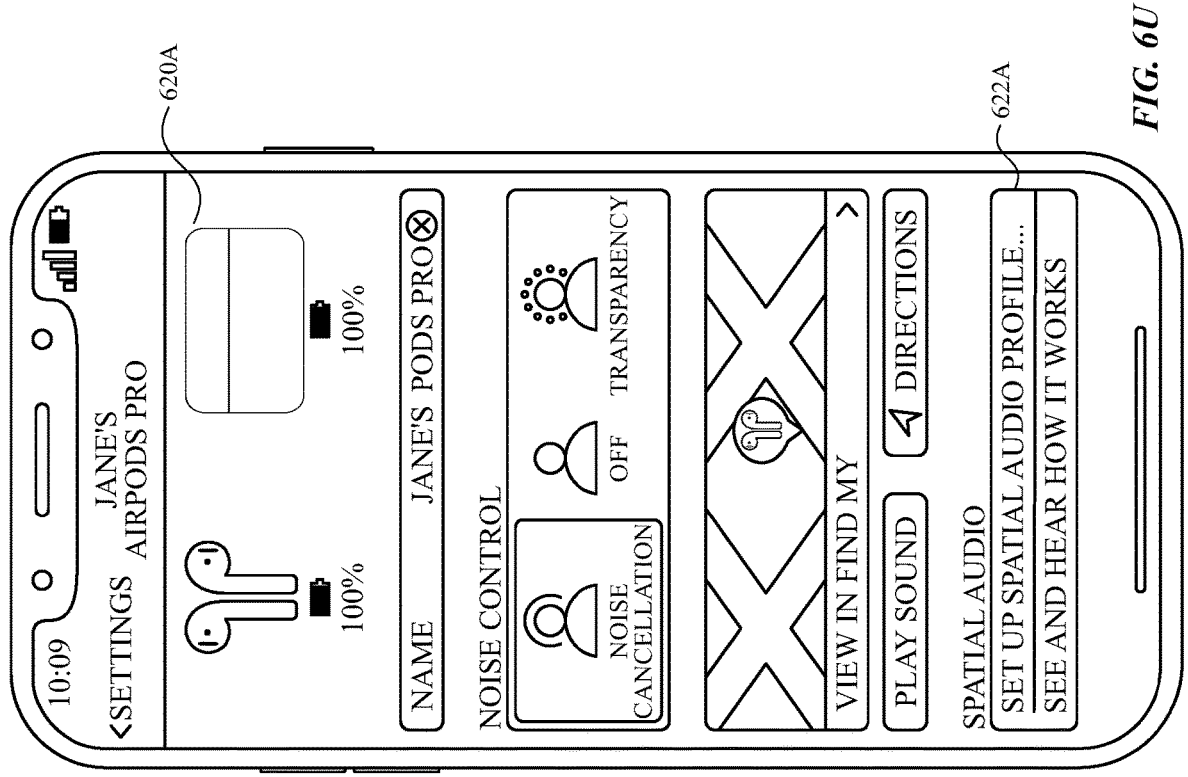
Figure 6T:
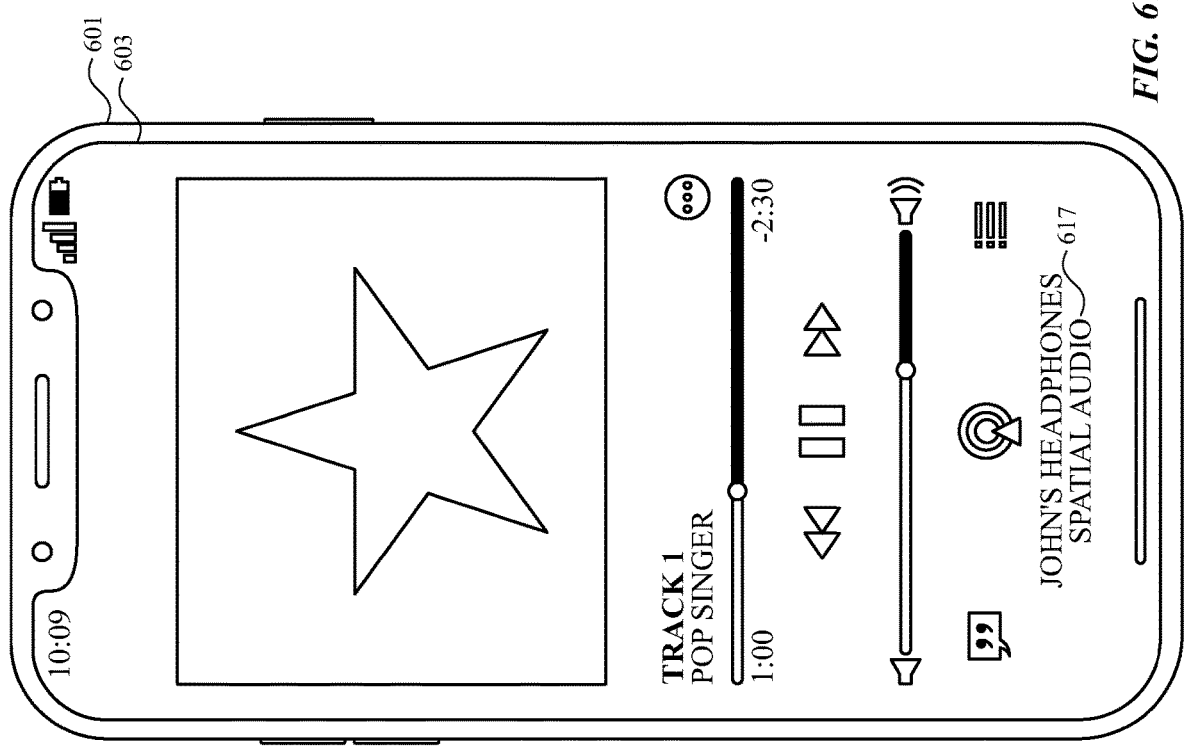

While description is made herein with respect to device 600 providing personalized spatial audio according to a personalized spatial audio profile, it will be appreciated that other devices (e.g., device 601) may provide audio using the personalized spatial audio profile. For example, in FIG. 6T, device 601 is providing audio for a song "Track 1" to headphones 620. As indicated by audio type indicator 617, the audio provided to headphones 620 is spatial audio (e.g., personalized spatial audio using the personalized spatial audio profile).

While description is made herein with respect to initiating a process for providing a personalized spatial audio profile in response to selection of an affordance on device 600 or in response to device 601 detecting a user putting on headphones, a process for providing a personalized spatial audio profile may be initiated in other ways. As an example, in 6U, device 601 displays settings interface 620A including various options for viewing and/or modifying settings corresponding to headphones 620 and/or user audio settings. Because, in the example illustrated in FIG. 6U, no personalized spatial audio profile has been provided for a user of device 601, settings interface 620A includes setup affordance 622A. When selected, setup affordance 622A initiates the process for providing a personalized spatial audio profile for the user of device 601, as shown in FIG. 6E. As another example, in FIG. 6V, device 601 displays a sounds settings interface 630A including a setup affordance 632A, which when selected initiates the process for providing a personalized spatial audio profile for the user of device 601, as shown in FIG. 6E.

In some embodiments, a user may wish to disable and/or remove a personalized spatial audio profile. In FIG. 6W, for example, device 601 displays settings interface 640A. Settings interface 640A includes an enable option 642A, which when selected disables (or enables) use of a personalized spatial audio profile for the user. In some embodiments, disabling (or enabling) use of a personalized spatial audio causes all devices with access to the personalized spatial audio profile to disable (or enable) use of the profile. In some embodiments, disabling (or enabling) use of a personalized spatial audio causes the current device to disable use of the profile without changing the setting on other devices. Settings interface 640A includes a reset affordance 644A, which when selected, causes device 601 to reset (e.g., remove and/or delete) a personalized spatial audio profile for the user. In some embodiments, selection of reset affordance 644A also causes one or more other devices (e.g., device 600) to reset a personalized spatial audio profile for the user. In some embodiments, the personalized spatial audio profile is removed from a plurality of (e.g., all of) the devices on which it is stored and/or becomes inaccessible from a plurality of (e.g., all of) the user's devices.

FIG. 7 is a flow diagram illustrating a method for enrolling a spatial audio profile using a computer system in accordance with some embodiments. Method 700 is performed at a computer system (e.g., 100, 300, 500, 600, 601, and/or 900) (e.g., a smartphone, a smartwatch, a head mounted device (e.g., a head mounted augmented reality and/or extended reality device), and/or a personal computer) that is in communication with one or more biometric sensors (e.g., a biometric sensor of device 600) (e.g., one or more cameras and/or one or more depth sensors). Some operations in method 700 are, optionally, combined, the orders of some operations are, optionally, changed, and some operations are, optionally, omitted.

As described below, method 700 provides an intuitive way for enrolling a spatial audio profile. The method reduces the cognitive burden on a user for enrolling a spatial audio profile, thereby creating a more efficient human-machine interface. For battery-operated computing devices, enabling a user to enroll a spatial audio profile faster and more efficiently conserves power and increases the time between battery charges.

In some embodiments, the computer system (e.g., 600 and/or 601) initiates (702) a spatial audio enrollment process for enrolling a spatial audio profile of a user (e.g., 606) of the computer system.

In some embodiments, during the spatial audio enrollment process for enrolling the spatial audio profile of the user, the computer system outputs (704) (e.g., via a display generation component, via an audio output device, and/or via a tactile output device) feedback (e.g., 642, 648a, 648b, 652, 654, 662, 664, error condition specified in 670, error condition specified in 676, 662, 680, state of 682 during enrollment, 692, and/or 694) (e.g., prior to the portion being positioned in the field of view and/or while the portion is positioned in the field of view) about positioning a portion (e.g., a side, a back, a face, and/or an ear) of a head of the user in a field of view of the one or more biometric sensors (e.g., a biometric sensor of device 600) (e.g., one biometric sensor, two biometric sensors, or three biometric sensors).

In some embodiments, while the portion of the head of the user is in the field of view of the one or more biometric sensors, the computer system (e.g., 601) captures (706), via the one or more biometric sensors, data (e.g., as shown in FIGS. 6G, 6I, and/or 6M-6O) about the portion of the head of the user (e.g., user 606).

In some embodiments, after capturing the data about the portion of the head of the user, the computer system (e.g., 601) generates (708), using the data about the portion of the head of the user, a personalized spatial audio profile for the user (e.g., as shown in FIG. 6Q). Outputting feedback about positioning a portion of the head of the user for scanning by one or more biometric sensors enables the computer system to direct the user's actions such that the computer system can successfully capture data about the portion of the head of the user, thereby providing the user with improved feedback.

Spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced—one filter per ear—so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

In some embodiments, the one or more biometric sensors include one or more cameras (e.g., one or more cameras of device 600 and/or 601) (e.g., an infrared camera and/or a visible light camera). Using one or more cameras to collect data about the portion of the head of the user enables the computer system to collection geometry information about the user's ear, thereby enabling the computer system to generate the personalized spatial audio profile for the user.

In some embodiments, the one or more biometric sensors (e.g., that are capturing depth information at FIGS. 6M-6O) include one or more depth sensors (e.g., a lidar sensor, a structured light sensor, a time of flight sensor, and/or a camera array). Using one or more depth sensors to collect depth data about the portion of the head of the user enables the computer system to collection geometry information about the user's ear, thereby enabling the computer system to generate the personalized spatial audio profile for the user.

In some embodiments, the personalized spatial audio profile is a personalized head-related transfer function (HRTF) for the user. A personalized head-related transfer function for the user characterizes how an ear of the user receives sound from a point in space, thereby enabling the computer system to produce a high-quality spatial audio experience for the user.

In some embodiments, outputting feedback about positioning the portion of the head of the user in the field of view of the one or more biometric sensors includes outputting information (e.g., 642, 652, and/or 654) (e.g., a direction to move, a direction to turn, and/or a direction to look) about (e.g., a difference between and/or a direction between) a current position of the portion of the head of the user relative to a target position of the portion of the head of the user that will be used to capture data for use in generating the personalized spatial audio profile. In some embodiments, the computer system outputs feedback for the user to turn their head in a direction (e.g., left or right). In some embodiments, the computer system outputs feedback for the user to move their head in a direction (e.g., away from or toward the computer system). In some embodiments, in accordance with a determination that the difference between the current position and the target position is a first amount, the computer system outputs a first feedback and in accordance with a determination that the difference between the current position and the target position is a second amount that is different from the first amount, the computer system outputs a second feedback that is different from the first feedback. Providing the user with feedback about a relative difference between where the user's head currently is and where the user's head should be provides the user with feedback about how to move the head into the target position, thereby providing the user with improved feedback.

In some embodiments, outputting feedback about positioning the portion of the head of the user in the field of view of the one or more biometric sensors includes outputting instructions (e.g., 642 at FIG. 6F and/or face capture guide displayed across user's face in 648 and 648*a*) (e.g., visual and/or audio instructions) to the user to perform a scan of a face of the user. In some embodiments, the computer system outputs feedback instructing the user to move their face and/or head in a certain manner relative to the computer system so that the computer system can capture a scan of the face of the user. In some embodiments, a scan of the face of the user is a process by which physical characteristics (e.g., shape, size, and/or geometry of the face; and/or shape, size, and/or locations of facial features) of the face of the user are collected. Instructing the user to perform a scan of the face of the user provides the user with feedback about the next steps required to generate the personalized spatial audio profile, thereby providing the user with improved feedback.

In some embodiments, outputting feedback about positioning the portion of the head of the user in the field of view of the one or more biometric sensors includes outputting instructions (e.g., 652 and/or 654) (e.g., visual and/or audio instructions) to the user for performing a scan of a first ear of the user. In some embodiments, the computer system outputs feedback instructing the user to move their head in a certain manner relative to the computer system so that the computer system can capture a scan of the first ear of the user. In some embodiments, a scan of the first ear of the user is a process by which the computer system captures physical characteristics (e.g., geometry, shape, size, and/or features) of the first ear of the user. Instructing the user to perform a scan of the first ear of the user provides the user with feedback about the next steps required to generate the personalized spatial audio profile, thereby providing the user with improved feedback.

In some embodiments, the computer system (e.g., 601) is in communication with a display generation component (e.g., 602 and/or display of 601) (e.g., a display, a display controller, a head mounted display system, and/or a touch-sensitive display). In some embodiments, outputting feedback about positioning the portion of the head of the user in the field of view of the one or more biometric sensors includes displaying, via the display generation component, an indication (e.g., 680) (e.g., a box surrounding the first ear, an outline of the first ear, and/or a highlighting of the first ear) that identifies the first ear of the user detected in a field of view of the one or more biometric sensors. In some embodiments, the computer system displays, via the display generation component, content (e.g., the head of the user and/or the first ear of the user) that is within the field of view of the one or more biometric sensors to provide the user with visual feedback about what content is in the field of view of the one or more biometric sensors. Visually identifying an ear of the user in a camera view provides the user with feedback that the computer system has detected the user's ear and/or that the user's ear is within the field of view for the computer system to scan, thereby providing the user with improved feedback.

In some embodiments, outputting feedback about positioning the portion of the head of the user in the field of view of the one or more biometric sensors includes outputting, at the computer system, non-visual feedback (e.g., 684, 686, and/or 688) (e.g., audio output and/or tactile output). In some embodiments, the audio output and/or tactile output indicate how close the current position of the portion of the head of the user is relative to a target position of the portion of the head of the user that will be used to capture data for use in generating the personalized spatial audio profile. In some embodiments, the audio output and/or tactile output indicate that the portion of the head of the user is within a field of view of the one or more biometric sensors. Providing the user with non-visual feedback about the positioning of the portion of the user's head enables the computer system to communicate the progress of the process and/or to instruct the user to position the user's head without the user needing to change their gaze and/or head position to view a display of the computer system (and potentially negatively affecting the scanning process), thereby providing the user with improved feedback.

In some embodiments, outputting feedback about positioning the portion of the head of the user in the field of view of the one or more biometric sensors includes, in response to detecting, via the one or more biometric sensors, a first ear of the user within a field of view of the one or more biometric sensors, outputting (e.g., audio, visual and/or tactile) first feedback (e.g., 684) (e.g., that indicates an ear of the user is within a field of view of the one or more biometric sensors and/or that instructs the user on an action to take). Providing the user with feedback that the user's ear has been detected provides the user with feedback about the progress of the spatial audio enrollment process and that the user's ear is within the field of view for the computer system to scan, thereby providing the user with improved feedback.

In some embodiments, outputting feedback about positioning the portion of the head of the user in the field of view of the one or more biometric sensors includes, in accordance with a determination that a first ear of the user has been rotated, within a field of view (e.g., 662) of the one or more biometric sensors and relative to the one or more biometric sensors, in a first direction (e.g., clockwise or counterclockwise) by a first threshold amount (e.g., by 10 degrees, 20 degrees, and/or 45 degrees), outputting second (e.g., audio, visual and/or tactile) feedback (e.g., 686) (e.g., that indicates the ear has been rotated in the first direction by the first threshold amount and/or that provides further instructions for the scan). In some embodiments, outputting feedback about positioning the portion of the head of the user in the field of view of the one or more biometric sensors includes, in accordance with a determination that the first ear of the user has not been rotated, within the field of view of the one or more biometric sensors and relative to the one or more biometric sensors, in the first direction by the first threshold amount, forgoing outputting the second feedback. In some embodiments, outputting feedback about positioning the portion of the head of the user in the field of view of the one or more biometric sensors includes: in accordance with a determination that the first ear of the user has been rotated, within the field of view of the one or more biometric sensors and relative to the one or more biometric sensors, in the first direction by less the first threshold amount, forgoing outputting the second feedback and, optionally, outputting third feedback that is different from the second feedback. Providing the user with feedback when the user's ear is rotated in the first direction by the threshold amount provides the user with feedback about the progress of the spatial audio enrollment process and that the computer system has scanned that portion of the user's ear, thereby providing the user with improved feedback.

In some embodiments, outputting feedback about positioning the portion of the head of the user in the field of view of the one or more biometric sensors includes, in accordance with a determination that the first ear of the user has been rotated, within a field of view of the one or more biometric sensors and relative to the one or more biometric sensors, in a second direction (e.g., clockwise or counterclockwise), different from the first direction, by a second threshold amount (e.g., by 10 degrees, 20 degrees, and/or 45 degrees), outputting third (e.g., audio, visual and/or tactile) feedback (e.g., 688) (e.g., that indicates the first ear has been rotated in the second direction by the second threshold amount and/or that provides further instructions for the scan). In some embodiments, the second feedback and the third feedback are different. In some embodiments, the second feedback and the third feedback are the same. In some embodiments, the first threshold amount and the second threshold amount are different. In some embodiments, the first threshold amount and the second threshold amount are the same. Providing the user with feedback when the user's ear is rotated in the second direction by the threshold amount provides the user with feedback about the progress of the spatial audio enrollment process and that the computer system has scanned that portion of the user's ear, thereby providing the user with improved feedback.

In some embodiments, the computer system (e.g., 600 and/or 601) is in communication with a display generation component (e.g., 602 and/or display of 601) (e.g., a display, a display controller, a head mounted display system, and/or a touch-sensitive display). In some embodiments, outputting feedback about positioning the portion of the head of the user in the field of view of the one or more biometric sensors includes displaying, via the display generation component, a progress indicator (e.g., 682) corresponding to multiple different views of a first ear of the user. In some embodiments, the progress indicator corresponding to multiple different views of a first ear of the user includes, in response to the computer system capturing information about a first view of the first ear, the progress indicator indicates a first amount of progress (e.g., progress indicated by portion 682*a* and/or portion 682*b*). In some embodiments, the progress indicator corresponding to multiple different views of a first ear of the user includes, in response to the computer system capturing additional information about a second view of the first ear, different from the first view of the first ear, the progress indicator indicates a second amount of progress that is greater than the first amount of progress (e.g., progress as indicated by portion 682*a* and/or portion 682*b*). Providing the user with feedback using a progress indictor provides the user with feedback about the progress (e.g., how much is complete and/or how much is left) of the spatial audio enrollment process, thereby providing the user with improved feedback.

In some embodiments, outputting feedback about positioning the portion of the head of the user in the field of view of the one or more biometric sensors includes, subsequent to outputting instructions (e.g., 682 and/or 682 at FIGS. 6M-6O) to the user to perform a scan of the first ear of the user (and, optionally, after capturing data about the first ear of the user), outputting instructions (e.g., 692 and/or 694) to the user to perform a scan of a second ear of the user that is different from the first ear of the user. In some embodiments, the computer system outputs feedback instructing the user to move their head in a certain manner relative to the computer system so that the computer system can capture a scan of the second ear of the user. In some embodiments, a scan of the second ear of the user is a process by which physical characteristics (e.g., geometry, shape, size, and/or features) of the ear of the user are collected. In some embodiments, outputting feedback about positioning the portion of the head of the user in the field of view of the one or more biometric sensors includes outputting instructions to the user to perform a scan of a second ear of the user. Providing the user with feedback to scan a second ear of the user after scanning the first ear provides the user with feedback about the progress of the spatial audio enrollment process, including that the scan of the first ear is complete, and what actions the user should take to continue progress of the spatial audio enrollment process, thereby providing the user with improved feedback.

In some embodiments, outputting instructions to the user to perform a scan of the second ear of the user includes, outputting instructions (e.g., 694) (e.g., audio instructions, visual instructions, and/or tactile instructions) to the user to rotate (e.g., in a first direction and/or a second direction) the head of the user relative to the one or more biometric sensors. In some embodiments, the instructions to the user to rotate the head of the user includes instructions to turn and/or look left and/or right and/or move the one or more biometric sensors around the head of the user. In some embodiments, the instructions to the user to rotate the head of the user includes instructions to turn and/or look up and/or down and/or move the one or more biometric sensors around the head of the user. Providing the user with feedback to rotate the user's head provides the user with feedback about what actions the user should take to continue progress of the spatial audio enrollment process and, in particular, how to scan the second ear of the user, thereby providing the user with improved feedback.

In some embodiments, during the spatial audio enrollment process for enrolling the spatial audio profile of the user, the computer system (e.g., 601) detects an error condition (e.g., user wearing headphones as noted by notification 664, user hair is covering ears, as noted by interface 670, and/or user ear is obscured, as noted by interface 676). In some embodiments, in response to detecting the error condition, the computer system outputs an error indication (e.g., user wearing headphones as noted by notification 664, user hair is covering ears, as noted by interface 670, and/or user ear is obscured, as noted by interface 676) (e.g., audio indication, visual indication, and/or tactile indication). In some embodiments, the error indication includes an indication of the error condition. In some embodiments, the error indication includes an indication of one or more actions the user can take to resolve the error condition. In some embodiments, in response to detecting the error condition, the computer system ceases to proceed with the spatial audio enrollment process until the error condition has been resolved. Outputting an error indication when an error condition is detected provides the user with feedback about the state of the computer system, and in particular that an error condition has been detected, thereby providing the user with improved feedback.

In some embodiments, detecting the error condition includes detecting that the user is wearing an audio output device (e.g., user wearing headphones as noted by notification 664) (e.g., in-ear headphones, on-ear headphones, and/or over-ear headphones) on and/or in an ear (e.g., first ear and/or second ear) of the user. In some embodiments, the error indication instructs the user to cease wearing the audio output device (e.g., instructs the user to take the headphones off). Outputting an error indication when the user is wearing headphones provides the user with feedback that the user's ears cannot be properly scanned while wearing the headphones, thereby providing the user with improved feedback.

In some embodiments, detecting the error condition includes detecting that an ear (e.g., first ear and/or second ear) of the user is at least partially (e.g., not fully or fully) obscured by hair of the user (e.g., user hair is covering ears, as noted by interface 670). In some embodiments, the error indication instructs the user to move the hair so that the hair does not obscure the ear of the user. In some embodiments, the error indication instructs the user to move the hair to behind the ear of the user. Outputting an error indication when the user's hair is covering the user's ear provides the user with feedback that the user's ears cannot be properly scanned while covered by the user's hair, thereby providing the user with improved feedback.

In some embodiments, detecting the error condition includes detecting that an ear (e.g., first ear and/or second ear) of the user is at least partially (e.g., not fully or fully) obscured (e.g., user ear is obscured, as noted by interface 676) (e.g., by a hand of the user, by a hat, and/or by glasses). In some embodiments, the error indication instructs the user to remove the obstruction. Outputting an error indication when the user's ear is obscured provides the user with feedback that the user's ears cannot be properly scanned, thereby providing the user with improved feedback.

In some embodiments, detecting the error condition includes detecting that lighting conditions (e.g., ambient lighting conditions and/or ear lighting conditions) do not meet a set of one or more lighting condition criteria (e.g., as noted by interface 676 at FIG. 6L). In some embodiments, the set of one or more lighting condition criteria includes a first criterion that is met when there is more than a minimum threshold amount of light. In some embodiments, the set of one or more lighting condition criteria includes a second criterion that is met when there is less than a maximum threshold amount of light (that is higher than the minimum threshold amount of light). In some embodiments, the set of one or more lighting condition criteria includes a third criterion that is met when the temperature of lighting is within an acceptable range of temperatures. Outputting an error indication when the lighting conditions do not meet lighting criteria provides the user with feedback that the user's ears cannot be properly scanned and that the lighting should be adjusted, thereby providing the user with improved feedback.

In some embodiments, the computer system (e.g., 600 and/or 601) is in communication with a display generation component (e.g., a display, a display controller, a head mounted display system, and/or a touch-sensitive display) and one or more input devices (e.g., a touch-sensitive surface (e.g., a touchscreen or a touchpad), a mouse, and/or a keyboard). In some embodiments, the computer system displays, via the display generation component, a headphone settings user interface (e.g., 620A) that includes a spatial audio enrollment option. In some embodiments, while displaying the headphone settings user interface, the computer system receives, via the one or more input devices, selection of the spatial audio enrollment option (e.g., selection of 622A). In some embodiments, initiating the spatial audio enrollment process for enrolling the spatial audio profile of the user of the computer system is in response to receiving selection of the spatial audio enrollment option. In some embodiment, the headphone settings user interface includes one or more audio settings for a particular set of headphones that has been paired with the computer system. Enabling the computer system to initiate the spatial audio enrollment process for enrolling the spatial audio profile of the user from a headphone settings user interface enables the computer system to initiate the process at a time when the user is accessing other settings of the headphones, thereby reducing the number of inputs required to perform the operation.

In some embodiments, the computer system (e.g., 600 and/or 601) is in communication with a display generation component (e.g., a display, a display controller, a head mounted display system, and/or a touch-sensitive display) and one or more input devices (e.g., a touch-sensitive surface (e.g., a touchscreen or a touchpad), a mouse, and/or a keyboard). In some embodiments, the computer system displays, via the display generation component, a sound settings user interface (e.g., 630A) that includes a spatial audio enrollment option (e.g., 632A). In some embodiments, while displaying the sound settings user interface, the computer system receives, via the one or more input devices, selection of the spatial audio enrollment option (e.g., selection of 632A). In some embodiments, initiating the spatial audio enrollment process for enrolling the spatial audio profile of the user of the computer system is in response to receiving selection of the spatial audio enrollment option. In some embodiment, the sound settings user interface includes one or more audio settings for a system sound volume, for system mute, and/or for ringtones for the computer system. Enabling the computer system to initiate the spatial audio enrollment process for enrolling the spatial audio profile of the user from a sound settings user interface enables the computer system to initiate the process at a time when the user is accessing other sound settings of the computer system, thereby reducing the number of inputs required to perform the operation.

In some embodiments, the computer system is in communication with a display generation component (e.g., a display, a display controller, a head mounted display system, and/or a touch-sensitive display). In some embodiments, the computer system detects that one or more audio output devices (e.g., in-ear headphones, on-ear headphones, and/or over-ear headphones) are connected (e.g., wirelessly or by wire) to the computer system. In some embodiments, in response to detecting that one or more audio output devices have connected to the computer system (e.g., have paired to the computer system, have communicated to the computer system that a charging case of the one or more audio output devices has been opened, have connected via short-range communication radio (e.g., Bluetooth) to the computer system, have been places in, on, or over the user's ears, and/or have been plugged in (e.g., to receive audio signals over the wire plugged in)), the computer system displays, via the display generation component, a spatial audio enrollment option (e.g., headphones 620 connect to the computer system and in response, device 601 displays interface 626). In some embodiments, initiating the spatial audio enrollment process for enrolling the spatial audio profile of the user of the computer system is in response to receiving selection of the spatial audio enrollment option. In some embodiments, the spatial audio enrollment option is displayed for an audio output device the first time the audio output device connects to the computer system after spatial audio enrollment process is available (e.g., the first time the headphones connect to the computer system after software of the computer system has been upgraded to support the spatial audio enrollment process). Displaying a prompt to initiate the spatial audio enrollment process for enrolling the spatial audio profile of the user when the computer system detects headphones have been connected to the computer system enables the computer system to initiate the process at a time when the headphones are available/nearby and/or when the user will be using the headphones, thereby reducing the number of inputs required to perform the operation.

In some embodiments, displaying the spatial audio enrollment option includes displaying the spatial audio enrollment option (e.g., interface 628 of interface 626) (e.g., a system user interface or a non-system user interface) overlaid on a currently displayed user interface (e.g., 618) (e.g., a home screen, awake screen, and/or an application user interface) of the computer system (e.g., overlaid on whatever user interface was displayed at the time that the one or more audio output devices connected to the computer system and/or overlaid on whatever user interface was displayed at the time that the spatial audio enrollment option is displayed). Displaying the prompt overlaid on the currently displayed user interface allows the computer system to provide the user with context of the operating that was being performed when the headphones were connected, thereby providing the user with improved visual feedback about the state of the computer system.

In some embodiments, the computer system (e.g., 600 and/or 601) is in communication with a display generation component (e.g., a display, a display controller, a head mounted display system, and/or a touch-sensitive display) and one or more input devices (e.g., a touch-sensitive surface (e.g., a touchscreen or a touchpad), a mouse, and/or a keyboard). In some embodiments, subsequent to generating, using the data about the portion of the head of the user, the personalized spatial audio profile for the user, the computer system displays, via the display generation component, an option to remove the personalized spatial audio profile (e.g., 644A). In some embodiments, while displaying the option to remove the personalized spatial audio profile, the computer system receives, via the one or more input devices, selection of the option to remove the personalized spatial audio profile (e.g., selection of 644A). In some embodiments, in response to receiving selection of the option to remove the personalized spatial audio profile, the computer system initiates a process to remove the personalized spatial audio profile (and/or removing the personalized spatial audio profile). Providing an option to remove a personalized spatial audio profile provides the user with better privacy by enabling the computer system to delete the information about the ear(s) of the user, thereby improving the privacy of the user and increasing the security of the information.

In some embodiments, the computer system (e.g., 600 and/or 601) is in communication with a display generation component (e.g., a display, a display controller, a head mounted display system, and/or a touch-sensitive display) and one or more input devices (e.g., a touch-sensitive surface (e.g., a touchscreen or a touchpad), a mouse, and/or a keyboard). In some embodiments, subsequent to generating, using the data about the portion of the head of the user, the personalized spatial audio profile for the user, the computer system displays, via the display generation component, an option to temporarily disable the personalized spatial audio profile and use a default spatial audio profile (e.g., 642A). In some embodiments, while displaying the option to temporarily disable the personalized spatial audio profile and use a default spatial audio profile, the computer system receives, via the one or more input devices, selection of the option to temporarily disable the personalized spatial audio profile and use a default spatial audio profile (e.g., selection of 642A). In some embodiments, in response to receiving selection of the option to temporarily disable the personalized spatial audio profile and using a default spatial audio profile, the computer system initiates a process to temporarily disable the personalized spatial audio profile and use a default spatial audio profile (and/or temporarily disabling the personalized spatial audio profile and using a default spatial audio profile). In some embodiments, while the personalized spatial audio profile(s) are temporarily disabled, the personalized spatial audio profile(s) remain available to the computer system to be re-enabled. In some embodiments, while the personalized spatial audio profile(s) are temporarily disabled, the computer system receives a request (e.g., one or more user inputs) to re-enable the personalized spatial audio profile(s). In response to receiving the request, the computer system re-enables the personalized spatial audio profile(s) without re-enrolling the spatial audio profile(s) of the user. Enabling the computer system to temporary use a default spatial audio profile, rather than the personalized spatial audio profile, enables the computer system to provide improved spatialized audio to users, such as guest users, who do not have an enrolled personalized spatial audio profile.

In some embodiments, the computer system (e.g., 600 and/or 601) is in communication with one or more audio output devices (e.g., headphones and/or earbuds) and one or more input devices (e.g., a touch-sensitive surface (e.g., a touchscreen or a touchpad), a mouse, and/or a keyboard). In some embodiments, subsequent to generating, using the data about the portion of the head of the user, the personalized spatial audio profile for the user (e.g., while the personalized spatial audio profile is enabled for audio at the computer system), the computer system receives, via the one or more input devices, a request to play audio. In some embodiments, in response to receiving the request to play audio, the computer system plays, via the one or more audio output devices (e.g., headphones 620), the audio as spatial audio (e.g., audio provided in FIG. 6R) using the personalized spatial audio profile for the user. In some embodiments, the personalized spatial audio profile for the user includes HRTF information for both of the user's ears. Playing spatial audio for a user using the personalized spatial audio profile of the user provides the user with higher quality audio and a more realistic/accurate spatialized audio experience.

Note that details of the processes described above with respect to method 700 (e.g., FIG. 7) are also applicable in an analogous manner to the methods described below For example, methods 800 and 1000 optionally includes one or more of the characteristics of the various methods described above with reference to method 700. For example, a personalized spatial audio profile enrolled as described in method 700 may be used to provide spatial audio as described in method 800. For another example, device 601 and device 900 are optionally the same device. For brevity, these details are not repeated below.

FIG. 8 is a flow diagram illustrating a method for synchronizing spatial audio profiles using a computer system in accordance with some embodiments. Method 800 is performed at a computer system (e.g., 100, 300, 500, 600, 601, and/or 900) (e.g., a smartphone, a smartwatch, a head mounted device (e.g., a head mounted augmented reality and/or extended reality device), and/or a personal computer) that is in communication with one or more audio output devices (e.g., 620 and/or 622) (e.g., speakers, headphones, and/or earbuds) and one or more input devices (e.g., a touch-sensitive surface (e.g., a touchscreen or a touchpad), a mouse, a camera, and/or a keyboard). Some operations in method 800 are, optionally, combined, the orders of some operations are, optionally, changed, and some operations are, optionally, omitted.

As described below, method 800 provides an intuitive way for synchronizing spatial audio profiles. The method reduces the cognitive burden on a user for synchronizing spatial audio profiles, thereby creating a more efficient human-machine interface. For battery-operated computing devices, enabling a user to synchronize spatial audio profiles faster and more efficiently conserves power and increases the time between battery charges.

In some embodiments, the computer system (e.g., 600) receives (802), via the one or more input devices, a request to play audio (e.g., user input requesting to play audio 608) (e.g., user input to play a song, user input to play a video, user input to participate in a real-time audio and/or video communication session, user input to initiate a computer game).

In some embodiments, in response to receiving the request to play audio, in accordance with a determination that a set of playback criteria are met, including a first playback criterion that is met when the audio is spatial audio and a second playback criterion that is met when a personalized spatial audio profile (e.g., a personalized head-related transfer function (HRTF) profile of a user of the computer system or a personalized non-HRTF profile of a user of the computer system) is available (e.g., available at the computer system and/or available for the computer system to access from a server) based on a spatial audio enrollment (e.g., of the user of the computer system) performed at an external electronic device (e.g., a device (e.g., phone, tablet, or computer) of the user of the computer system and/or a device that is logged into the same service using the same user account as the computer system) that is different from the computer system, the computer system plays (804), via the one or more audio output devices (e.g., headphones 620 and/or headphones 622), the audio as spatial audio (e.g., audio provided in FIG. 6R and/or audio provided by device 601 in FIG. 6T) using the personalized spatial audio profile that was enrolled at the external electronic device (e.g., device 601 is external to device 600). Playing spatialized audio at the computer system using a personalized spatial audio profile that was enrolled at another device enables the computer system to provide an improved audio experience when a personalized spatial audio profile of the user is available, regardless of at what device the audio profile was enrolled.

In some embodiments, in response to receiving the request to play audio, in accordance with a determination that a second set of playback criteria are met, including the first playback criterion that is met when the audio contains information that enables generation of spatial audio and a third playback criterion that is met when a personalized spatial audio profile (e.g., a personalized head-related transfer function (HRTF) profile of a user of the computer system or a personalized non-HRTF profile of a user of the computer system) is not available, playing, via the one or more audio output devices, the audio (e.g., audio 608 in FIG. 6B) as spatial audio using a default (e.g., not specific to the user of the computer system and/or not based on a personal HRTF of the user of the computer system) spatial audio profile. Playing spatial audio with a default spatial audio profile if no personalized spatial audio profile is available provides the user with a spatialized audio experience, even when a personalized spatial audio profile is not available, thereby providing the user with an improved audio experience.

In some embodiments, in response to receiving the request to play audio, in accordance with a determination that a third set of playback criteria are met, including a fourth playback criterion that is met when the audio does not contain information that enables generation of not spatial audio, playing, via the one or more audio output devices, the audio (e.g., audio 608 of FIG. 6A) without spatialization (e.g., without regard to whether or not the computer system has access to a default or personalized spatial audio profile). In some embodiments, the third set of playback criteria is not based on the availability of a spatial audio profile. Playing non-spatial audio without spatialization enables the computer system to provide the audio output as it was intended (e.g., without spatialization), thereby providing the user with an accurate audio experience.

In some embodiments, the computer system (e.g., 600) is associated with an external device (e.g., 601) (e.g., a remote computer system that is optionally in communication with the computer system and/or a device that is logged into a same user account as the computer system). In some embodiments, the computer system receives, via the one or more input devices (e.g., 604), an input (e.g., selection of an option during a device enrollment process, selection of a configuration option, and/or the request to play audio). In some embodiments, in response to receiving the input and in accordance with a determination that a personalized spatial audio profile (e.g., a personalized head-related transfer function (HRTF) profile of a user of the computer system or a personalized non-HRTF profile of a user of the computer system) is not available and that the external device is configured to generate a personalized spatial audio profile (e.g., the external device has the required hardware (e.g., biometric sensors (e.g., one or more cameras and/or one or more depth sensors)) and/or the requires software), the computer system initiates a process to prompt (e.g., 622 and/or 624) (e.g., prompt with a visual prompt, audio prompt, and/or tactile prompt) a user to enroll (e.g., create via a spatial audio enrollment process and/or via an imaging process) a personalized spatial audio profile using the external device (e.g., 601). In some embodiments, the prompt is for the user to use the external device for a portion of the process of generating the personalized spatial audio profile (e.g., the external device is used to collect the ear geometry and the computer system receives the collected ear geometry information and uses it (e.g., with other information) to generate the personalize spatial audio profile). Initiating a process to prompt the user to enroll a personalized spatial audio profile using the external device provides the user with feedback that a personalized spatial audio profile is not available and that an external device is capable of generating a personalized spatial audio profile, thereby providing the user with improved feedback.

In some embodiments, initiating the process to prompt the user to enroll a personalized spatial audio profile using the external device includes prompting, at the computer system, the user to perform, using the external device, one or more actions (e.g., 654 and/or 694) (e.g., determine an ear geometry of the user and/or generate a spatial audio profile for the user) of a process to enroll a personalized spatial audio profile. Prompting the user, at the computer system, to enroll a personalized spatial audio profile using the external device provides the user with feedback (at the device the user is actively using) that a personalized spatial audio profile is not available and that an external device is capable of generating a personalized spatial audio profile, thereby providing the user with improved feedback.

In some embodiments, initiating the process to prompt the user to enroll a personalized spatial audio profile using the external device includes transmitting information (e.g., transmitting a command) (e.g., to a server and/or to the external device) to cause the external device (e.g., 601) to prompt (e.g., 624 and/or 654) (e.g., visual prompt, audio prompt, and/or tactile prompt) the user to perform, using the external device, one or more actions (e.g., determine an ear geometry of the user and/or generate a spatial audio profile for the user) of a process to enroll a personalized spatial audio profile. In some embodiments, the second device determines an ear geometry of the user, which is transmitted to the computer system, and the computer system uses the ear geometry to generate the personalized spatial audio profile of the user. In some embodiments, the second device determines an ear geometry of the user and/or generates the personalized spatial audio profile of the user. Prompting the user, at the external device, to enroll a personalized spatial audio profile using the external device provides the user with feedback (at the device capable of geniting the audio profile) that a personalized spatial audio profile is not available and that this particular external device is capable of cable of generating the personalized spatial audio profile, thereby providing the user with improved feedback.

In some embodiments, the determination that the external device is configured to generate a personalized spatial audio profile incudes a determination that the external device (e.g., 601) includes a respective type of one or more biometric sensors (e.g., one or more cameras and/or one or more depth sensors). In some embodiments, the respective type of one or more biometric sensors are capable of determining a geometry of one or more of the ears of the user. Determining that the external device includes a respective type of one or more biometric sensors enables the computer system to recommend a particular external device with the proper hardware for enrolling the personalized spatial audio profile.

In some embodiments, the computer system (e.g., 600 and/or 601) generates, based on first information (e.g., ear geometry and/or head geometry) captured at the external device and second information (e.g., information generated at the computer system and/or information not received from the external device; head geometry and/or face geometry), different from the first information, available at the computer system, a personalized spatial audio profile of the user of the computer system. Combining information captured by the external device with information available at the computer system to generate the personalized spatial audio profile enables the computer system to use more information about the user to generate a more accurate spatial audio profile for the user, thereby improving the spatial audio experiences.

In some embodiments, the first information includes ear information (e.g., as shown in FIGS. 6M-6O) (e.g., geometry of an ear of the user and/or dimensions of an ear of the user). In some embodiments, the second information includes face geometry information (e.g., as shown in FIG. 6G) (e.g., geometry of the face of the user, geometry of facial features of the user, and/or dimensions of the face and/or facial features of the user). In some embodiments, the face geometry information is captured during a biometric authentication enrollment process and/or an avatar creation enrollment process. In some embodiments, the face geometry information is used, prior to use to generate the personalized spatial audio profile, to unlock the computer system using biometric authentication. Combining ear information from the external device and face geometry information from the computer system to generate the personalized spatial audio profile enables the computer system to use more information about the user to generate a more accurate spatial audio profile for the user, thereby improving the spatial audio experiences.

In some embodiments, using the personalized spatial audio profile includes, in accordance with a determination that a first set of headphones (e.g., headphones 620 and/or headphones 622) are currently being worn by the user (e.g., 606 and/or 609) of the computer system, using a first personalized spatial audio profile (e.g., that corresponds to the first set of headphones) without using a second personalized spatial audio profile. In some embodiments, using the personalized spatial audio profile includes, in accordance with a determination that a second set of headphones (e.g., headphones 620 and/or headphones 622), different from the first set of headphones, are currently being worn by the user (e.g., 606 and/or 609) of the computer system, using the second personalized spatial audio profile (e.g., that corresponds to the second set of headphones) without using the first personalized spatial audio profile. In some embodiments, the first set of headphones are over-ear headphones and the second set of headphones are in-ear headphones. In some embodiments, the first set of headphones are on-ear headphones and the second set of headphones are in-ear headphones. In some embodiments, a set of headphones is a pair of headphones. Selecting from among various personalized spatial audio profiles based on the headphones being used allows a personalized spatial audio profile configured for a particular headphone to be used by the same user for an improved spatial audio experience and/or enables different users to use their own respective personalized spatial audio profiles by using particular headphones, thereby providing the user with an enhanced spatial audio experience.

In some embodiments, a third personalized spatial audio profile corresponding to a first user (e.g., 606 and/or 609) and a fourth personalized spatial audio profile corresponding to a second user (e.g., 606 and/or 609), different from the personalized spatial audio profile corresponding to the first user are accessible at the computer system (e.g., are available on a server, are stored locally, and/or have been received from a server and/or an external device). In some embodiments, the personalized spatial audio profile includes, in accordance with a determination that a first set of headphones are currently being worn by a user of the computer system, the third personalized spatial audio profile corresponding to the first user. In some embodiments, the personalized spatial audio profile includes, in accordance with a determination that a second set of headphones (e.g., headphones 620 and/or headphones 622), different from the first set of headphones (e.g., headphones 620 and/or headphones 622), are currently being worn by the user of the computer system, the fourth personalized spatial audio profile corresponding to the second user. In some embodiments, the computer system uses a different personalized spatial audio profiles corresponding to different users based on which set of headphones are currently in use. Selecting from among various personalized spatial audio profiles based which user is wearing the headphones enables different users to use their own respective personalized spatial audio profiles at the computer system, thereby providing the users with enhanced spatial audio experiences.

In some embodiments, while playing, via a first set of headphones (e.g., headphones 620 and/or headphones 622), of the one or more audio output devices, associated with a first user of the computer system, the audio as spatial audio using the personalized spatial audio profile (e.g., that corresponds to a user of the computer system) that was enrolled at the external electronic device, the computer system plays (e.g., in response to request to play audio and in accordance with a determination that the audio is spatial audio and that the personalized spatial audio and the second personalized spatial audio are available at the computer system), via a second set of headphones (e.g., headphones 620 and/or headphones 622), of the one or more audio output devices, associated with a second user, different from the first user, of the computer system, the audio as spatial audio using a second personalized spatial audio profile (e.g., that corresponds to the second user and/or that was enrolled at an external electronic device) that is different from the personalized spatial audio profile. Concurrently outputting audio using two different personalized spatial audio profiles at two different headphones allows two separate user to concurrently experience the same spatial audio using their own respective personalized spatial audio profiles, thereby allowing both users to concurrently participate in respective enhanced spatial audio experiences.

In some embodiments, the computer system is in communication with a display generation component (e.g., a display, a display controller, a head mounted display system, and/or a touch-sensitive display). In some embodiments, the computer system displays, via the display generation component, an option (e.g., 624A) to disable use of the personalized spatial audio profile. In some embodiments, the set of playback criteria includes a fifth playback criterion that is met when use of personalized spatial audio profiles is not disabled. In some embodiments, the computer system receives, via the one or more input devices, selection of the option to disable use of personalized spatial audio profiles (e.g., selection of 642A). In some embodiments, in response to receiving selection of the option to disable use of personalized spatial audio profiles, the computer system disables use of personalized spatial audio profiles (e.g., including disabling use of the personalized spatial audio profile, the first personalized spatial audio profile, and the second personalized spatial audio profile). In some embodiments, when personalized spatial audio profiles are disabled at the computer system, the computer system uses a default (non-personalized) spatial audio profile for playing spatial audio. In some embodiments, when use of personalized spatial audio profiles is disabled, the computer system treats personalized spatial audio profiles as though they are not available (e.g., third playback criterion is met). Disabling use of personalized spatial audio profiles enables the computer system to be used by different users (e.g., guests) who do not have an enrolled personalized spatial audio profile and/or for the computer system to output audio without spatialization when the user prefers, thereby providing an enhanced audio experience.

In some embodiments, the computer system is in communication with a display generation component (e.g., a display, a display controller, a head mounted display system, and/or a touch-sensitive display). In some embodiments, the computer system displays, via the display generation component, an option to delete a respective personalized spatial audio profile (e.g., 644A). In some embodiments, the computer system receives, via the one or more input devices, selection of the option to delete the respective personalized spatial audio profile (e.g., selection of 644A). In some embodiments, in response to receiving selection of the option to delete the respective personalized spatial audio profile, the computer system initiates a process to cause the respective personalized spatial audio profile to be deleted from the computer system and one or more other devices (e.g., all or multiple devices associated with and/or logged into the same user account). In some embodiments, the computer system causes the respective personalized spatial audio profile to be deleted from the one or more other devices by transmitting a command to a server and/or the one or more other devices to delete the respective personalized spatial audio profile. In some embodiments, once the respective personalized spatial audio profile has been deleted, respective personalized spatial audio profile is no longer available to the computer system. Enabling the computer system to delete a personalized spatial audio profile at the multiple devices at the user's request enables better privacy for the user and improves the security of the system.

In some embodiments, the computer system (e.g., 600) is a shared media consumption device (e.g., a shared computer, tablet, a television and/or a set-top box configured to output audio/video to a television). Using personalized spatial audio profiles at a shared media consumption device enables multiple users of the device to (concurrently or individually) participate in enhanced spatial audio experiences.

In some embodiments, the computer system is an augmented reality device (e.g., a head-mounted device). In some embodiments, the display generation component is a head-mounted display. In some embodiments, the head-mounted device is configured to be worn on the head of a user such that the head-mounted display is positioned in front of the eyes of a user, enabling the user to experience a three-dimensional environment that includes one or more virtual elements and optionally a representation of a physical space surrounding the user (e.g., a VR environment with optical or virtual passthrough capabilities). In some embodiments, the augmented reality device includes an integrated audio output device (e.g., headphones) for outputting audio (e.g., non-spatialized audio and/or spatial audio). In some embodiments, the audio output device is connected (e.g., wirelessly or wired) to the head-mounted device. Using personalized spatial audio profiles at an augmented reality device enables the user of the device to participate in enhanced spatial audio experiences (e.g., while participating in enhanced three-dimensional experiences using the augmented reality device).

Note that details of the processes described above with respect to method 800 (e.g., FIG. 8) are also applicable in an analogous manner to the methods described below and/or above. For example, method 700 and 1000 optionally includes one or more of the characteristics of the various methods described above with reference to method 800. For example, a personalized spatial audio profile enrolled as described in method 700 may be used provide spatial audio as described in method 800. For another example, device 601 and device 900 are optionally the same device. For brevity, these details are not repeated below.

FIGS. 9A-9F illustrate exemplary user interfaces for managing settings, in accordance with some embodiments. The user interfaces in these figures are used to illustrate the processes described below, including the processes in FIG. 10.

Figure 9A:
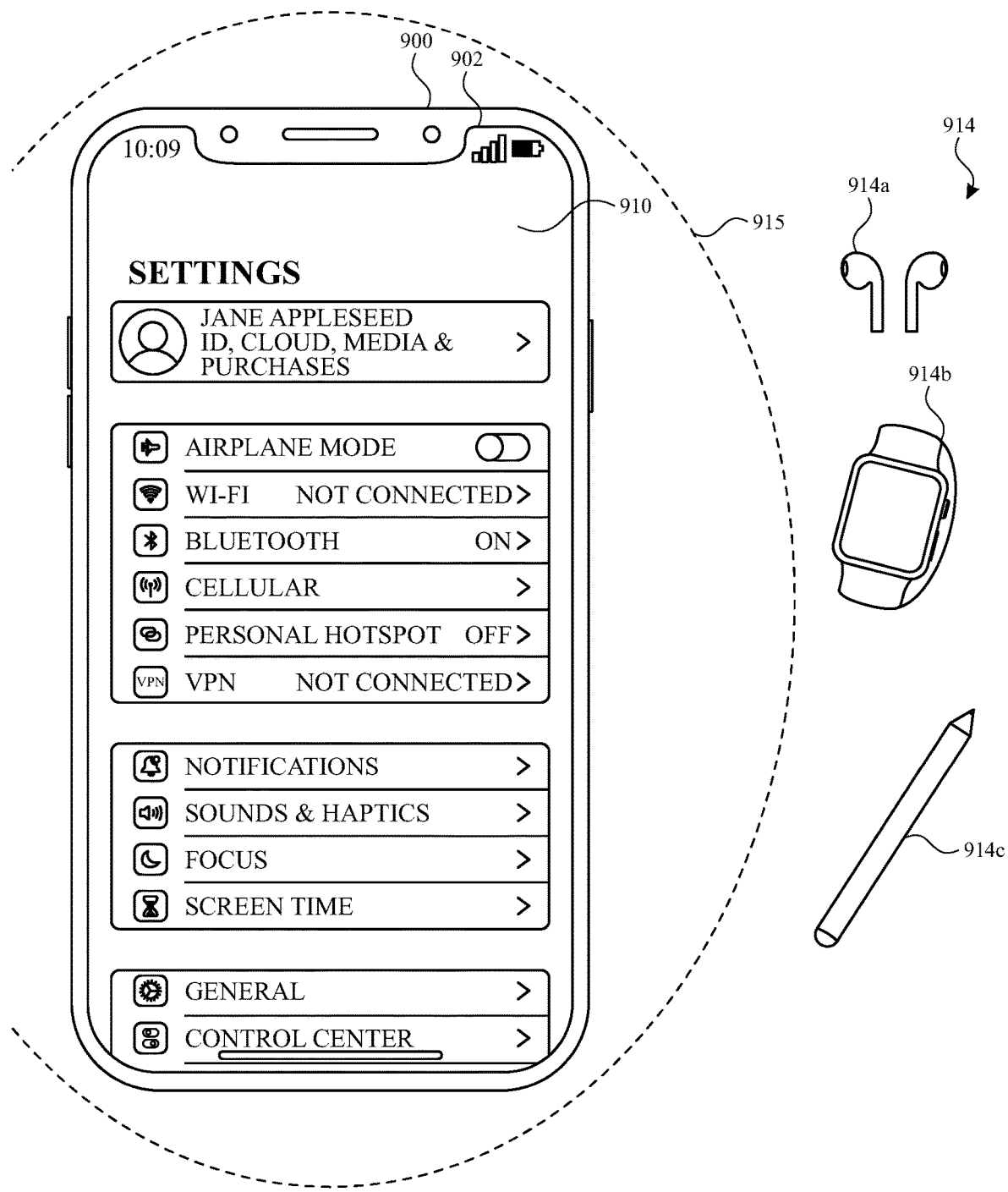
FIGS. 9A-9F illustrate exemplary user interfaces for managing settings in accordance with some embodiments.

In FIG. 9A, device 900 displays, on display 902, a settings interface 910 for managing various settings of device 901 and/or a user account for a user of device 900. While device 900 displays settings interface 910, accessories 914 are located outside of a predetermined range 915 of device 900. In some embodiments, accessories 914 include headphones 914a, wearable device 914b, and/or electronic pencil 914c.

In some embodiments, device 900 displays, in settings interface 910, an accessory affordance for each accessory located within range 915. In some embodiments, each accessory affordance may be selected to display a settings interface corresponding to the respective accessory. Because in FIG. 9A, no accessories 914 are within range 915, device 900 displays settings interface 910 with no accessory affordances.

Figure 9B:
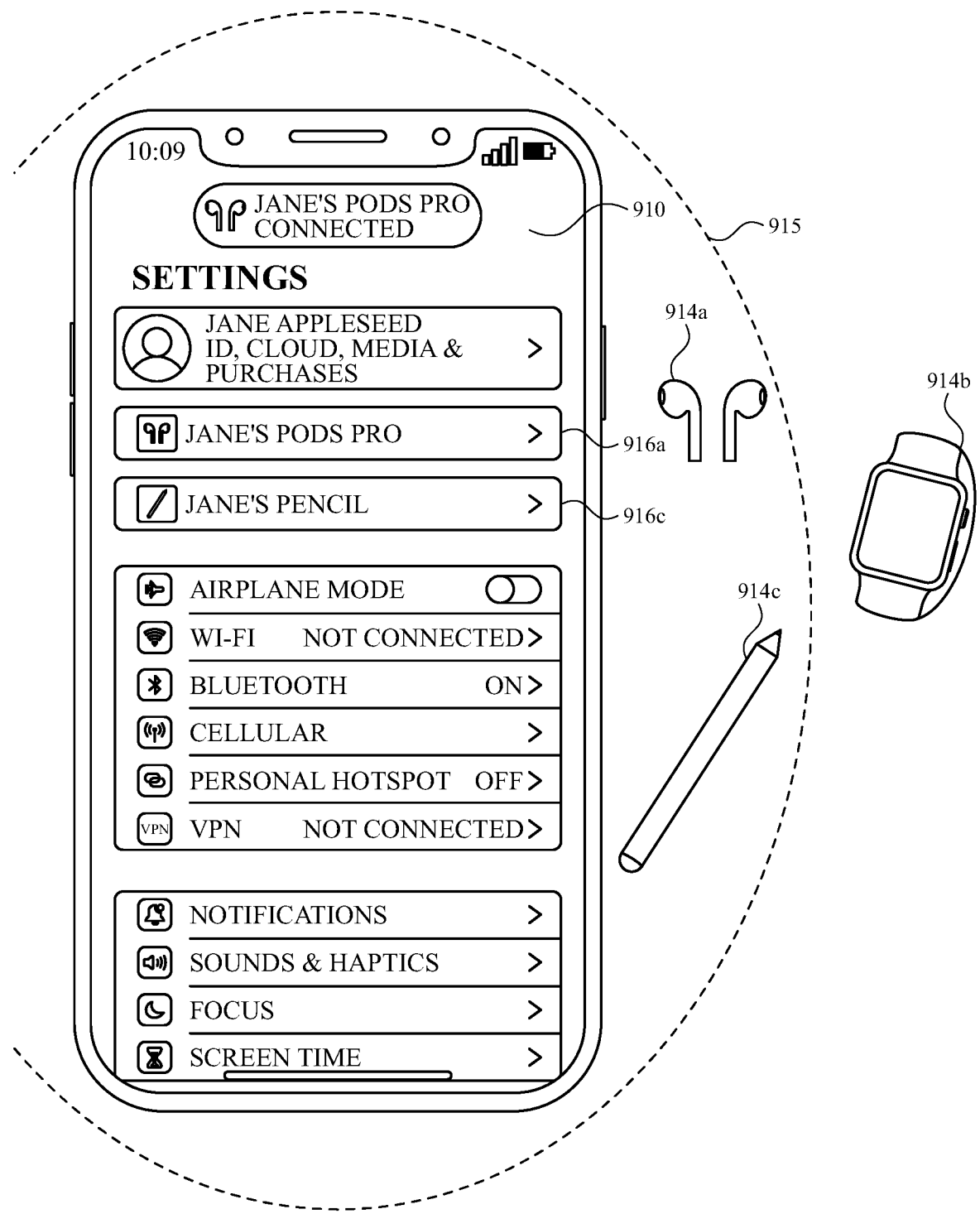

In FIG. 9B, accessories 914a and 914c (and/or device 900) have been moved such that they are located within range 915. Accordingly, device 900 displays, in settings interface 910, accessory affordance 916a corresponding to headphones 914a and displays accessory affordance 916c corresponding to electric pencil 916c. Accessory affordance 916a, when selected, causes display of a settings interface for headphones 914a. Accessory affordance 916c, when selected, causes display of a settings interface for electronic pencil 914c.

Figure 9C:
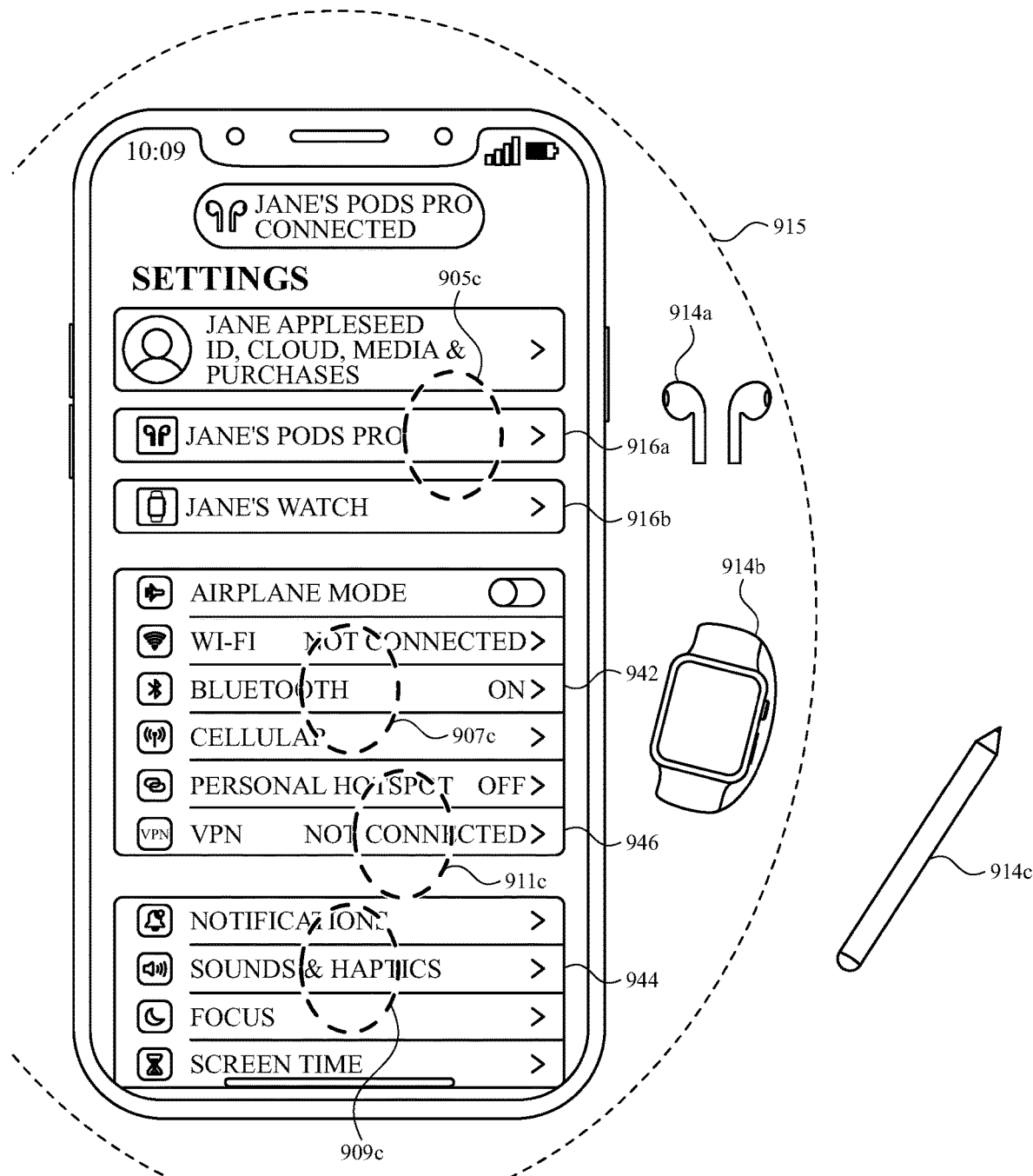

In FIG. 9C, accessory 914b has been moved such that it is located within range 915, and accessory 914c has been moved such that it is located outside of range 915. Because headphones 914a has remained within range 915, device 900 maintains display of accessory affordance 916a. Because wearable device 914b has moved within range 915 and electronic pencil 914c has moved outside of range 915, device 900 displays accessory affordance 916b corresponding to wearable device 914b in settings interface 910 and removes display of accessory affordance 916c from settings interface 910. Accessory affordance 916b, when selected, causes display of a settings interface for wearable device 914b.

While examples described herein are directed to selectively displaying accessory affordances based on proximity of accessories to device 900, it will be appreciated that accessory affordances may, additionally or alternatively, be displayed (or not displayed) based on one or more other criteria. By way of example, accessory affordance 916a may be selectively displayed based on whether headphones 914a are worn by a user, whether headphones 914a are stored in a case for headphones 914a, whether a case for headphones 914a is in a particular state (e.g., open and/or partially open), and/or whether headphones 914a are within range 915. As another example, accessory affordance 916b may be selectively displayed based on whether wearable device 914b is currently worn by a user and/or whether wearable device 914b is within range 915. As yet another example, accessory affordance 916c may be selectively displayed based on whether electronic pencil 914C is powered on (e.g., is being used) and/or whether electronic pencil 914C is within range 915. It will be appreciated that such examples are merely exemplary and are not intended to be limiting, and any number of criteria may be used to determine, for each affordance, whether the affordance is displayed in settings interface 910.

Figure 9D:
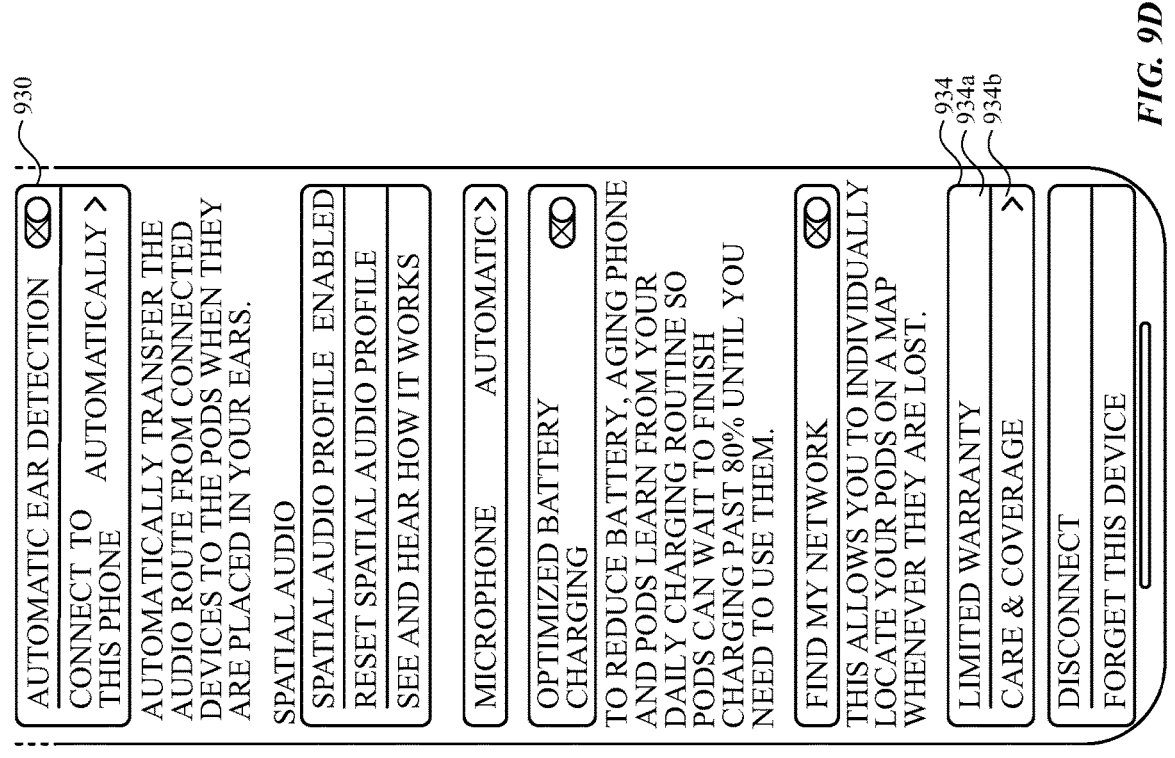
Figure 9D:
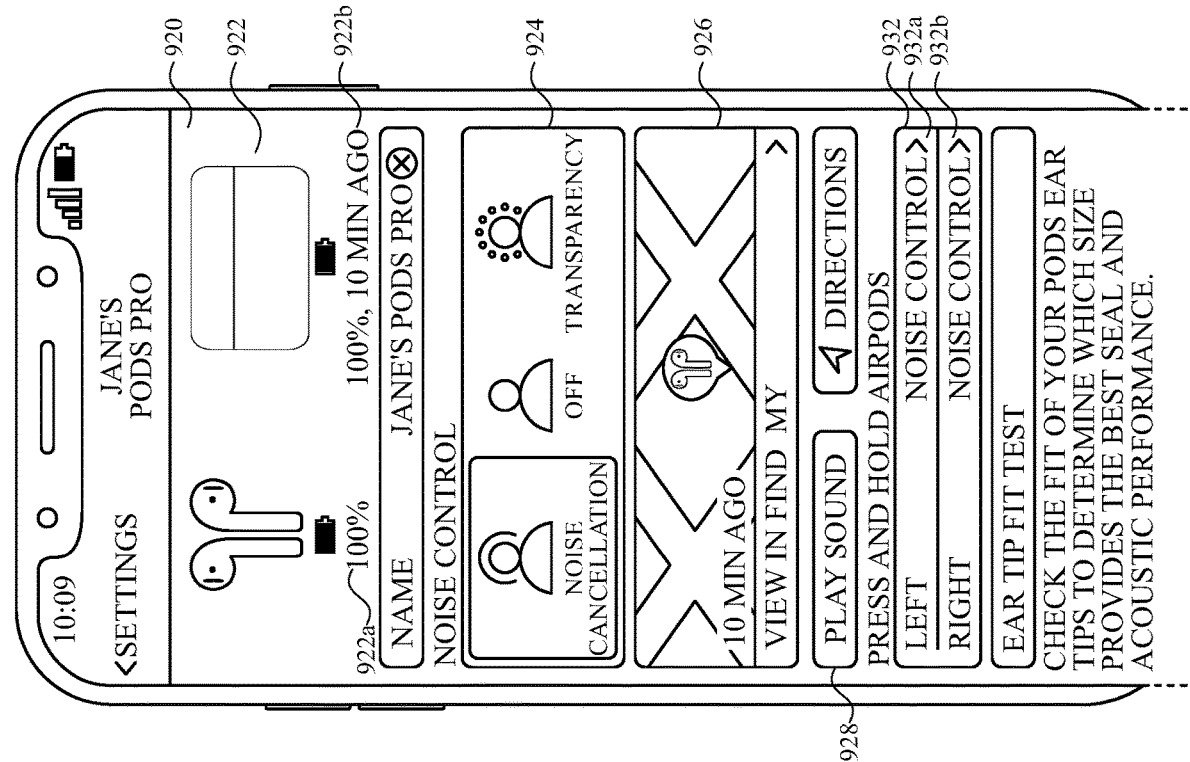

At FIG. 9C, while displaying settings interface 910, device 900 detects selection of accessory affordance 916a. The selection is a tap gesture 905c on accessory affordance 916a or other selection input directed to accessory affordance 916a). As shown in FIG. 9D, in response to detecting tap gesture 905c or other selection input directed to accessory affordance 916a, device 900 displays settings interface 920 corresponding to headphones 914a.

In some embodiments, settings interface 920 includes accessory status portion 922. Accessory status portion 922 includes status portion 922a corresponding to headphones 914a (e.g., FIG. 9C) and status portion 922b corresponding to a case of headphones 914a. In some embodiments, status portion 922a includes one or more status indicators indicating various states of headphones 914a. By way of example, status portion 922a optionally indicates a connectivity state of headphones 914a (e.g., connected or disconnected) and/or a charge level of headphones 914. In some embodiments, status portion 922b includes one or more status indicators indicating various states of the case for headphones 914a. By way of example, status portion 922b optionally indicates a connectivity state of headphones 914a and/or a charge level of the case for headphones 914.

In some embodiments, device 900 indicates when data corresponding to various states of accessories (e.g., headphones 914a and/or a case for headphones 914a) is not current (e.g., not updated within a threshold amount of time). As shown in status portion 922b, for example, device 900 indicates that data corresponding to the status of the case for headphones 914a was last received 10 minutes prior to display of settings interface 920.

In some embodiments, settings interface 920 includes noise control option 924. In some embodiments, noise control option 924 is used to manage one or more noise cancellation features of headphones 914a. When noise control option 924 is set to "noise cancellation", a noise cancellation feature is enabled on headphones 914a. When noise control option 924 is set to "transparency", a feature for reproducing environmental sound is enabled on headphones 924a. When noise control option 924 is set to "OFF", no noise cancellation feature or feature for reproducing environmental sound is enabled on headphones 914a.

In some embodiments, settings interface 920 includes location information 926. Location information 926 indicates the most recently known location of headphones 914a and/or the case for headphones 914. In some embodiments, device 900 indicates when data corresponding to locations accessories (e.g., headphones 914a and/or a case for headphones 914a) is not current. As shown in location information 926, for example, device 900 indicates that data corresponding to the location of the case for headphones 914a was last received 10 minutes prior to display of settings interface 920.

In some embodiments, settings interface 920 includes audio alert affordance 928. Audio alert affordance, when selected, causes device 900 to transmit a command to headphones 914a and/or the case of headphones 914a to output a sound (e.g., alert). The sound outputted in response to the command allows a user to more easily locate headphones 914a and/or the case of headphones 914a, in some examples.

In some embodiments, settings interface 920 includes ear detection option 930. Ear detection option 930, when enabled, allows headphones 914a and/or device 900 to determine when headphones 914a are worn by a user. When one or more of headphones 914a are removed, audio provided by device 900 may be paused or stopped. When the removed headphone(s) is returned to the user's ear(s), playback is, optionally, resumed.

In some embodiments, settings interface 920 includes control affordances 932. Control affordances 932 includes a first control affordance 932a which, when selected, allows a user to select one or more tasks that are performed in response to an input on a first headphone of headphones 914a (e.g., a left headphone). Control affordances includes a second control affordance 932b which, when selected, allows a user to select one or more tasks that are performed in response to an input on a second headphone of headphones 914a (e.g., a right headphone).

In some embodiments, settings interface 920 includes accessory coverage portion 934. Accessory cover portion 934 includes warranty affordance 934a and care affordance 934b. Warranty affordance 934a, when selected, causes device 900 to display an interface indicating one or more aspects of a warranty for headphones 914a, including but not limited to, an amount of time headphones 914a are to remain under warranty and the terms of the warranty. Care affordance 934b, when selected, causes device 90 to display an interface indicating one or more aspects of a service policy for headphones 914a.

Figure 9F:
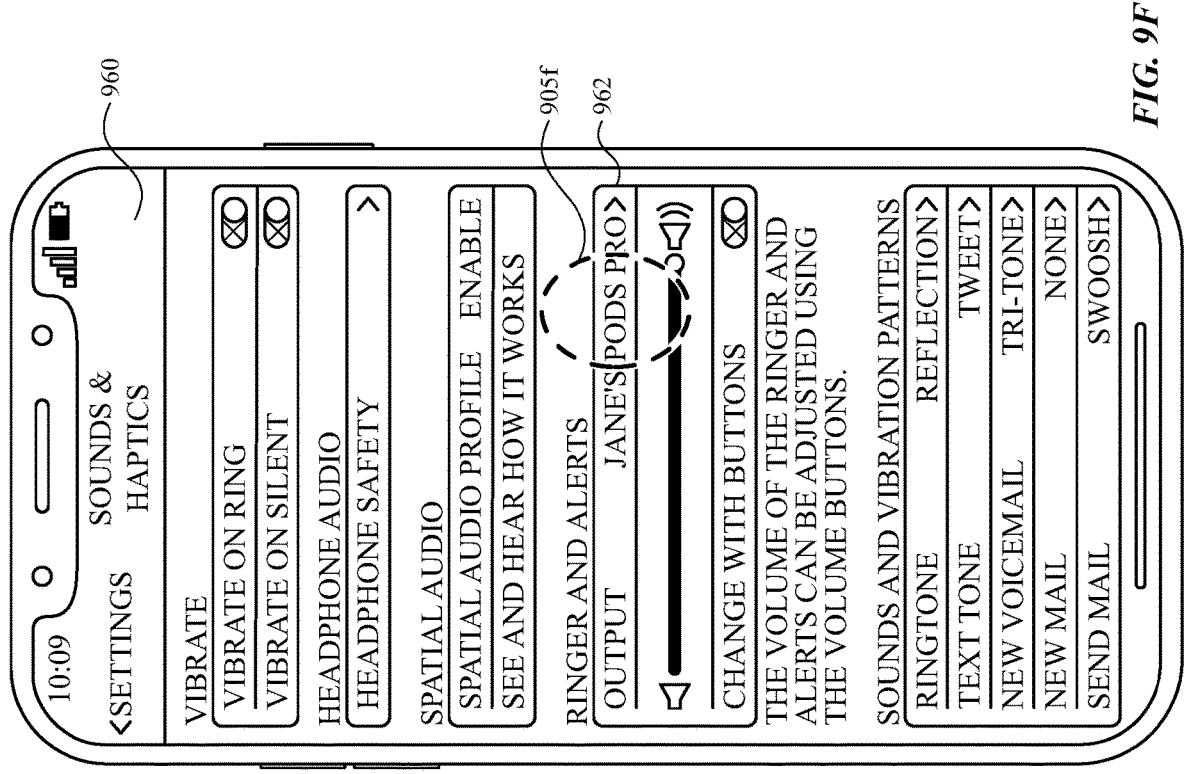
Figure 9E:
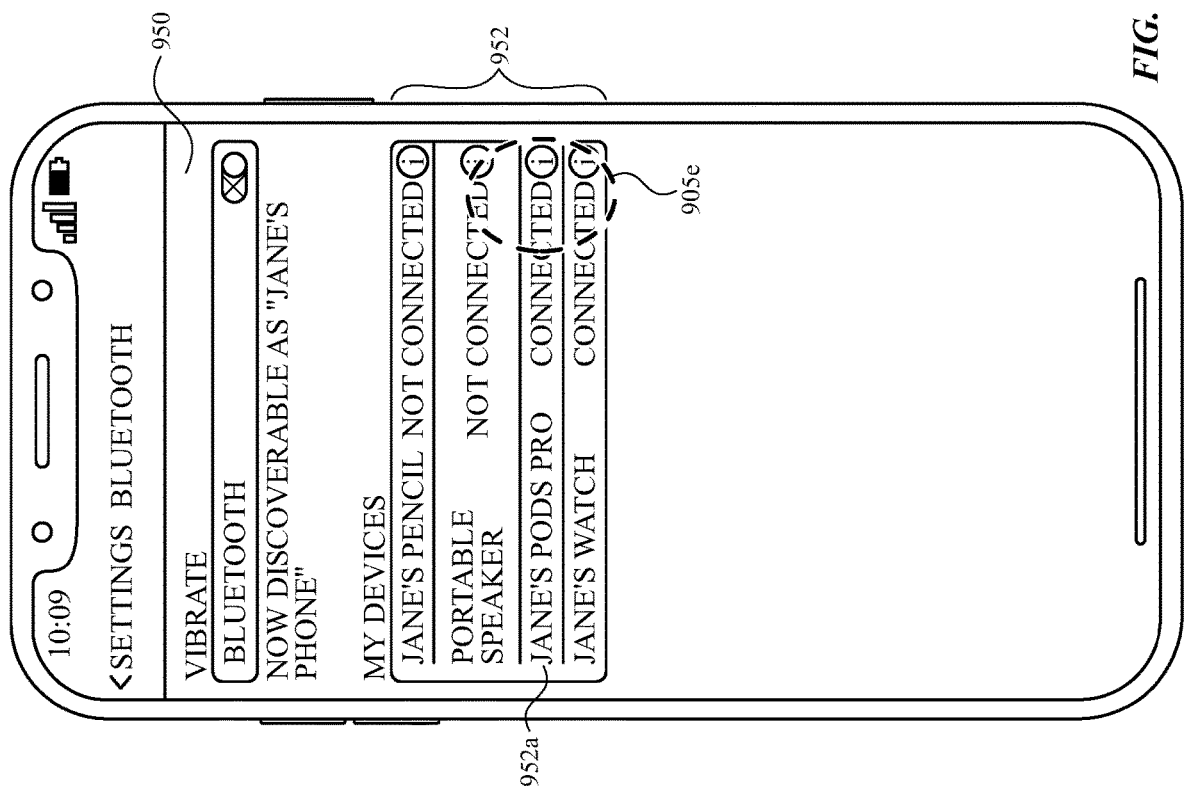

While description is made herein with respect to accessing settings interface 920 via settings interface 910, it will be appreciated that settings interface 920 is accessed in other manners in some embodiments. As an example, with reference to FIG. 9C, while displaying settings interface 910, device 900 detects selection of Bluetooth affordance 942. The selection is a tap gesture 907c on Bluetooth affordance 942 or other selection input directed to Bluetooth affordance 942. As shown in FIG. 9E, in response to detecting tap gesture 907c or other selection input directed to Bluetooth affordance 942, device 900 displays Bluetooth interface 950. Bluetooth interface 950 includes accessory affordances 952 corresponding to various accessories known to device 900. In some embodiments, accessory affordances 952 include accessory affordance 952a, corresponding to accessory 914a. While displaying Bluetooth interface 950, device 900 detects selection of accessory affordance 952a. The selection is a tap gesture 905e on accessory affordance 952a or other selection input directed to accessory affordance 952a. In response to detecting tap gesture 905e or other selection input directed to accessory affordance 952a, device 900 displays settings interface 920.

As another example, with reference once again to FIG. 9C, while displaying settings interface 910, device 900 detects selection of sound settings affordance 944. The selection is a tap gesture 909c on sound settings affordance 944 or other selection input directed to sound settings affordance 944. As shown in FIG. 9F, in response to detecting tap gesture 909c or other selection input directed to sound settings affordance 944, device 900 displays sound settings interface 960. Sounds settings interface 960 includes accessory affordance 962 corresponding to accessory 914a. While displaying sound settings interface 960, device 900 detects selection of accessory affordance 962. The selection is a tap gesture 905f on accessory affordance 962 or other selection input directed to accessory affordance 962. In response to detecting tap gesture 905f or other selection input directed to accessory affordance 962, device 900 displays settings interface 920.

Although description is made herein with respect to various audio features that are managed using settings interface 910 and/or settings interface 920, it will be appreciated that such interfaces are optionally also used to manage features not directed to audio and/or accessories. By way of example, with reference to FIG. 9C, while displaying settings interface 910, device 900 detects selection of network affordance 946. The selection is a tap gesture 911c on network affordance 946 or other selection input directed to network affordance 946. In response to detecting tap gesture 911c or other selection input directed to network affordance 946, device 900 displays one or more user interfaces for managing network connectivity of device 900 including, but not limited to, use of a virtual private network (VPN).

FIG. 10 is a flow diagram illustrating a method for managing settings using a computer system in accordance with some embodiments. Method 1000 is performed at a computer system (e.g., 100, 300, 500, 600, 601, and/or 900) (e.g., a smartphone, a smartwatch, a head mounted device (e.g., a head mounted augmented reality and/or extended reality device), and/or a personal computer) that is in communication with a display generation component (e.g., a display, a display controller, a head mounted display system, and/or a touch-sensitive display) and one or more input devices (e.g., a touch-sensitive surface (e.g., a touchscreen or a touchpad), a mouse, a camera, a microphone, and/or a keyboard). Some operations in method 1000 are, optionally, combined, the orders of some operations are, optionally, changed, and some operations are, optionally, omitted.

As described below, method 1000 provides an intuitive way for managing settings. The method reduces the cognitive burden on a user for managing settings, thereby creating a more efficient human-machine interface. For battery-operated computing devices, enabling a user to manage settings faster and more efficiently conserves power and increases the time between battery charges.

In some embodiments, the computer system (e.g., 900) receives (1002), via the one or more input devices, a request (e.g., user input at a touch-sensitive surface, user input via air gestures, audio user input, and/or another request) (e.g., an audio request to display user interface 910 and/or user input selecting a displayed UI option to display user interface 910) to display system settings of the computer system.

In some embodiments, in response to receiving the request to display system settings of the computer system, the computer system displays (1004), via the display generation component, a system settings user interface (e.g., 910) that includes a plurality of selectable options (e.g., 946, notifications option in FIG. 9A, and/or focus option in FIG. 9A) associated with functions other than wireless accessory management (e.g., a first function to enable an airplane mode of the computer system, a second function to initiate a process to connect to a Wi-Fi network, a third function to initiate a process to configure a VPN, and/or a fourth function to initiate a process to configure device notification settings).

In some embodiments, the system settings interface (e.g., 910) includes, in accordance with (1006) a determination that a wireless accessory (e.g., 914a, 914b, and/or 914c) (e.g., headphones, smartwatch, or stylus) meets a set of one or more connectivity criteria, displaying, via the display generation component, the system settings user interface with a user interface object (e.g., 916a, 916b, and/or 916c) associated with settings for (e.g., that when selected displays settings for and/or that includes setting information for) the wireless accessory (e.g., 914a, 914b, and/or 914c), wherein the user interface object associated with settings for the wireless accessory is displayed concurrently with the plurality of selectable options associated with functions other than wireless accessory management.

In some embodiments, the system settings interface (e.g., 910) includes, in accordance with (1008) a determination that the wireless accessory (e.g., 914a, 914b, and/or 914c) does not meet the set of one or more connectivity criteria, displaying, via the display generation component, the system settings user interface (e.g., 910) without displaying the user interface object associated with settings for the wireless accessory (e.g., 916a, 916b, and/or 916c) (e.g., as shown in FIG. 9A). Displaying the system settings user interface with a user interface object associated with settings for the wireless accessory when the wireless accessory is connected (e.g., without concurrently listing wireless accessories that are not connected) enables the computer system to provide an easily accessible option to configure the wireless accessory, thereby reducing the number of input required to access the settings of the wireless accessory.

In some embodiments, the set of one or more connectivity criteria includes a proximity criterion (e.g., wireless accessories within range 915) that is met when a respective wireless accessory (e.g., 914a, 914b, and/or 914c) is within a threshold range (e.g., range 915) (e.g., distance and/or wireless range) of the computer system. In some embodiments, the wireless accessory is within a first wireless range (and, optionally, communicating with) the computer system but is not within the threshold range. In some embodiments, once the wireless accessory and the computer system come closer together, the wireless accessory is within a second wireless range (and, optionally, communicating with) the computer sys and is within the threshold range. In some embodiments, the proximity criteria is met when the wireless accessory is less than a threshold distance from the computer system and is not met when the wireless accessory is more than the threshold distance from the computer system. In some embodiments, different wireless accessories use different sets of one or more connectivity criteria (e.g., a first accessory uses a first set of one or more connectivity criteria and a second accessory uses a second set of one or more connectivity criteria that is different from the first set of one or more connectivity criteria). In some embodiments, multiple (e.g., all or a subset of) criterions of a respective set of one or more connectivity criteria are required to be met for the respective set of one or more connectivity criteria to be met. Including proximity criterion for displaying the user interface object associated with settings for the wireless accessory enables the computer system to display the user interface object for nearby accessories that the user is likely to use, rather than all accessories (e.g., regardless of their location/availability) of the user, thereby reducing the clutter of the user interface and improved the man-machine interface.

In some embodiments, the set of one or more connectivity criteria includes an open case criterion that is met when a respective wireless accessory (e.g., 914*a*) is in a state in which a case (e.g., with a lid and/or opening that can be opened and closed) of the respective wireless accessory is open (e.g., case for headphones 914*a* is open). In some embodiments, the wireless accessory is a set of headphones and the set of headphones are configured to be stored in and/or charged by the case. In some embodiments, the respective wireless accessory is electrically, physically, and/or magnetically connected to the case of the respective wireless accessory (e.g., while the respective wireless accessory is in the case and/or while respective wireless accessory is not in active use). Including an open case criterion for displaying the user interface object associated with settings for the wireless accessory enables the computer system to display the user interface object for accessories that are being access by the user, rather than all accessories (e.g., regardless of their location/availability) of the user, thereby reducing the clutter of the user interface and improved the man-machine interface.

In some embodiments, the set of one or more connectivity criteria includes a use criterion that is met when a respective wireless accessory is being used (e.g., electronic pencil 914*c* is in use/being held and/or headphones 914*a* are being worn) (e.g., is in hands, has been removed from a case of the accessory, and/or is placed in/on/over ears). In some embodiments, the respective wireless accessory is electrically, physically, and/or magnetically connected to the case of the respective wireless accessory (e.g., while the respective wireless accessory is in the case and/or while respective wireless accessory is not in active use). Including use criterion for displaying the user interface object associated with settings for the wireless accessory enables the computer system to display the user interface object for accessories that are being access by the user, rather than all accessories (e.g., regardless of their location/availability) of the user, thereby reducing the clutter of the user interface and improving the man-machine interface.

In some embodiments, the wireless accessory is a pair of headphones (e.g., headphones 914*a*) (e.g., in-ear, on-ear, and/or over-ear headphones). Displaying the user interface object associated with settings for a pair of headphones enables the computer system to provide the user with quick and easy access to the headphone's settings, thereby reducing the number of inputs required to access the settings.

In some embodiments, the wireless accessory is a smartwatch (e.g., 914*b*). Displaying the user interface object associated with settings for a smartwatch enables the computer system to provide the user with quick and easy access to the smartwatch's settings, thereby reducing the number of inputs required to access the settings.

In some embodiments, the wireless accessory is a stylus (e.g., 914*c*) (e.g., an active stylus that communicates with a device having a touch-sensitive surface using Bluetooth or another short-range wireless communication). Displaying the user interface object associated with settings for a stylus enables the computer system to provide the user with quick and easy access to the stylus's settings, thereby reducing the number of inputs required to access the settings.

In some embodiments, the computer system (e.g., 900) displays, via the display generation component and concurrently with the user interface object associated with settings for (e.g., that when selected displays settings for and/or that includes setting information for) the wireless accessory (e.g., 916*a*, 916*b*, and/or 916*c*), a second user interface object associated with settings for a second wireless accessory that is different from the first wireless accessory (e.g., 916*a*, 916*b*, and/or 916*c*) (e.g., the same type (e.g., headphones, smartwatch, or stylus) as the wireless accessory or a type different from the wireless accessory). In some embodiments, the computer system displays, via the display generation component and concurrently with the user interface object associated with settings for (e.g., that when selected displays settings for and/or that includes setting information for) the wireless accessory, a third user interface object associated with settings for a third wireless accessory (e.g., 916*a*, 916*b*, and/or 916*c*) (e.g., the same type (e.g., headphones, smartwatch, or stylus) as the wireless accessory and/or the second wireless accessory and/or a type different from the wireless accessory and/or the second wireless accessory) that is different from the first wireless accessory and the second wireless accessory. In some embodiments, in response to receiving the request to display system settings of the computer system, displaying, via the display generation component, the system settings user interface includes: in accordance with a determination that the second wireless accessory (e.g., headphones, smartwatch, or stylus) meets the set of one or more connectivity criteria, displaying, via the display generation component, the system settings user interface with a second user interface object associated with settings for (e.g., that when selected displays settings for and/or that includes setting information for) the second wireless accessory, wherein the second user interface object associated with settings for the second wireless accessory is displayed concurrently with the plurality of selectable options associated with functions other than wireless accessory management, and in accordance with a determination that the second wireless accessory does not meet the set of one or more connectivity criteria, displaying, via the display generation component, the system settings user interface without displaying the second user interface object associated with settings for the second wireless accessory. In some embodiments, in response to receiving the request to display system settings of the computer system, displaying, via the display generation component, the system settings user interface includes: in accordance with a determination that the third wireless accessory (e.g., headphones, smartwatch, or stylus) meets the set of one or more connectivity criteria, displaying, via the display generation component, the system settings user interface with a third user interface object associated with settings for (e.g., that when selected displays settings for and/or that includes setting information for) the third wireless accessory, wherein the third user interface object associated with settings for the third wireless accessory is displayed concurrently with the plurality of selectable options associated with functions other than wireless accessory management, and in accordance with a determination that the third wireless accessory does not meet the set of one or more connectivity criteria, displaying, via the display generation component, the system settings user interface without displaying the third user interface object associated with settings for the third wireless accessory. Concurrently displaying user interface objects for various connected wireless accessories enables the computer system to concurrently provide options for accessing settings of wireless accessories that are likely to be used, without displaying options for accessing settings of wireless accessories that are less likely to be used, thereby reducing the clutter of the user interface, improving the man-machine interface, and reducing the number of inputs required to access the settings.

In some embodiments, while displaying the system settings user interface (e.g., 910), the computer system (e.g., 900) receives, via the one or more input devices, selection (e.g., 905c, other selection input directed to accessory affordance 916a, 905e, other selection input directed to accessory affordance 952a, 905f, and/or other selection input directed to accessory affordance 962) of a respective user interface object associated with settings for (e.g., that when selected displays settings for and/or that includes setting information for) a respective wireless accessory (e.g., the user interface object associated with settings for the wireless accessory, the second user interface object associated with settings for the second wireless accessory, or the third user interface object associated with settings for the third wireless accessory). In some embodiments, in response receiving selection of the respective user interface object associated with settings for the respective wireless accessory, the computer system displays, via the display generation component, a settings user interface (e.g., 920) for the respective wireless accessory that includes one or more settings for the respective wireless accessory. Displaying the settings user interface for the respective wireless accessory enables the user of the computer system to quickly configure the settings, thereby providing the user with increased control over accessories connected to the computer system.

In some embodiments, displaying the settings user interface (e.g., 920) for the respective wireless accessory (e.g., 914a) includes concurrently displaying a first setting (e.g., 924, 930, 932a, and/or 932b) for the respective wireless accessory and a second setting (e.g., 924, 930, 932a, and/or 932b), different from the first setting, for the respective wireless accessory. In some embodiments, the settings user interface for the respective wireless accessory includes a plurality of settings for the respective wireless accessory. Displaying multiple settings in the settings user interface for the respective wireless accessory enables the user of the computer system to quickly configure the settings, thereby providing the user with increased control over accessories connected to the computer system.

In some embodiments, displaying the one or more settings for the respective wireless accessory includes displaying a noise control setting (e.g., 924) for changing (e.g., enabling, disabling, increasing, and/or decreasing) a noise cancellation setting of the respective wireless accessory. In some embodiments, the computer system receives, via the one or more input devices, selection of the noise control setting of the respective wireless accessory. In some embodiments, in response to receiving selection of the noise control setting of the respective wireless accessory, the computer system initiates a process to change the noise control setting of the respective wireless accessory (e.g., selecting a neutral setting where no active noise control is applied, selecting a noise cancellation setting where active noise cancellation is applied, and/or selecting a transparency setting where active transparency is applied by introducing some of the audio near the wireless accessory to counteract some of the passive noise reduction created by placement of the wireless accessory on, over, or near the user's ear). In some embodiments, the one or more settings for the respective wireless accessory includes a noise control setting for changing (e.g., enabling, disabling, increasing, and/or decreasing) an audio transparency setting of the respective wireless accessory. Displaying a noise cancellation setting in the settings user interface for the respective wireless accessory enables the user of the computer system to quickly configure the noise cancellation setting, thereby providing the user with increased control over the accessory connected to the computer system.

In some embodiments, displaying the settings user interface for the respective wireless accessory includes displaying location information (e.g., 926) of (and/or an option to get directions to) the respective wireless accessory. In some embodiments, the location information includes a map indicating a location of the respective wireless accessory. In some embodiments, the location information includes a street address of the respective wireless accessory. In some embodiments, in response to detecting selection of the option to get directions to the respective wireless accessory, the computer system initiates a process to display turn-by-turn directions (e.g., walking directions and/or driving directions). Displaying location information in the settings user interface for the respective wireless accessory enables the user of the computer system to quickly learn location information about the accessory, thereby providing the user with improved visual feedback.

In some embodiments, displaying the settings user interface for the respective wireless accessory includes displaying an option to play an audio alert (e.g., 928) at the respective wireless accessory. In some embodiments, the computer system (e.g., 900) receives, via the one or more input devices, selection of the option to play an audio alert at the respective wireless accessory (e.g., a tap or other selection input directed to 928). In some embodiments, in response to receiving selection of the option to play an alert at the respective wireless accessory, the computer system (e.g., 900) transmits (e.g., to a server and/or to the respective wireless accessory) a command to play the audio alert at the respective wireless accessory. Displaying an option to play an alert in the settings user interface for the respective wireless accessory enables the user of the computer system to quickly access the option to play the alert and, as a result, more easily find the connected wireless accessory.

In some embodiments, displaying the one or more settings for the respective wireless accessory includes displaying an ear detection setting (e.g., 930) for changing (e.g., enabling, disabling, increasing, and/or decreasing) an automatic play setting of the respective wireless accessory. In some embodiments, the computer system detects a change in a state (e.g., being worn or not being worn) of the respective wireless accessory. In some embodiments, in response to detecting the change in the state of the respective wireless accessory, in accordance with a determination that the ear detection setting is enabled, automatically performing, using the respective wireless accessory, an audio operation (e.g., ceasing (e.g., pausing and/or stopping) audio playback when the respective wireless accessory is removed from an ear of the user or starting audio playback when the respective wireless accessory is placed in/on/over an ear of the user) based on the change in the state of the respective wireless accessory. In some embodiments, in response to detecting the change in the state of the respective wireless accessory, in accordance with a determination that the ear detection setting is not enabled, forgoing automatically performing, using the respective wireless accessory, the audio operation based on the change in the state of the respective wireless accessory. Displaying ear detection settings in the settings user interface for the respective wireless accessory enables the user of the computer system to quickly configure the ear detection settings, thereby providing the user with increased control over the accessory connected to the computer system. Performing different operations, based on the ear detection settings, when the state of the respective wireless accessory changes enables the computer system to perform an appropriate operation without requiring further user input, thereby reducing the number of inputs required.

In some embodiments, displaying the one or more settings for the respective wireless accessory includes displaying a controls setting for changing a setting controlled by a respective input at the respective wireless accessory (e.g., 932a and/or 932b). In some embodiments, in response to detecting the change in the state of the respective wireless accessory, the computer system receives, via the one or more input devices, the respective input at the respective wireless accessory. In some embodiments, in response to receiving the respective input at the respective wireless accessory, in accordance with a determination that the controls setting is configured for a first controllable setting, configuring the first controllable setting (e.g., changing a volume and/or toggling on/off transparency) associated with the respective wireless accessory. In some embodiments, in response to receiving the respective input at the respective wireless accessory, in accordance with a determination that the controls setting is configured for a second controllable setting that is different from the first controllable setting, configuring the second controllable setting (e.g., play/pause audio and/or mute a microphone) associated with the respective wireless accessory. In some embodiments, the computer system receives selection directed to the controls setting to configure the operation to be performed and/or the setting to be changed when a particular input is received at the respective wireless device. Displaying controls settings in the settings user interface for the respective wireless accessory enables the user of the computer system to quickly configure the controls settings, thereby providing the user with increased control over the accessory connected to the computer system. Performing a respective operation (based on a setting) when a respective input is received at the respective wireless device enables the computer system to perform a desired operation via input at the respective wireless device without requiring additional user input, thereby reducing the number of inputs required.

In some embodiments, displaying the settings user interface for the respective wireless accessory includes displaying a battery state (e.g., 922a and/or 922b) (e.g., percentage of charge remaining and/or amount of expected use time remaining) of the respective wireless accessory. In some embodiments, displaying the battery state of the respective wireless accessory includes displaying a plurality of battery states for components of the respective wireless accessory. In some embodiments, displaying the battery state of the respective wireless accessory includes displaying a first battery state for a first headphone of the respective wireless accessory, a second headphone of the respective wireless accessory, and/or a case of the respective wireless accessory. Displaying a battery state in the settings user interface for the respective wireless accessory enables the user of the computer system to quickly access the battery state of the wireless accessory, thereby providing the user with improved feedback about the state of the wireless accessory.

In some embodiments, displaying the settings user interface for the respective wireless accessory includes, displaying, via the display generation component, information (e.g., 922a, 922b, and/or 926) (e.g., location information and/or battery state) about the respective wireless accessory. In some embodiments, displaying the settings user interface for the respective wireless accessory includes, in accordance with a determination that information about the respective wireless accessory has not been received within a last predetermined period of time (e.g., the last 5 seconds, the last minute, and/or the last 5 minutes), displaying, via the display generation component, an indication (e.g., an amount of time and/or using particular color) of an age of the information (e.g., time provided in 922b and/or 926) about the respective wireless accessory (e.g., indicating last seen 5 minutes ago, last received information 10 minutes ago, and/or last received battery information 1 hour ago). In some embodiments, in accordance with a determination that information about the respective wireless accessory has been received within the last predetermined period of time (e.g., the last 5 seconds, the last minute, and/or the last 5 minutes), forgoing display of the indication (e.g., an amount of time and/or using particular color) of the age of the information about the respective wireless accessory (e.g., indicating last seen 5 minutes ago, last received information 10 minutes ago, and/or last received battery information 1 hour ago). Providing an indication of the age of the information about the wireless accessory provides the user with feedback about the state of the computer system, such as the last time the computer system received updated information from the accessory, thereby providing the user with improved feedback.

In some embodiments, displaying the settings user interface for the respective wireless accessory includes displaying, via the display generation component, warranty and/or service information (e.g., 934a and/or 934b) (e.g., an indication of whether a warranty is active or expired, an indication of whether complementary service is or is not available, and/or an indication of a date on which the warrant and/or complementary service expires) about the respective wireless accessory. Displaying warrant and/or service information about the wireless accessory provides the user with feedback about the state of the wireless accessory, such as how long it has been in service and/or what features are enabled for the accessory, thereby providing the user with improved visual feedback.

In some embodiments, while displaying, via the display generation component, the system settings user interface, wherein displaying the system settings user interface includes displaying a short-range wireless communication settings option (e.g., 942), the computer system receives, via the one or more input devices, selection (e.g., 907c or other selection input directed to Bluetooth affordance 942) of the short-range wireless communication settings option (e.g., 942). In some embodiments, in response to receiving selection of the short-range wireless communication settings option, the computer system displays, via the display generation component, a second user interface object associated with settings for (e.g., that when selected displays settings for and/or that includes setting information for) the wireless accessory (e.g., 952a). In some embodiments the computer system receives, via the one or more input devices, selection (e.g., 905e or other selection input directed to accessory affordance 952a) of the second user interface object associated with settings for (e.g., that when selected displays settings for and/or that includes setting information for) the wireless accessory. In some embodiments, in response to receiving selection of the second user interface object associated with settings for the wireless accessory, the computer system displays, via the display generation component, a settings user interface for the respective wireless accessory that includes one or more settings for the respective wireless accessory. In some embodiments, in response to receiving selection of the short-range wireless communication settings option, the computer system displays a plurality of user interface objects associated with settings for a plurality of wireless accessories, wherein selection of a respective user interface object of the plurality of user interface objects causes display of a settings user interface for (and, optionally, including one or more settings for) the wireless accessory corresponding to the selected respective user interface object. Providing access to the settings user interface for the respective wireless accessory from a user interface associated with short-range wireless communication settings options enables the user to access the settings user interface for the respective wireless accessory from an interface that optionally lists various wireless accessories (e.g., connected and unconnected), thereby providing the user with quick access to configure the wireless accessory and reducing the number of inputs required to configure the wireless accessory.

In some embodiments, while displaying, via the display generation component, the system settings user interface, wherein displaying the system settings user interface includes displaying an audio settings option (e.g., 944), the computer system receives, via the one or more input devices, selection (e.g., 909c or other selection input directed to sound settings affordance 944) of the audio settings option. In some embodiments, in response to receiving selection of the audio settings option, the computer system displays, via the display generation component, a third user interface object (e.g., 962) associated with settings for (e.g., that when selected displays settings for and/or that includes setting information for) the wireless accessory. In some embodiments the computer system receives, via the one or more input devices, selection (e.g., 905f or other selection input directed to accessory affordance 962) of the third user interface object associated with settings for (e.g., that when selected displays settings for and/or that includes setting information for) the wireless accessory. In some embodiments, in response to receiving selection of the third user interface object associated with settings for the wireless accessory, the computer system displays, via the display generation component, a settings user interface for the respective wireless accessory that includes one or more settings for the respective wireless accessory. In some embodiments, in response to receiving selection of the audio settings option, the computer system displays a plurality of user interface objects associated settings for a plurality of wireless accessories, wherein selection of a respective user interface object of the plurality of user interface objects causes display of a settings user interface for (including one or more settings for) the wireless accessory corresponding to the selected respective user interface object. Providing access to the settings user interface for the respective wireless accessory from an audio settings user interface enables the user to access the settings user interface for the respective wireless accessory from an interface that optionally lists various audio accessories (e.g., connected and unconnected) and settings, thereby providing the user with quick access to configure the wireless accessory and reducing the number of inputs required to configure the wireless accessory.

In some embodiments, while displaying, via the display generation component, the system settings user interface, the computer system receives, via the one or more input devices, selection (e.g., 911c or other selection input directed to network affordance 946) of a first selectable option (e.g., 946) (e.g., for user account management, for wireless settings for the computer system, for notification settings, for sound and/or haptic settings, or for other system settings) of the selectable options associated with functions other than wireless accessory management. In some embodiments, in response to receiving selection of the first selectable option, the computer system displays, via the display generation component, a user interface corresponding to the first selectable option, wherein the user interface corresponding to the first selectable option is for functions other than wireless accessory management (e.g., for user account management, for wireless settings for the computer system, for notification settings, for sound and/or haptic settings, or for other system settings). Providing access to various functions other than wireless accessory management from the system settings user interface enables the computer system to present the user with various settings and functions, whether they are related to wireless accessories or not, thereby reducing the number of inputs required to access the settings and functions.

Note that details of the processes described above with respect to method 1000 (e.g., FIG. 10 are also applicable in an analogous manner to other methods described above. For example, methods 700 and 800 optionally includes one or more of the characteristics of the various methods described above with reference to method 1000. For example, a user may access a settings interface for a wireless accessory, as described with respect to method 1000, and select an affordance of the settings interface to initiate process to provide (e.g., enroll) a personalized spatial audio profile as described with respect to method 700. In some embodiments, device 601 and device 900 are the same device. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve accessory management. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present settings options for one or more wireless accessories. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of management wireless accessories, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, wireless accessories can be detected based on non-personal information data or a bare minimum amount of personal information, such as the content being requested by the device associated with a user.

What is claimed is:

1. A computer system configured to communicate with one or more biometric sensors, comprising:
  one or more processors; and
  memory storing one or more programs configured to be executed by the one or more processors, the one or more programs including instructions for:
    initiating a spatial audio enrollment process for enrolling a spatial audio profile of a user of the computer system;
    during the spatial audio enrollment process for enrolling the spatial audio profile of the user, outputting feedback about positioning a portion of a head of the user in a field of view of the one or more biometric sensors, including:
      in response to the computer system capturing information about a first view of a first ear of the user, the feedback indicates a first amount of progress of capturing information about the first ear; and
      in response to the computer system capturing additional information about a second view of the first ear, different from the first view of the first ear, the feedback indicates a second amount of progress of capturing information about the first ear that is greater than the first amount of progress;
    while the portion of the head of the user is in the field of view of the one or more biometric sensors, capturing, via the one or more biometric sensors, data about the portion of the head of the user; and
    after capturing the data about the portion of the head of the user, receiving a request from the user to play media outside of the spatial audio enrollment process; and
    in response to the request from the user to play media, playing media using a personalized spatial audio profile for the user that was generated using the data about the portion of the head of the user that was captured via the one or more biometric sensors during the spatial audio enrollment process.

2. The computer system of claim 1, wherein the one or more biometric sensors include one or more cameras.

3. The computer system of claim 1, wherein the one or more biometric sensors includes one or more depth sensors.

4. The computer system of claim 1, wherein the personalized spatial audio profile is a personalized head-related transfer function (HRTF) for the user.

5. The computer system of claim 1, wherein outputting feedback about positioning the portion of the head of the user in the field of view of the one or more biometric sensors includes:
  outputting information about a current position of the portion of the head of the user relative to a target position of the portion of the head of the user that will be used to capture data for use in generating the personalized spatial audio profile.

6. The computer system of claim 1, wherein outputting feedback about positioning the portion of the head of the user in the field of view of the one or more biometric sensors includes:
  outputting instructions to the user to perform a scan of a face of the user.

7. The computer system of claim 1, wherein outputting feedback about positioning the portion of the head of the user in the field of view of the one or more biometric sensors includes:
 outputting instructions to the user for performing a scan of a first ear of the user.

8. The computer system of claim 7, wherein the computer system is in communication with a display generation component and wherein outputting feedback about positioning the portion of the head of the user in the field of view of the one or more biometric sensors includes:
 displaying, via the display generation component, an indication that identifies the first ear of the user detected in a field of view of the one or more biometric sensors.

9. The computer system of claim 1, wherein outputting feedback about positioning the portion of the head of the user in the field of view of the one or more biometric sensors includes outputting, at the computer system, non-visual feedback.

10. The computer system of claim 1, wherein outputting feedback about positioning the portion of the head of the user in the field of view of the one or more biometric sensors includes:
 in response to detecting, via the one or more biometric sensors, a first ear of the user within a field of view of the one or more biometric sensors, outputting first feedback.

11. The computer system of claim 1, wherein outputting feedback about positioning the portion of the head of the user in the field of view of the one or more biometric sensors includes:
 in accordance with a determination that a first ear of the user has been rotated, within a field of view of the one or more biometric sensors and relative to the one or more biometric sensors, in a first direction by a first threshold amount, outputting second feedback; and
 in accordance with a determination that the first ear of the user has not been rotated, within the field of view of the one or more biometric sensors and relative to the one or more biometric sensors, in the first direction by the first threshold amount, forgoing outputting the second feedback.

12. The computer system of claim 1, wherein outputting feedback about positioning the portion of the head of the user in the field of view of the one or more biometric sensors includes:
 subsequent to outputting instructions to the user to perform a scan of the first ear of the user, outputting instructions to the user to perform a scan of a second ear of the user that is different from the first ear of the user.

13. The computer system of claim 1, the one or more programs further including instructions for:
 during the spatial audio enrollment process for enrolling the spatial audio profile of the user, detecting an error condition; and
 in response to detecting the error condition, outputting an error indication.

14. The computer system of claim 1, wherein the computer system is in communication with a display generation component and one or more input devices, the one or more programs further including instructions for:
 displaying, via the display generation component, a headphone settings user interface that includes a spatial audio enrollment option; and
 while displaying the headphone settings user interface, receiving, via the one or more input devices, selection of the spatial audio enrollment option,
 wherein initiating the spatial audio enrollment process for enrolling the spatial audio profile of the user of the computer system is in response to receiving selection of the spatial audio enrollment option.

15. The computer system of claim 1, wherein the computer system is in communication with a display generation component and one or more input devices, the one or more programs further including instructions for:
 displaying, via the display generation component, a sound settings user interface that includes a spatial audio enrollment option; and
 while displaying the sound settings user interface, receiving, via the one or more input devices, selection of the spatial audio enrollment option,
 wherein initiating the spatial audio enrollment process for enrolling the spatial audio profile of the user of the computer system is in response to receiving selection of the spatial audio enrollment option.

16. The computer system of claim 1, wherein the computer system is in communication with a display generation component, the one or more programs further including instructions for:
 detecting that one or more audio output devices are connected to the computer system; and
 in response to detecting that one or more audio output devices have connected to the computer system, displaying, via the display generation component, a spatial audio enrollment option,
 wherein initiating the spatial audio enrollment process for enrolling the spatial audio profile of the user of the computer system is in response to receiving selection of the spatial audio enrollment option.

17. The computer system of claim 1, wherein the computer system is in communication with a display generation component and one or more input devices, the one or more programs further including instructions for:
 subsequent to generating, using the data about the portion of the head of the user, the personalized spatial audio profile for the user, displaying, via the display generation component, an option to remove the personalized spatial audio profile;
 while displaying the option to remove the personalized spatial audio profile, receiving, via the one or more input devices, selection of the option to remove the personalized spatial audio profile; and
 in response to receiving selection of the option to remove the personalized spatial audio profile, initiating a process to remove the personalized spatial audio profile.

18. The computer system of claim 1, wherein the computer system is in communication with a display generation component and one or more input devices, the one or more programs further including instructions for:
 subsequent to generating, using the data about the portion of the head of the user, the personalized spatial audio profile for the user, displaying, via the display generation component, an option to temporarily disable the personalized spatial audio profile and using a default spatial audio profile;
 while displaying the option to temporarily disable the personalized spatial audio profile and use a default spatial audio profile, receiving, via the one or more input devices, selection of the option to temporarily disable the personalized spatial audio profile and use a default spatial audio profile; and in response to receiving selection of the option to temporarily disable the personalized spatial audio profile and using a default spatial audio profile, initiating a process to temporarily disable the personalized spatial audio profile and use a default spatial audio profile.

19. The computer system of claim 1, wherein the computer system is in communication with one or more audio output devices and one or more input devices, the one or more programs further including instructions for:
  subsequent to generating, using the data about the portion of the head of the user, the personalized spatial audio profile for the user, receiving, via the one or more input devices, a request to play audio; and
  in response to receiving the request to play audio, playing, via the one or more audio output devices, the audio as spatial audio using the personalized spatial audio profile for the user.

20. A non-transitory computer-readable storage medium storing one or more programs configured to be executed by one or more processors of a computer system that is in communication with one or more biometric sensors, the one or more programs including instructions for:
  initiating a spatial audio enrollment process for enrolling a spatial audio profile of a user of the computer system;
  during the spatial audio enrollment process for enrolling the spatial audio profile of the user, outputting feedback about positioning a portion of a head of the user in a field of view of the one or more biometric sensors, including:
    in response to the computer system capturing information about a first view of a first ear of the user, the feedback indicates a first amount of progress of capturing information about the first ear; and
    in response to the computer system capturing additional information about a second view of the first ear, different from the first view of the first ear, the feedback indicates a second amount of progress of capturing information about the first ear that is greater than the first amount of progress;
  while the portion of the head of the user is in the field of view of the one or more biometric sensors, capturing, via the one or more biometric sensors, data about the portion of the head of the user; and
  after capturing the data about the portion of the head of the user, receiving a request from the user to play media outside of the spatial audio enrollment process; and
  in response to the request from the user to play media, playing media using a personalized spatial audio profile for the user that was generated using the data about the portion of the head of the user that was captured via the one or more biometric sensors during the spatial audio enrollment process.

21. A method, comprising:
  at a computer system that is in communication with one or more biometric sensors:
    initiating a spatial audio enrollment process for enrolling a spatial audio profile of a user of the computer system;
    during the spatial audio enrollment process for enrolling the spatial audio profile of the user, outputting feedback about positioning a portion of a head of the user in a field of view of the one or more biometric sensors, including:
      in response to the computer system capturing information about a first view of a first ear of the user, the feedback indicates a first amount of progress of capturing information about the first ear; and
      in response to the computer system capturing additional information about a second view of the first ear, different from the first view of the first ear, the feedback indicates a second amount of progress of capturing information about the first ear that is greater than the first amount of progress;
    while the portion of the head of the user is in the field of view of the one or more biometric sensors, capturing, via the one or more biometric sensors, data about the portion of the head of the user; and
    after capturing the data about the portion of the head of the user, receiving a request from the user to play media outside of the spatial audio enrollment process; and
    in response to the request from the user to play media, playing media using a personalized spatial audio profile for the user that was generated using the data about the portion of the head of the user that was captured via the one or more biometric sensors during the spatial audio enrollment process.

22. The non-transitory computer-readable storage medium of claim 20, wherein the one or more biometric sensors include one or more cameras.

23. The non-transitory computer-readable storage medium of claim 20, wherein the one or more biometric sensors includes one or more depth sensors.

24. The non-transitory computer-readable storage medium of claim 20, wherein the personalized spatial audio profile is a personalized head-related transfer function (HRTF) for the user.

25. The non-transitory computer-readable storage medium of claim 20, wherein outputting feedback about positioning the portion of the head of the user in the field of view of the one or more biometric sensors includes:
  outputting information about a current position of the portion of the head of the user relative to a target position of the portion of the head of the user that will be used to capture data for use in generating the personalized spatial audio profile.

26. The non-transitory computer-readable storage medium of claim 20, wherein outputting feedback about positioning the portion of the head of the user in the field of view of the one or more biometric sensors includes:
  outputting instructions to the user to perform a scan of a face of the user.

27. The non-transitory computer-readable storage medium of claim 20, wherein outputting feedback about positioning the portion of the head of the user in the field of view of the one or more biometric sensors includes:
  outputting instructions to the user for performing a scan of a first ear of the user.

28. The non-transitory computer-readable storage medium of claim 27, wherein the computer system is in communication with a display generation component and wherein outputting feedback about positioning the portion of the head of the user in the field of view of the one or more biometric sensors includes:
  displaying, via the display generation component, an indication that identifies the first ear of the user detected in a field of view of the one or more biometric sensors.

29. The non-transitory computer-readable storage medium of claim 20, wherein outputting feedback about positioning the portion of the head of the user in the field of view of the one or more biometric sensors includes outputting, at the computer system, non-visual feedback.

30. The non-transitory computer-readable storage medium of claim 20, wherein outputting feedback about positioning the portion of the head of the user in the field of view of the one or more biometric sensors includes:
    in response to detecting, via the one or more biometric sensors, a first ear of the user within a field of view of the one or more biometric sensors, outputting first feedback.

31. The non-transitory computer-readable storage medium of claim 20, wherein outputting feedback about positioning the portion of the head of the user in the field of view of the one or more biometric sensors includes:
    in accordance with a determination that a first ear of the user has been rotated, within a field of view of the one or more biometric sensors and relative to the one or more biometric sensors, in a first direction by a first threshold amount, outputting second feedback; and
    in accordance with a determination that the first ear of the user has not been rotated, within the field of view of the one or more biometric sensors and relative to the one or more biometric sensors, in the first direction by the first threshold amount, forgoing outputting the second feedback.

32. The non-transitory computer-readable storage medium of claim 20, wherein outputting feedback about positioning the portion of the head of the user in the field of view of the one or more biometric sensors includes:
    subsequent to outputting instructions to the user to perform a scan of the first ear of the user, outputting instructions to the user to perform a scan of a second ear of the user that is different from the first ear of the user.

33. The non-transitory computer-readable storage medium of claim 20, the one or more programs further including instructions for:
    during the spatial audio enrollment process for enrolling the spatial audio profile of the user, detecting an error condition; and
    in response to detecting the error condition, outputting an error indication.

34. The non-transitory computer-readable storage medium of claim 20, wherein the computer system is in communication with a display generation component and one or more input devices, the one or more programs further including instructions for:
    displaying, via the display generation component, a headphone settings user interface that includes a spatial audio enrollment option; and
    while displaying the headphone settings user interface, receiving, via the one or more input devices, selection of the spatial audio enrollment option,
    wherein initiating the spatial audio enrollment process for enrolling the spatial audio profile of the user of the computer system is in response to receiving selection of the spatial audio enrollment option.

35. The non-transitory computer-readable storage medium of claim 20, wherein the computer system is in communication with a display generation component and one or more input devices, the one or more programs further including instructions for:
    displaying, via the display generation component, a sound settings user interface that includes a spatial audio enrollment option; and
    while displaying the sound settings user interface, receiving, via the one or more input devices, selection of the spatial audio enrollment option,
    wherein initiating the spatial audio enrollment process for enrolling the spatial audio profile of the user of the computer system is in response to receiving selection of the spatial audio enrollment option.

36. The non-transitory computer-readable storage medium of claim 20, wherein the computer system is in communication with a display generation component, the one or more programs further including instructions for:
    detecting that one or more audio output devices are connected to the computer system; and
    in response to detecting that one or more audio output devices have connected to the computer system, displaying, via the display generation component, a spatial audio enrollment option,
    wherein initiating the spatial audio enrollment process for enrolling the spatial audio profile of the user of the computer system is in response to receiving selection of the spatial audio enrollment option.

37. The non-transitory computer-readable storage medium of claim 20, wherein the computer system is in communication with a display generation component and one or more input devices, the one or more programs further including instructions for:
    subsequent to generating, using the data about the portion of the head of the user, the personalized spatial audio profile for the user, displaying, via the display generation component, an option to remove the personalized spatial audio profile;
    while displaying the option to remove the personalized spatial audio profile, receiving, via the one or more input devices, selection of the option to remove the personalized spatial audio profile; and
    in response to receiving selection of the option to remove the personalized spatial audio profile, initiating a process to remove the personalized spatial audio profile.

38. The non-transitory computer-readable storage medium of claim 20, wherein the computer system is in communication with a display generation component and one or more input devices, the one or more programs further including instructions for:
    subsequent to generating, using the data about the portion of the head of the user, the personalized spatial audio profile for the user, displaying, via the display generation component, an option to temporarily disable the personalized spatial audio profile and using a default spatial audio profile;
    while displaying the option to temporarily disable the personalized spatial audio profile and use a default spatial audio profile, receiving, via the one or more input devices, selection of the option to temporarily disable the personalized spatial audio profile and use a default spatial audio profile; and
    in response to receiving selection of the option to temporarily disable the personalized spatial audio profile and using a default spatial audio profile, initiating a process to temporarily disable the personalized spatial audio profile and use a default spatial audio profile.

39. The non-transitory computer-readable storage medium of claim 20, wherein the computer system is in communication with one or more audio output devices and one or more input devices, the one or more programs further including instructions for:
    subsequent to generating, using the data about the portion of the head of the user, the personalized spatial audio profile for the user, receiving, via the one or more input devices, a request to play audio; and in response to receiving the request to play audio, playing, via the one or more audio output devices, the audio as spatial audio using the personalized spatial audio profile for the user.

40. The method of claim 21, wherein the one or more biometric sensors include one or more cameras.

41. The method of claim 21, wherein the one or more biometric sensors includes one or more depth sensors.

42. The method of claim 21, wherein the personalized spatial audio profile is a personalized head-related transfer function (HRTF) for the user.

43. The method of claim 21, wherein outputting feedback about positioning the portion of the head of the user in the field of view of the one or more biometric sensors includes:
   outputting information about a current position of the portion of the head of the user relative to a target position of the portion of the head of the user that will be used to capture data for use in generating the personalized spatial audio profile.

44. The method of claim 21, wherein outputting feedback about positioning the portion of the head of the user in the field of view of the one or more biometric sensors includes:
   outputting instructions to the user to perform a scan of a face of the user.

45. The method of claim 21, wherein outputting feedback about positioning the portion of the head of the user in the field of view of the one or more biometric sensors includes:
   outputting instructions to the user for performing a scan of a first ear of the user.

46. The method of claim 45, wherein the computer system is in communication with a display generation component and wherein outputting feedback about positioning the portion of the head of the user in the field of view of the one or more biometric sensors includes:
   displaying, via the display generation component, an indication that identifies the first ear of the user detected in a field of view of the one or more biometric sensors.

47. The method of claim 21, wherein outputting feedback about positioning the portion of the head of the user in the field of view of the one or more biometric sensors includes outputting, at the computer system, non-visual feedback.

48. The method of claim 21, wherein outputting feedback about positioning the portion of the head of the user in the field of view of the one or more biometric sensors includes:
   in response to detecting, via the one or more biometric sensors, a first ear of the user within a field of view of the one or more biometric sensors, outputting first feedback.

49. The method of claim 21, wherein outputting feedback about positioning the portion of the head of the user in the field of view of the one or more biometric sensors includes:
   in accordance with a determination that a first ear of the user has been rotated, within a field of view of the one or more biometric sensors and relative to the one or more biometric sensors, in a first direction by a first threshold amount, outputting second feedback; and
   in accordance with a determination that the first ear of the user has not been rotated, within the field of view of the one or more biometric sensors and relative to the one or more biometric sensors, in the first direction by the first threshold amount, forgoing outputting the second feedback.

50. The method of claim 21, wherein outputting feedback about positioning the portion of the head of the user in the field of view of the one or more biometric sensors includes:
   subsequent to outputting instructions to the user to perform a scan of the first ear of the user, outputting instructions to the user to perform a scan of a second ear of the user that is different from the first ear of the user.

51. The method of claim 21, further comprising:
   during the spatial audio enrollment process for enrolling the spatial audio profile of the user, detecting an error condition; and
   in response to detecting the error condition, outputting an error indication.

52. The method of claim 21, wherein the computer system is in communication with a display generation component and one or more input devices, the method further comprising:
   displaying, via the display generation component, a headphone settings user interface that includes a spatial audio enrollment option; and
   while displaying the headphone settings user interface, receiving, via the one or more input devices, selection of the spatial audio enrollment option,
   wherein initiating the spatial audio enrollment process for enrolling the spatial audio profile of the user of the computer system is in response to receiving selection of the spatial audio enrollment option.

53. The method of claim 21, wherein the computer system is in communication with a display generation component and one or more input devices, the method further comprising:
   displaying, via the display generation component, a sound settings user interface that includes a spatial audio enrollment option; and
   while displaying the sound settings user interface, receiving, via the one or more input devices, selection of the spatial audio enrollment option,
   wherein initiating the spatial audio enrollment process for enrolling the spatial audio profile of the user of the computer system is in response to receiving selection of the spatial audio enrollment option.

54. The method of claim 21, wherein the computer system is in communication with a display generation component, the method further comprising:
   detecting that one or more audio output devices are connected to the computer system; and
   in response to detecting that one or more audio output devices have connected to the computer system, displaying, via the display generation component, a spatial audio enrollment option,
   wherein initiating the spatial audio enrollment process for enrolling the spatial audio profile of the user of the computer system is in response to receiving selection of the spatial audio enrollment option.

55. The method of claim 21, wherein the computer system is in communication with a display generation component and one or more input devices, the method further comprising
   subsequent to generating, using the data about the portion of the head of the user, the personalized spatial audio profile for the user, displaying, via the display generation component, an option to remove the personalized spatial audio profile;
   while displaying the option to remove the personalized spatial audio profile, receiving, via the one or more input devices, selection of the option to remove the personalized spatial audio profile; and in response to receiving selection of the option to remove the personalized spatial audio profile, initiating a process to remove the personalized spatial audio profile.

56. The method of claim 21, wherein the computer system is in communication with a display generation component and one or more input devices, the method further comprising:

subsequent to generating, using the data about the portion of the head of the user, the personalized spatial audio profile for the user, displaying, via the display generation component, an option to temporarily disable the personalized spatial audio profile and using a default spatial audio profile;

while displaying the option to temporarily disable the personalized spatial audio profile and use a default spatial audio profile, receiving, via the one or more input devices, selection of the option to temporarily disable the personalized spatial audio profile and use a default spatial audio profile; and in response to receiving selection of the option to temporarily disable the personalized spatial audio profile and using a default spatial audio profile, initiating a process to temporarily disable the personalized spatial audio profile and use a default spatial audio profile.

57. The method of claim 21, wherein the computer system is in communication with one or more audio output devices and one or more input devices, the method further comprising:

subsequent to generating, using the data about the portion of the head of the user, the personalized spatial audio profile for the user, receiving, via the one or more input devices, a request to play audio; and in response to receiving the request to play audio, playing, via the one or more audio output devices, the audio as spatial audio using the personalized spatial audio profile for the user.

* * * * *

UNITED STATES PATENT AND TRADEMARK OFFICE
CERTIFICATE OF CORRECTION

| | | |
|---|---|---|
| PATENT NO. | : 12,340,631 B2 | Page 1 of 1 |
| APPLICATION NO. | : 18/205495 | |
| DATED | : June 24, 2025 | |
| INVENTOR(S) | : Taylor G. Carrigan et al. | |

It is certified that error appears in the above-identified patent and that said Letters Patent is hereby corrected as shown below:

On the Title Page

Column 1, Item (72) (Inventors), Line 2: Delete "L Coffman," and insert -- L. Coffman, --.

Column 1, Item (72) (Inventors), Line 7: Delete "L Lerner," and insert -- R. Lerner, --.

Signed and Sealed this
Sixteenth Day of September, 2025

Coke Morgan Stewart
*Acting Director of the United States Patent and Trademark Office*